(12) United States Patent
Thrower, III et al.

(10) Patent No.: US 11,888,806 B2
(45) Date of Patent: Jan. 30, 2024

(54) SYSTEMS AND METHODS FOR ELECTRONIC COMMUNICATION USING UNIQUE IDENTIFIERS ASSOCIATED WITH ELECTRONIC ADDRESSES

(71) Applicant: Events.com, Inc., San Diego, CA (US)

(72) Inventors: Frederick Mitchell Thrower, III, La Jolla, CA (US); Andrew Michael Phipps, La Jolla, CA (US)

(73) Assignee: Events.com, Inc., San Diego, CA (US)

( * ) Notice: Subject to any disclaimer, the term of this patent is extended or adjusted under 35 U.S.C. 154(b) by 0 days.

(21) Appl. No.: 17/747,852

(22) Filed: May 18, 2022

(65) Prior Publication Data

US 2023/0064732 A1     Mar. 2, 2023

Related U.S. Application Data

(63) Continuation of application No. 17/146,344, filed on Jan. 11, 2021, now abandoned, which is a continuation of application No. 16/399,578, filed on Apr. 30, 2019, now Pat. No. 10,893,016, which is a continuation of application No. 16/113,965, filed on Aug. 27, 2018, now abandoned, which is a continuation of application No. 15/620,648, filed on Jun. 12, 2017, now abandoned, which is a continuation of application No. 15/338,191, filed on Oct. 28, 2016, now abandoned, which is a continuation of application No. 15/018,793, filed on
(Continued)

(51) Int. Cl.
*H04L 51/48* (2022.01)
*G06Q 10/10* (2023.01)
*H04L 51/52* (2022.01)
*H04L 51/214* (2022.01)
*H04L 51/08* (2022.01)

(52) U.S. Cl.
CPC ............. *H04L 51/48* (2022.05); *G06Q 10/10* (2013.01); *H04L 51/08* (2013.01); *H04L 51/214* (2022.05); *H04L 51/52* (2022.05)

(58) Field of Classification Search
CPC ......... H04L 51/28; H04L 51/08; H04L 51/14; H04L 51/32; G06Q 10/10
See application file for complete search history.

(56) References Cited

U.S. PATENT DOCUMENTS

2006/0053201 A1* 3/2006 Fahmy .................... H04L 51/48
                                                                  709/206
2008/0141378 A1* 6/2008 McLean .................. G06F 21/10
                                                                  726/26

* cited by examiner

*Primary Examiner* — Joe Chacko
(74) *Attorney, Agent, or Firm* — Cooley LLP

(57) ABSTRACT

A method and system for electronically communicating with a user knowing only a unique identifier associated with that user is described. An electronic message having an address based upon the unique identifier and consistent with an assigned convention is sent from a portable device and received by a server system. The message sent may include attachments such as, for example, pictures, audio and/or video files. The server system includes or is capable of accessing an electronic repository in which a plurality of unique identifiers are respectively associated with a corresponding plurality of profiles. Upon receipt at the server system, the message and any attachments are stored in association with a profile corresponding to the unique identifier. The server system then facilitates access to the message information and any attachments in accordance with the profile.

22 Claims, 46 Drawing Sheets

Related U.S. Application Data

Feb. 8, 2016, now abandoned, which is a continuation of application No. 14/513,129, filed on Oct. 13, 2014, now abandoned, which is a continuation of application No. 13/562,091, filed on Jul. 30, 2012, now abandoned, which is a continuation-in-part of application No. 13/231,760, filed on Sep. 13, 2011, now abandoned.

(60) Provisional application No. 61/513,415, filed on Jul. 29, 2011, provisional application No. 61/382,442, filed on Sep. 13, 2010.

SYSTEMS AND METHODS FOR ELECTRONIC COMMUNICATION USING UNIQUE IDENTIFIERS ASSOCIATED WITH ELECTRONIC ADDRESSES

CROSS-REFERENCE TO RELATED APPLICATIONS

This application is a continuation of U.S. patent application Ser. No. 17/146,344, entitled SYSTEMS AND METHODS FOR ELECTRONIC COMMUNICATION USING UNIQUE IDENTIFIERS ASSOCIATED WITH ELECTRONIC ADDRESSES, filed Jan. 11, 2021, which is a continuation of U.S. patent application Ser. No. 16/399,578, entitled SYSTEMS AND METHODS FOR ELECTRONIC COMMUNICATION USING UNIQUE IDENTIFIERS ASSOCIATED WITH ELECTRONIC ADDRESSES, filed Apr. 30, 2019, which is a continuation of U.S. patent application Ser. No. 16/113,965, entitled SYSTEMS AND METHODS FOR ELECTRONIC COMMUNICATION USING UNIQUE IDENTIFIERS ASSOCIATED WITH ELECTRONIC ADDRESSES, filed on Aug. 27, 2018, which is a continuation of U.S. patent application Ser. No. 15/620,648, entitled SYSTEMS AND METHODS FOR ELECTRONIC COMMUNICATION USING UNIQUE IDENTIFIERS ASSOCIATED WITH ELECTRONIC ADDRESSES, filed on Jun. 12, 2017, which is a continuation of U.S. patent application Ser. No. 15/338,191, entitled SYSTEMS AND METHODS FOR ELECTRONIC COMMUNICATION USING UNIQUE IDENTIFIERS ASSOCIATED WITH ELECTRONIC ADDRESSES, filed on Oct. 28, 2016, which is a continuation of U.S. patent application Ser. No. 15/018,793, filed Feb. 8, 2016, entitled SYSTEMS AND METHODS FOR ELECTRONIC COMMUNICATION USING UNIQUE IDENTIFIERS ASSOCIATED WITH ELECTRONIC ADDRESSES, which is a continuation of U.S. patent application Ser. No. 14/513,129, filed Oct. 13, 2014, entitled SYSTEMS AND METHODS FOR ELECTRONIC COMMUNICATION USING UNIQUE IDENTIFIERS ASSOCIATED WITH ELECTRONIC ADDRESSES, which is a continuation of U.S. patent application Ser. No. 13/562,091, filed Jul. 30, 2012, entitled SYSTEMS AND METHODS FOR ELECTRONIC COMMUNICATION USING UNIQUE IDENTIFIERS ASSOCIATED WITH ELECTRONIC ADDRESSES, which (i) claims priority to and the benefit of U.S. Provisional Patent Application Ser. No. 61/513,415, entitled SYSTEMS AND METHODS FOR ELECTRONIC COMMUNICATION USING UNIQUE IDENTIFIERS ASSOCIATED WITH ELECTRONIC ADDRESSES, filed on Jul. 29, 2011, and (ii) is a continuation-in-part of U.S. patent application Ser. No. 13/231,760, entitled SYSTEMS AND METHODS FOR USER INTERACTION BASED ON LICENSE OR OTHER IDENTIFICATION INFORMATION, filed on Sep. 13, 2011, which claims priority under 35 U.S.C. § 119(e) to U.S. Provisional Patent Application Ser. No. 61/382,442, entitled SYSTEMS AND METHODS FOR USER INTERACTION BASED ON LICENSE OR OTHER IDENTIFICATION INFORMATION, filed on Sep. 13, 2010, the contents of each of which are hereby incorporated by reference herein in their entirety for all purposes.

FIELD

This application is directed generally to methods and systems for electronic communication. More particularly, but not exclusively, the application relates to systems and apparatuses for electronic communication using unique identifiers associated with electronic addresses.

BACKGROUND

Electronic mail, or "e-mail", is used to transmit messages over communication networks. Existing e-mail client applications enable a user to compose a message to an intended recipient. The message may then be sent to the intended recipient by entering the recipient's email address into an address field presented by the e-mail client application.

Unfortunately, however, an individual desiring to send an e-mail message to, or otherwise electronically communicate with, an intended recipient or recipient(s) may be unaware of the e-mail or other electronic address(es) of such recipient(s). Moreover, the e-mail or other electronic address of a particular intended recipient may change, which may frustrate those desiring to electronically communicate with such recipient to the extent they are not apprised of such change.

SUMMARY

In one aspect the disclosure relates to a computer-implemented method for facilitating electronic communication using unique identifiers. The method includes establishing an electronic repository in which a plurality of unique identifiers is respectively associated with a corresponding plurality of profiles. The method further includes receiving an electronic message having an address based upon at least one identifier of the plurality of unique identifiers. It is then determined whether the address is of a predefined address format specific to the plurality of unique identifiers. The method further includes storing message information included within the electronic message in association with a profile included within the plurality of profiles wherein the at least one identifier is associated with the profile. Access to the message information is then facilitated in accordance with the profile.

In a particular aspect access to the message information may be facilitated by sending a notification relating to the message information consistent with the profile. In another implementation such access may be facilitated by storing the message information in a web-based stored messaging system. Such access may alternatively be facilitated by sending the message information in an e-mail message addressed to an e-mail address included within the profile. In other implementation such access may be facilitated by, for example, forwarding the message information to a messaging or social networking platform, placing a call to a telephone number included within the profile, or posting the message information to a web site.

In one implementation the identifier may be associated with multiple electronic addresses. These multiple electronic addresses may, for example, be respectively associated with multiple physical addresses within an area defined by a zip code. The multiple electronic addresses could also be respectively associated with multiple phone numbers included in an area code.

The electronic message having an address based upon the unique identifier may be sent by an electronic device in the form of a terminal or a portable device, such as a cell phone, PDA, user equipment, portable computer, tablet computer, or other device. In one implementation the address is manually entered into the device based upon the unique identifier. Barcode (UPC symbol), QR code, or other information containing or representing the unique identifier may also be captured by a camera or other sensing element of the user device and the address may then subsequently generated based upon the unique identifier.

The electronic message, which may comprise, for example, an e-mail message, may be sent to an e-mail server or the equivalent via a cellular connection, data connection, or other wired or wireless network connection such as a CDMA, GSM, LTE, Wi-Fi (802.11), Wi-Max, and/or other network connection.

Each unique identifier may comprise, for example, a street address, a telephone phone number, an international standard book number (ISBN), an international mobile subscriber identity (IMSI), an international mobile equipment identity (IMEI) or mobile equipment identifier (MEI), a global trade item number (GTIN), an electronic product code (EPC), a biometric identifier, an RFID tag, a vehicle identification number (VIN), a patent number, a point of sale or transaction identifier, a passport, a library of congress control number, a license plate number, an international standard musical work code (ISWC), a global location number, a location or GPS coordinates, an international product serial number, a brand name or trademark, an international standard recording code, an electronic serial number, a credit card number, a rewards card, a tracking number, a global release identifier (GRID), a digital object identifier (DOI), a time stamp, a social security number, a driver's license number, an iPhone unique user identifier, a Blackberry Messenger PIN or a racing bib number.

In one embodiment the electronic address (e.g., e-mail address) corresponding to each class of unique identifier is of a predefined format. For example, in one implementation the predefined format for an electronic address based upon a street address is STREETADDRESS.CITY.STATE@BUMP.COM, the predefined format for an electronic address based upon a VIN is 123456768901234567@VIN.BUMP.COM, the predefined format for an electronic address based upon a passport number is COUNTRY.PASSPORTNUMBER@PASSPORT.BUMP.COM, and so on.

In another aspect the disclosure relates to a computer-implemented method for facilitating electronic communication using unique identifiers. The method includes establishing an electronic repository in which a plurality of unique identifiers are respectively associated with a corresponding plurality of profiles. The method further includes receiving an electronic message having an address based upon at least one identifier of the plurality of unique identifiers. The message information included within the electronic message is then stored in association with a profile included within the plurality of profiles wherein the at least one identifier is associated with the profile. The method also includes receiving a request to access to the message information and verifying legitimacy of the request.

In another aspect, the disclosure relates to a computer-implemented method for facilitating electronic communication which includes receiving message information. The method includes receiving a unique identifier corresponding to an electronic address wherein the unique identifier is formatted consistent with predefined identifier format included among a plurality of predefined identifier formats. The method further includes sending an electronic message to the electronic address.

In another aspect, the disclosure relates to a computer-implemented method for facilitating electronic communication which includes receiving message information. The method includes receiving a unique identifier corresponding to an electronic address wherein the unique identifier is formatted consistent with predefined identifier format included among a plurality of predefined identifier formats. The method further includes sending, to the electronic address, a notification relating to the message information.

In another aspect, the disclosure relates to a computer-implemented method for facilitating electronic communication. The method includes receiving first message information receiving a first unique identifier corresponding to a first electronic address wherein the first unique identifier is formatted consistent with a first predefined identifier format. The method further includes receiving second message information and a second unique identifier corresponding to a second electronic address, wherein the second unique identifier is formatted consistent with a second predefined identifier format. The method also includes sending the first message information to the first electronic address and the second message information to the second electronic address.

In another aspect, the disclosure relates to a computer program product comprising a computer-readable medium including codes for causing a computer to establish, at a server system, an electronic repository in which a plurality of unique identifiers are respectively associated with a corresponding plurality of profiles; receive an electronic message having an address based upon at least one identifier of the plurality of unique identifiers; store message information included within the electronic message in association with a profile included within the plurality of profiles wherein the at least one identifier is associated with the profile; receive a request to access to the message information; and verify legitimacy of the request.

In another aspect, the disclosure relates to a computer program product comprising a computer-readable medium including codes for causing a computer to scan a barcode; determine, from the barcode, a unique identifier corresponding to an electronic address; receive message information; and send an electronic message containing the message information to the electronic address.

Additional aspects, details, features and functions are further described below in conjunction with the appended drawings.

BRIEF DESCRIPTION OF DRAWINGS

For a better understanding of the nature and objects of various embodiments of the invention, reference should be made to the following detailed description taken in conjunction with the accompanying drawings, wherein.

Figure 1:
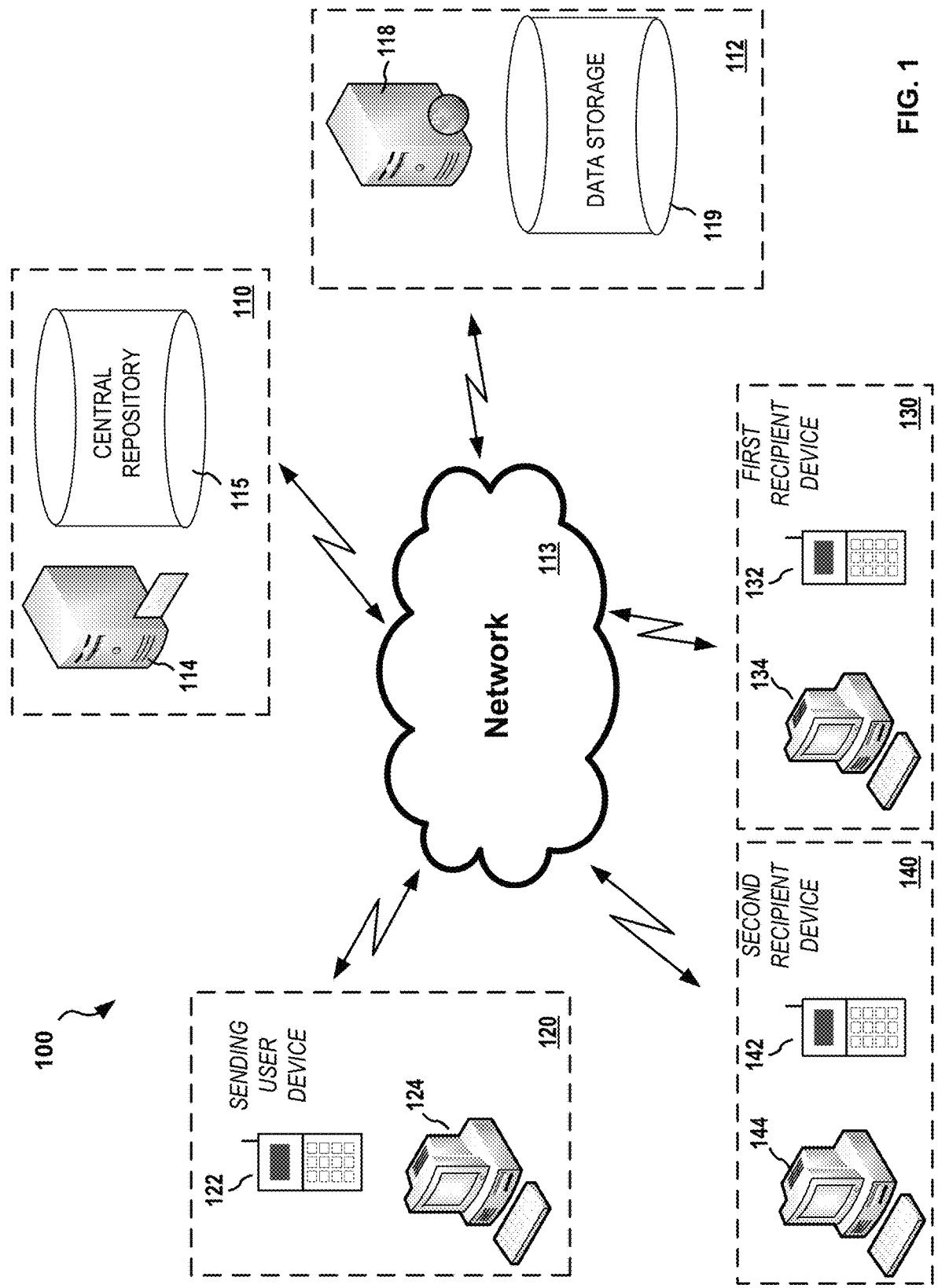
FIG. 1 illustrates an exemplary system in which various embodiments in accordance with the disclosure may be implemented.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In general, this disclosure describes a method and system for electronically communicating with a user or users knowing only a unique identifier associated with that user or users. An electronic message having an address based upon the unique identifier and consistent with an assigned convention is sent from a portable or other electronic device and received by a server system. The sending device could comprise, for example, a computer terminal, a cell phone, a tablet, an iPad, an iPod, a conventional telephone, a facsimile machine, and the equivalent. The message sent may include attachments such as, for example, pictures, audio and/or video files. The server system includes or is capable of accessing an electronic repository in which a plurality of unique identifiers are respectively associated with a corresponding plurality of profiles. Upon receipt at the server system, the message and any attachments are stored in association with a profile corresponding to the unique identifier. The server system then facilitates access to the message information and any attachments in accordance with the profile. For example, the server system may send the message information and attachments to one or more e-mail addresses and/or to user accounts maintained by one or more social networking platforms. Alternatively or in addition, the server system could facilitate access to the message information by providing appropriate notification to one or more electronic devices or electronic accounts. Following such notification the intended recipient(s) could then either check their respective electronic accounts for communications containing the message information or otherwise access the message information through a web site or stored message server.

The server system may comprise one or more servers or other computer systems that may be integral or distributed. The server system may be configured to provide one or more modules for performing the various processes, methods, stages, steps and/or other functions as further described herein, which may be implemented in hardware, software, firmware or combinations of these. The server system may include or be connected to one or more databases on which application data and information, such as, for example, user information, information relating to unique identifiers and associated profile information, and/or other information may be stored.

In accordance with one aspect, a user may enter an electronic address containing a unique identifier into an e-mail or other messaging client executing on the user's mobile or other electronic device. This electronic address will preferably be of a predefined format consistent with the type of unique identifier being utilized. For example, in the case in which a user is attempting to send a message to a street address for receipt by an individual or entity rightfully associated with the street address, the predefined format or convention of the electronic address could be STREETADDRESS.CITY.STATE@BUMP.COM. In the case in which a user is attempting to send a message to a VIN for receipt by an individual or entity rightfully associated with the vehicle corresponding to the VIN, the predefined format or convention of the electronic address could be, for example, 123456768901234567@VIN.BUMP.COM, where the numerical string "123456768901234567" represents the particular VIN.

In other embodiments an application on a user's mobile device may be configured to capture an image, such as an image of a barcode, QR code or other machine-readable-representation of a unique identifier, and automatically generate an electronic address corresponding to such a unique identifier. In other embodiments a user's mobile device may be adapted to electronically read the unique identifier using other technological means (e.g., using RFID or NFC techniques).

The user could then enter message information and the electronic address into, for example, an e-mail client. Alternatively, the application could automatically create an addressed message template (or invoke an e-mail or other messaging client to create such an addressed message template) and provide the user the opportunity to enter desired message information into the body portion of the addressed message template.

In one embodiment the server system includes a mail server for receiving the electronic message sent by the portable or other electronic device. The mail server may function as a central repository for receiving all the electronic messages sent to the fully qualified domain name used in the electronic address. The server system may also include a web server configured to host a computer readable script for pulling all messages directed to the fully qualified domain name mail inbox. A computer readable script will also generally determine if the message was sent using a valid unique identifier convention. A computer readable script also separates out the unique identifier and processes the message body. A computer readable script further determines if the message includes any attachments (i.e. audio, picture, video). A computer readable script processes the attachments. A computer readable script uploads any attachments to a data storage web server.

A computer readable script determines if there is an existing profile in the database hosted on a web server. If a profile does not exist in the database matching the unique identifier, then a computer readable script creates a profile in the database. The message information is then stored in the database and associated to the unique identifier profile in the database. A recipient user claims the message by, for example, electronic certification of being the rightful holder of the unique identifier. A computer readable script can match data of the rightful holder associated name and the unique identifier to other existing data stored on a web server that further verifies that the recipient user is the actual rightful holder of the unique identifier.

Attention is now directed to FIG. 1, which illustrates details of a system 100 in which various embodiments may be implemented. System 100 includes a server system comprised of a mail server system 110 and a web server system 112 communicatively coupled to a network 113. The network 113 may be comprised of various data and/or telecommunications networks. The system 100 further includes a sending user device 120 as well as user devices associated with one or more message recipients, such as a first recipient user device 130 and a second recipient user device 140. The sending user device 120 may comprise, for example, a mobile device 122, personal computer 124, or other device capable of electronic communication. Similarly, the first recipient user device 130 may comprise, for example, a mobile device 132, personal computer 134, or other device capable of electronic communication. Likewise, the second recipient user device 140 may comprise, for example, a mobile device 142, personal computer 144, or other device capable of electronic communication.

In one embodiment the mail server system 110 includes a mail server 114 and a central repository 115 designed to hold messages received from a sending user device 120. The web server system 112 may include a web server 118 and associated data storage 119. Various other elements (not shown) may be included in system 100, including multiple other users and their associated mobile (or fixed) devices, as well as other interconnected systems, such as databases, record storage sites or data warehouses, or systems associated with other social networking systems.

In operation, the sending user device 120 sends, to the mail server 114, message information targeted to a unique identifier associated with one or more recipient user devices such as the first recipient user device 130 and/or the second recipient user device 140. For example, the sending user device 120 may send, to the mail server 114, an e-mail message having an address directed to a specific domain name (e.g., BUMP.COM, VIN.BUMP.COM, ISBN.BUMP.COM, PATENT.BUMP.COM, RFID.BUMP.COM, GPS.BUMP.COM, etc.) and containing one of the above-referenced unique identifiers. In some implementations, the message information within such an e-mail message may be stored in the central repository 115 until such time as the recipient user device creates an account or otherwise interacts with web server system 112, such as by accessing a web page provided by or from web server 118.

In one embodiment the web server 118 is configured to host a computer readable script for pulling from the central repository 115 all messages directed to one or more specific domain names. A computer readable script executed by the web server 118 may also generally determine if the message was sent using a valid unique identifier convention. A computer readable script running on the web server 118 may also separate out the unique identifier and process the message body. A computer readable script executed by the web server 118 further determines if the message includes any attachments (i.e. audio, picture, video). A computer readable script processes the attachments and stores them within data storage 119.

A computer readable script executed by the web server 118 determines if an existing profile within data storage 119 is associated with the unique identifier in the message sent by the sending user device 120 and received by the mail server 114. If a profile does not exist in the database matching this unique identifier, then a computer readable script executed by the web server 118 creates a profile in a database within the data storage 119. The message information is then stored in the database and associated to the unique identifier profile in the database. A recipient user claims the message by, for example, electronic certification of being the rightful holder of the unique identifier. A computer readable script can match data of the rightful holder associated name and the unique identifier to other existing data stored on a web server that further verifies that the recipient user is the actual rightful holder of the unique identifier.

Figure 2:
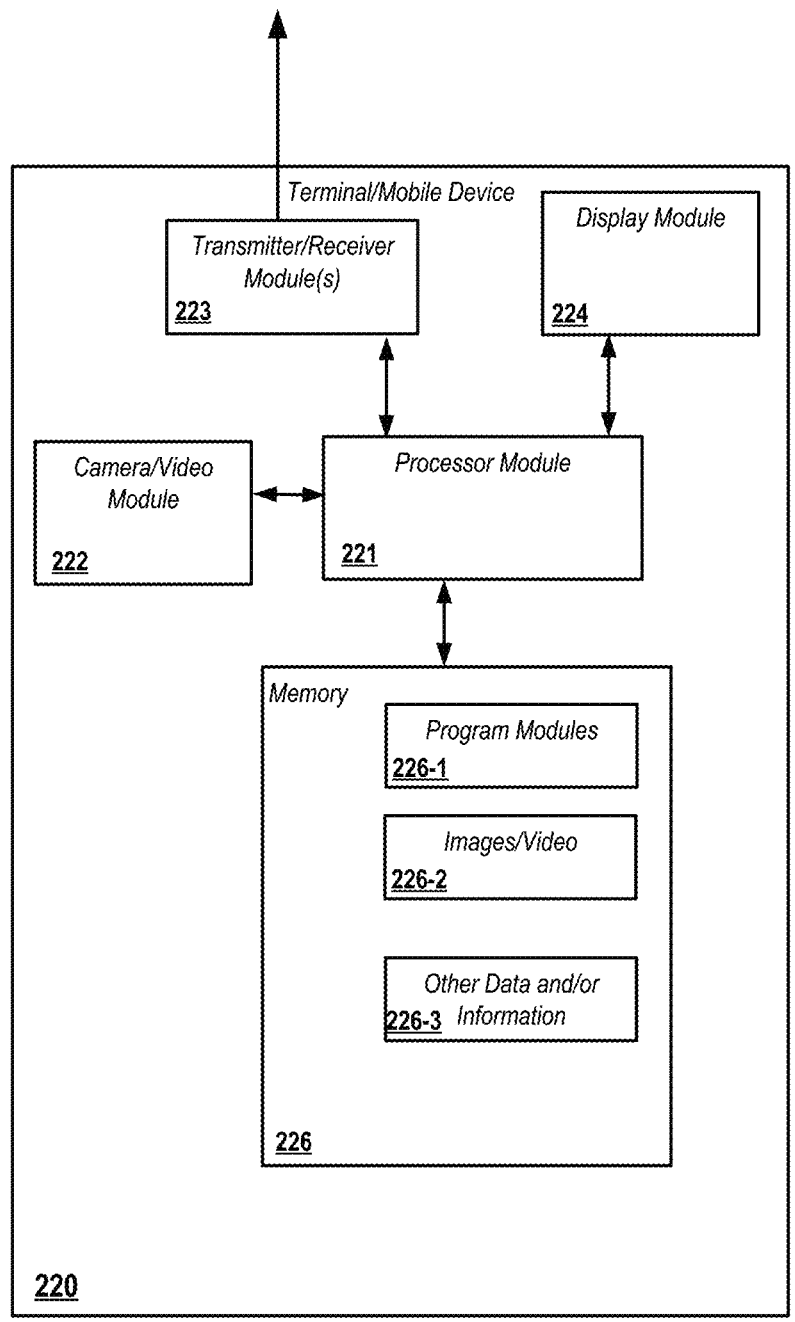
FIG. 2 illustrates an exemplary device configuration for a mobile device on which may be implemented various embodiments in accordance with the disclosure.

FIG. 2 illustrates details of an embodiment of a mobile device 220, which may, for example, correspond to mobile devices 122, 132, 142 as shown in FIG. 1. In an exemplary embodiment, mobile device 220 includes one or more application programs that implement the various mobile device functions as further described herein. The application program may be in the form of a computer readable medium including instructions for execution on one or more processors of the mobile device, such as processor module 221. The instructions may be stored in a memory 226 of the mobile device, and corresponding display and interaction screens may be presented on display module 224. A transmitter/receiver module 223 may be includes to provide connectivity between mobile device 220 and a server system, such as mail server 114 or web server 118 of FIG. 1. In addition, a camera/video module 222 may be included in mobile device 120. The application program(s) may use the camera module to capture images or video, such as images or video of unique identifier information (whether in plain text or encoded in a barcode or other encoded representation). The application programs may further include modules configured to process the images to generate information such as, for example, the unique identifier or a blank e-mail message template addressed to an electronic address corresponding to the unique identifier. Alternately or in addition, this unique identifier information may be input by a user as part of an e-mail address or other electronic address comporting with a predefined convention.

Figure 3:
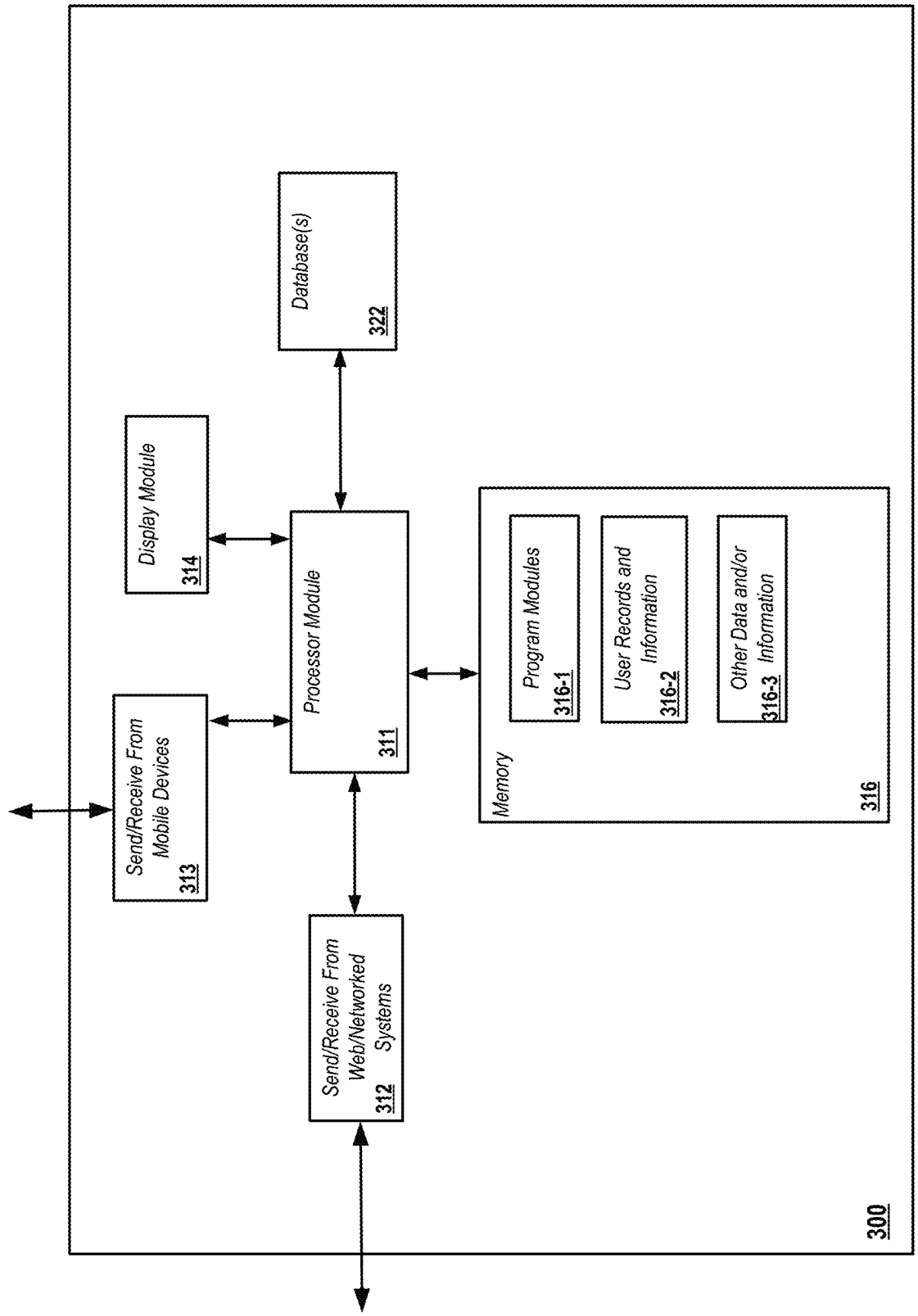
FIG. 3 illustrates an exemplary server configuration on which may be implemented various embodiments in accordance with the disclosure.

Attention is now directed to FIG. 3, which illustrates details of an embodiment of a server 300, such as mail server 114 or web server 118 of FIG. 1. Server 300 may include a processor module 311 and associated program modules 316-1 configured to perform the various functions as described further herein. In addition, server 300 may include one or more display modules 314, and one or more send/receive modules configured to send and/or receive information from users, such as from the users' computer systems. In addition, server 300 may include a send/receive module 313 configured to send and/or receive information to mobile devices 122, 132, 142.

Referring again to FIG. 1, in one embodiment the central repository 115 includes a plurality of unique identifiers respectively associated with a corresponding plurality of electronic addresses. Each such electronic address may comprise, for example, an electronic mail address (e.g., AZ.PL8STR@BUMP.COM), an SEO-optimized posting on a website, a computer-generated URL (e.g., http://bump.com/AZ/PL8STR), an instant messaging chat address (e.g., Skype®), a phone number associated for direct call or text message, an associated social networking identity (e.g., Facebook®, MySpace®, Ebay®), or an electronic link to online information associated with the unique identifier (e.g., an electronic link to a profile, to other links, to information associated with the make/model/year of a car, to insurance information, to VIN information, or to mechanic information).

The mail server system 110 and web server system 112 may cooperate in order to facilitate access to message information sent by a sending user device 120 to an electronic address embodying a unique identifier associated with one or more recipient user devices. Such access may be facilitated by, for example, storing and/or forwarding the message information (e.g., text, audio, picture, and/or video) in full or in abbreviated form using one or more of the following approaches:

1. Storing the message information on a web-based stored messaging system.
2. Forwarding/associating the message information to a recipient registered email address.
3. Forwarding/associating the message information to an instant messenger platform.
4. Forwarding/associating the message information to a text based messaging platform.
5. Forwarding/associating the message information to a telephone number.
6. Forwarding/associating the message information to a social networking platform.
7. Forwarding/associating the message information to an electronic news feed.
8. Forwarding/associating the message information to a micro-blogging service.
9. Forwarding/associating the message information to an Internet-connected mobile application.
10. Posting the message information to a website.
11. Printing the message information and forwarding via postal mail.
12. Creating a hyperlink corresponding to that message information.
13. Providing related data corresponding to the unique identifier; a user is presented with a graphical display on a website or on a mobile device and/or a phone prompt for audio ratings.

14. Providing the message information to a web-based (or cloud-based) stored voicemail messaging system.

In one embodiment the profile associated with a particular unique identifier may map the identifier to, or otherwise associate the identifier with, certain defined regions, segments, areas, area codes. For example, a unique identifier could be associated with all unique physical addresses within a select zip code. Similarly, the identifier could be associated with all unique phone numbers in a select area code. In another example, the identifier could be mapped to a subset of the license plate numbers in a given state (e.g., to the alphanumeric license plate codes assigned to government-owned vehicles, to the license plate codes assigned to vehicles within a particular county, or to the license plate codes assigned to taxis or other commercial vehicles).

As an example of a potential application of the messaging infrastructure and methods described herein, consider the case in which a car manufacturer desires to electronically deliver recall information to a car owner. Using a graphical display on an Internet-connected electronic device, the car manufacturer sends a communication access request relating to one of the VINs associated with the manufacturer. The communication access request relating to the VIN is received by a server, such as by the mail server 114. The legitimacy of the communication access request may then be validated and electronic communication established to an electronic address corresponding to the VIN. In one embodiment both the legitimacy of the communication access request originating from a sending device and a request to access the message information accompanying the access request are validated. In other embodiments only a request to access message information sent with respect to a particular identifier is validated.

In another embodiment the operators of an adventure park (e.g., LegoLand®) may desire to deliver an electronic coupon in bulk to all physical addresses in a select zip code range. Using a graphical display on an Internet-connected electronic device, the operators send a communication access request relating to all physical addresses in a select zip code. The communication access request relating to the plurality of physical addresses is received on a network-connected server (e.g., mail server 114) is received. The legitimacy of the communication access request sent from the Internet-connected device and/or a request by a recipient user device associated with a physical address in the select zip code range may then be validated in the manner described herein. Following such validation a server system (e.g., mail server 114 and/or web server 118) may then facilitate electronic communication of the electronic coupon to the electronic address corresponding to the validated physical address.

In another example, a postal Global Location Number could be used as a unique identifier or utilized in connection with a process of verifying the corresponding address consistent with the teachings herein.

The teachings herein could also be utilized by a governmental entity desiring to quickly deliver an alert message to a group of cell phone numbers. A government agency could, using a graphical display on an Internet-connected electronic device, issue a communication access request relating to a plurality of ESNs (Electronic Serial Numbers). The communication access request relating to the plurality of ESNs is received on a network-connected server (e.g., mail server 114) is received. The legitimacy of the communication access request sent from the Internet-connected device and/or a request by a recipient user device associated with one of the plurality of ESNs may then be validated in the manner described herein. Following such validation a server system (e.g., mail server 114 and/or web server 118) may then facilitate electronic communication of the alert message to each validated recipient electronic address.

Consider next an example in which the management of a retail store desires to communicate with persons shopping in their store. In this example the retail store would like to deliver a special coupon to each patron of the store for which a security camera has captured their facial image. In this example facial recognition software is used to capture the face of each patron thereby creating an associated unique identifier tag. An electronic repository is established in which a plurality of these facial recognition unique identifiers (i.e. numeric templates) are respectively associated with a plurality of electronic addresses. The store management could, using a graphical display on an Internet-connected electronic device, issue a communication access request relating to a particular one of the customer faces captured by the facial recognition software. The communication access request is received on a network-connected server (e.g., mail server 114) is received and the legitimacy of a request by a recipient user device is validated (e.g., by matching against a facial recognition database). Following such validation a server system (e.g., mail server 114 and/or web server 118) may then facilitate electronic communication to the electronic address corresponding to the user's face.

Figure 4A:
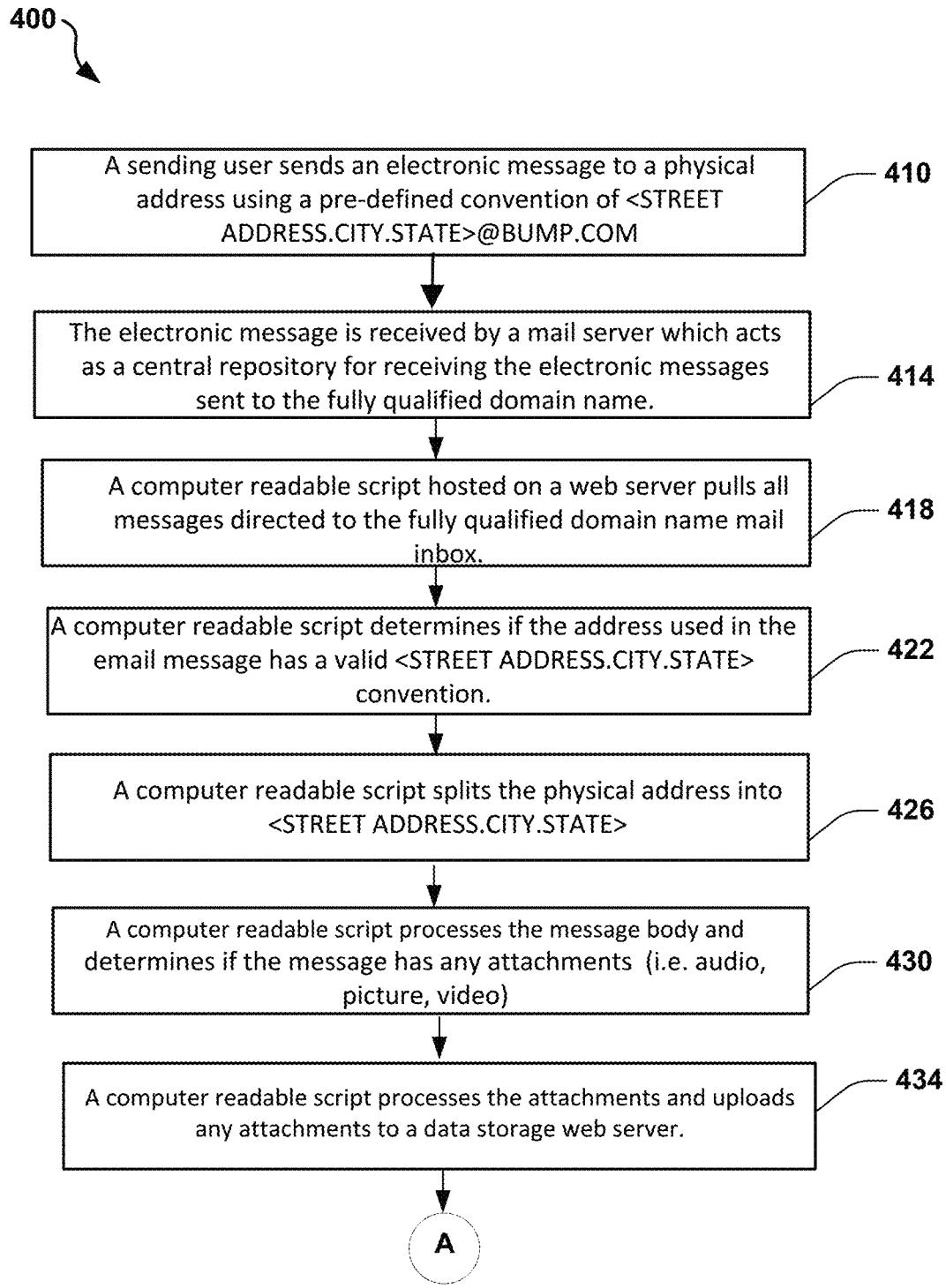
FIGS. 4A and 4B show an exemplary process for sending messages to one or more electronic addresses associated with a physical address.
Figure 4B:
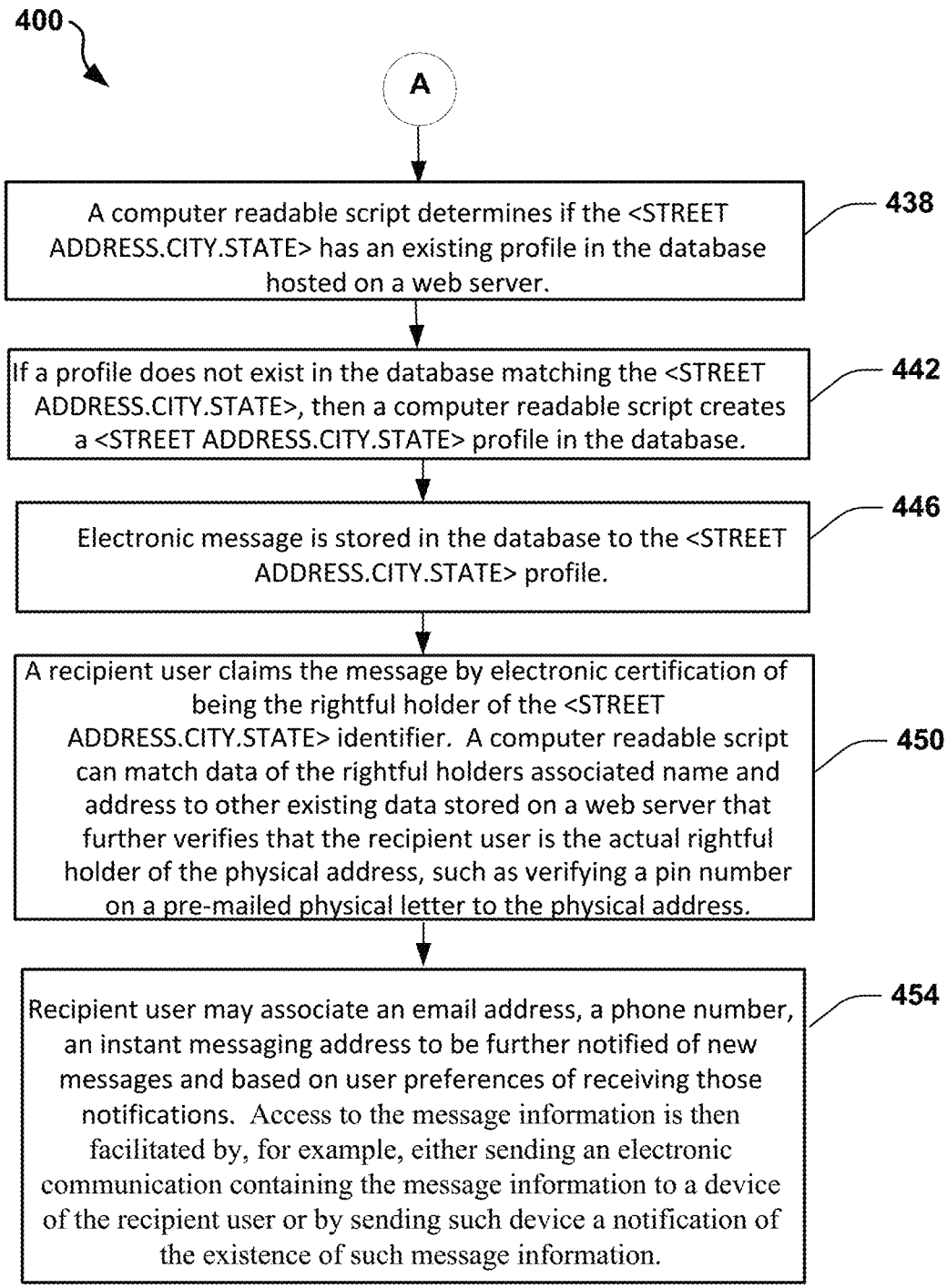

Attention is now directed to FIG. 4, which is a flow chart 400 representative of a process for sending messages to one or more electronic addresses associated with a physical address. In a stage 410 (FIG. 4A), a sending user sends an electronic message to a physical address using a pre-defined convention of <STREET ADDRESS.CITY.STATE>@BUMP.COM. The electronic message is received by a mail server acting as a central repository for receiving the electronic messages sent to the fully qualified domain name (stage 414). A computer readable script hosted on a web server pulls all messages directed to the fully qualified domain name mail inbox (stage 418). A computer readable script determines if the address used in the email message has a valid <STREET ADDRESS.CITY.STATE> convention (stage 422). A computer readable script splits the physical address into <STREET ADDRESS.CITY.STATE> (stage 426). In a stage 430, a computer readable script processes the message body and determines if the message has any attachments (i.e. audio, picture, video). A computer readable script then processes the attachments and uploads any attachments to a data storage web server (stage 434).

In a stage 438 (FIG. 4B), a computer readable script determines if the <STREET ADDRESS.CITY.STATE> has an existing profile in the database hosted on a web server. If a profile does not exist in the database matching the <STREET ADDRESS.CITY.STATE>, then a computer readable script creates a <STREET ADDRESS.CITY.STATE> profile in the database (stage 442). The electronic message is stored in the database to the <STREET ADDRESS.CITY.STATE> profile (stage 446). In a stage 450, a recipient user claims the message by electronic certification of being the rightful holder of the <STREET ADDRESS.CITY.STATE> identifier. A computer readable script can match data of the rightful holders associated name and address to other existing data stored on a web server that further verifies that the recipient user is the actual rightful holder of the physical address, such as verifying a pin number on a pre-mailed physical letter to the physical address. In a stage 454, a recipient user may associate an email address, a phone number, an instant messaging address to be further notified of new messages and based on user preferences of receiving those notifications. Access to the message information is then facilitated by, for example, either sending an electronic communication containing the message information (e.g., an e-mail message) to a device of the recipient user or by sending such device a notification of the existence of such message information. In the latter case the notification may include, for example, instructions relating to access to the message information and/or an electronic link to a network address at which the information is available.

Figure 5A:
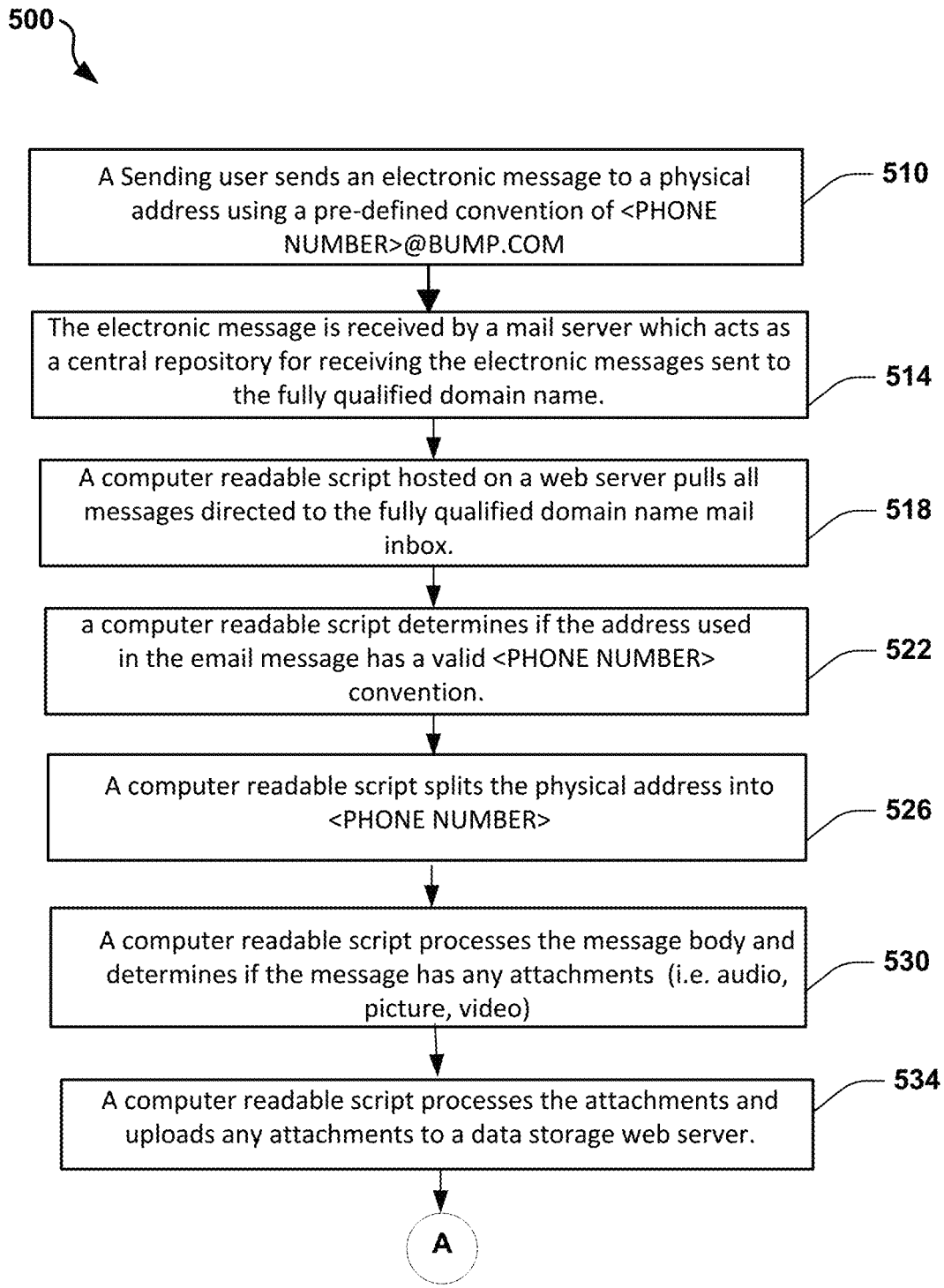
FIGS. 5A and 5B show an exemplary process for sending messages to one or more electronic addresses associated with a phone number.
Figure 5B:
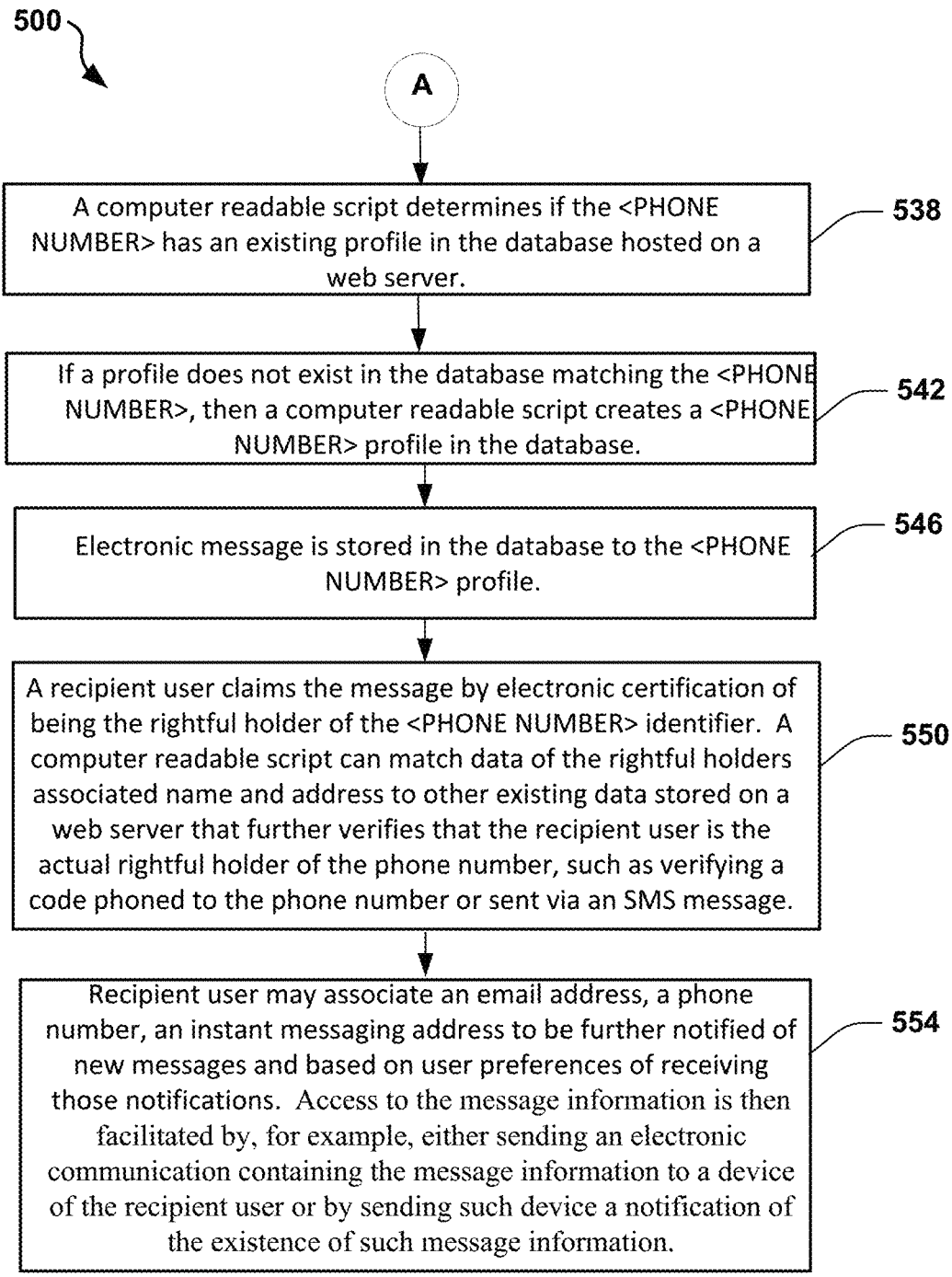

Attention is now directed to FIG. 5, which is a flow chart 500 representative of a process for sending messages to one or more electronic addresses associated with a phone number. In a stage 510 (FIG. 5A), a sending user sends an electronic message to a physical address using a pre-defined convention of <PHONE NUMBER>@BUMP.COM. The electronic message is received by a mail server acting as a central repository for receiving the electronic messages sent to the fully qualified domain name (stage 514). A computer readable script hosted on a web server pulls all messages directed to the fully qualified domain name mail inbox (stage 518). A computer readable script determines if the address used in the email message has a valid <PHONE NUMBER> convention (stage 522). A computer readable script splits the address into <PHONE NUMBER> (stage 526). In a stage 530, a computer readable script processes the message body and determines if the message has any attachments (i.e. audio, picture, video). A computer readable script then processes the attachments and uploads any attachments to a data storage web server (stage 534).

In a stage 538 (FIG. 5B), a computer readable script determines if the <PHONE NUMBER> has an existing profile in the database hosted on a web server. If a profile does not exist in the database matching the<PHONE NUMBER>, then a computer readable script creates a <PHONE NUMBER> profile in the database (stage 542). The electronic message is stored in the database to the <PHONE NUMBER> profile (stage 546). In a stage 550, a recipient user claims the message by electronic certification of being the rightful holder of the <PHONE NUMBER> identifier. A recipient user claims the message by electronic certification of being the rightful holder of the <PHONE NUMBER> identifier. A computer readable script can match data of the rightful holders associated name and address to other existing data stored on a web server that further verifies that the recipient user is the actual rightful holder of the phone number, such as verifying a code phoned to the phone number or sent via an SMS message.

In a stage 554, a recipient user may associate an email address, a phone number, an instant messaging address to be further notified of new messages and based on user preferences of receiving those notifications. Access to the message information is then facilitated by, for example, either sending an electronic communication containing the message information (e.g., an e-mail message) to a device of the recipient user or by sending such device a notification of the existence of such message information. In the latter case the notification may include, for example, instructions relating to access to the message information and/or an electronic link to a network address at which the information is available.

Figure 6:
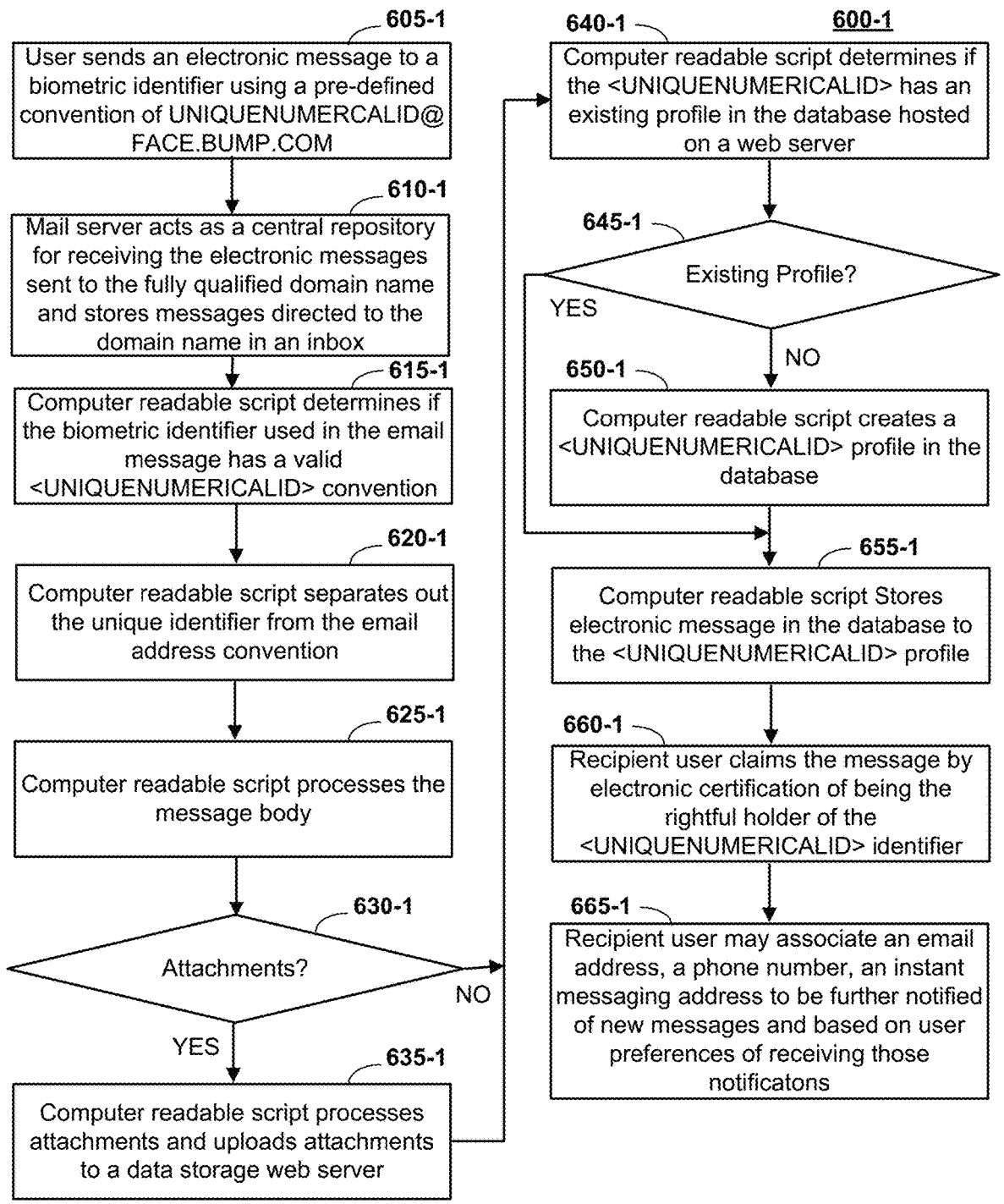
FIG. 6 shows an exemplary process for sending messages to one or more electronic addresses associated with a biometric identifier.

Attention is now directed to FIG. 6, which is a flow chart representative of a process 600-1 for sending messages to one or more electronic addresses associated with a biometric identifier. At a stage 605-1, a sending user sends an electronic message to a biometric identifier using a pre-defined convention of UNIQUENUMERCALID@FACE.BUMP.COM. At stage 610-1, the electronic message is received by a mail server acting as a central repository for receiving the electronic messages sent to the fully qualified domain name. Also at stage 610-1, a computer readable script hosted on a web server pulls all messages directed to the fully qualified domain name and stores them in a mail inbox. At stage 615-1, a computer readable script determines if the address used in the email message has a valid <UNIQUENUMERICALID> convention. At stage 620-1, a computer readable script splits the physical address into <UNIQUENUMERICALID>. At stage 625-1, a computer readable script processes the message body in order to determine if the message has any attachments (i.e. audio, picture, video). At decision block 630-1, if it is determined that the message has attachments, the process proceeds to stage 635-1 where a computer readable script then processes the attachments and uploads any attachments to a data storage web server. If there are no attachments, the process proceeds to stage 640-1.

At stage 640-1, a computer readable script determines if the <UNIQUENUMERICALID> has an existing profile in the database hosted on a web server. At decision block 645-1, if it is determined that a profile does not exist in the database matching the <UNIQUENUMERICALID>, then a computer readable script creates a <UNIQUENUMERICALID> profile in the database at stage 650-1, otherwise the process proceeds to stage 655-1. At stage 655-1, a computer readable script stores the electronic message in the database to the <UNIQUENUMERICALID> profile. At stage 660-1, a recipient user claims the message by electronic certification of being the rightful holder of the <UNIQUENUMERICALID> identifier. A computer readable script can match data of the rightful holder's associated name and address to other existing data stored on a web server that further verifies that the recipient user is the actual rightful holder of the physical address, such as verifying a pin number on a pre-mailed physical letter to the physical address. At stage 665-1, a recipient user may associate an email address, a phone number, an instant messaging address to be further notified of new messages and based on user preferences of receiving those notifications. Access to the message information is then facilitated by, for example, either sending an electronic communication containing the message information (e.g., an e-mail message) to a device of the recipient user or by sending such device a notification of the existence of such message information. In the latter case the notification may include, for example, instructions relating to access to the message information and/or an electronic link to a network address at which the information is available.

FIGS. 7-41 are flow charts representative of exemplary processes 600-2 through 600-36 for sending messages to electronic addresses associated with various different types of unique identifiers. The processes 600-2 through 600-36 are basically the same as the process 600-1 in FIG. 6, but using different conventions and identifiers.

Figure 7:
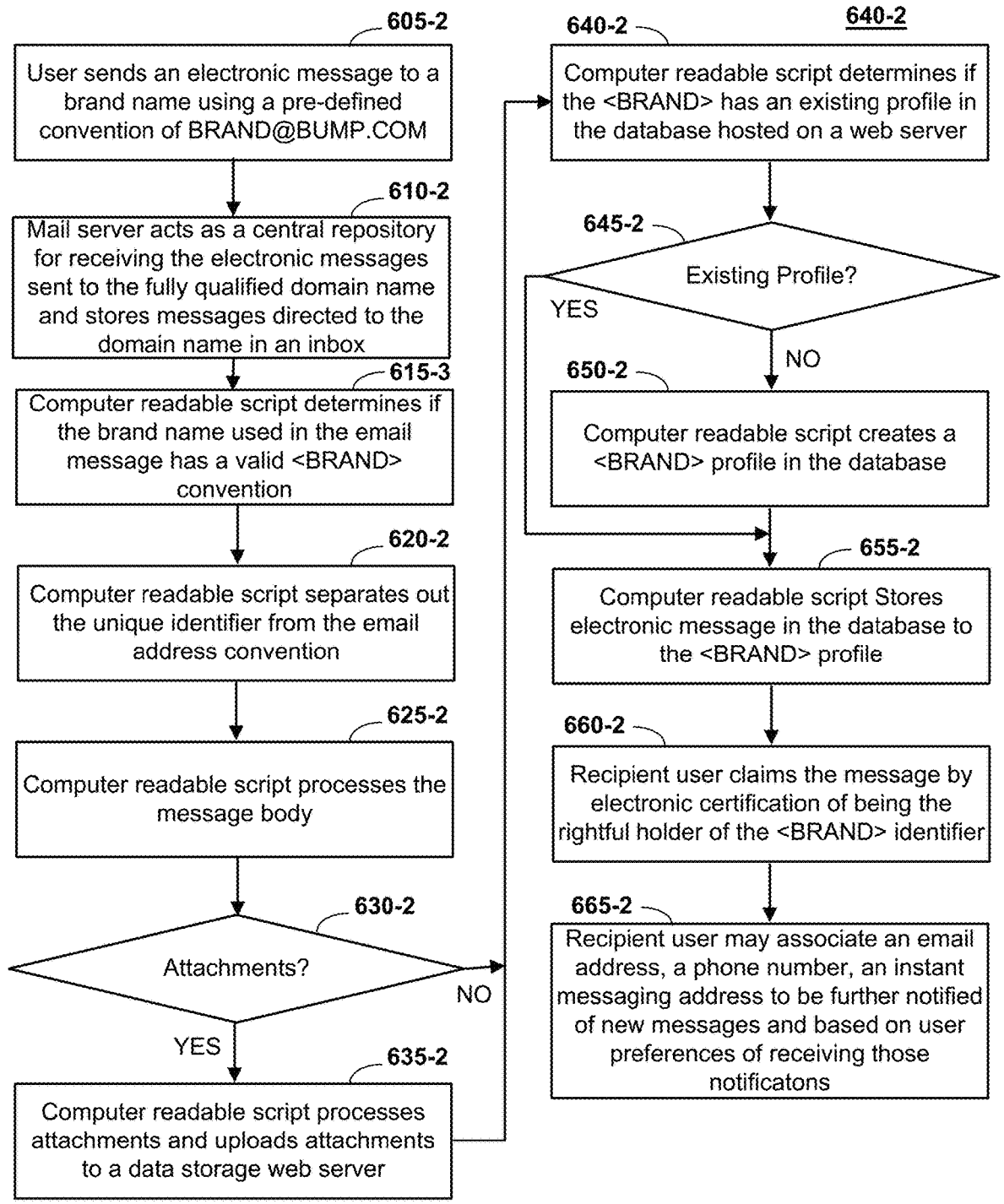
FIG. 7 shows an exemplary process for sending messages to one or more electronic addresses associated with a brand name.

FIG. 7 shows an exemplary process 600-2 for sending messages to one or more electronic addresses associated with a brand name.

Figure 8:
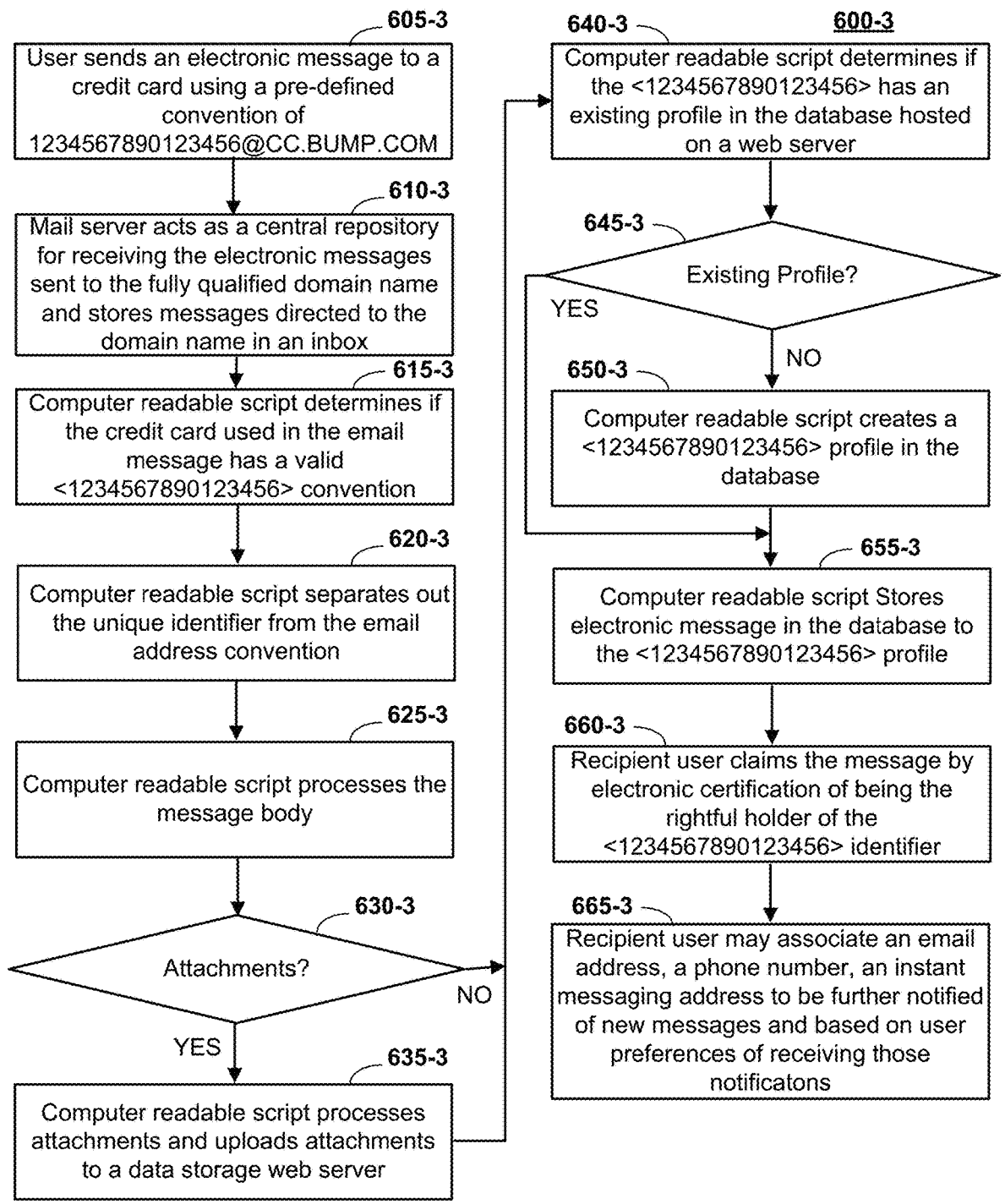
FIG. 8 shows an exemplary process for sending messages to one or more electronic addresses associated with a credit card number.

FIG. 8 shows an exemplary process 600-3 for sending messages to one or more electronic addresses associated with a credit card number.

Figure 9:
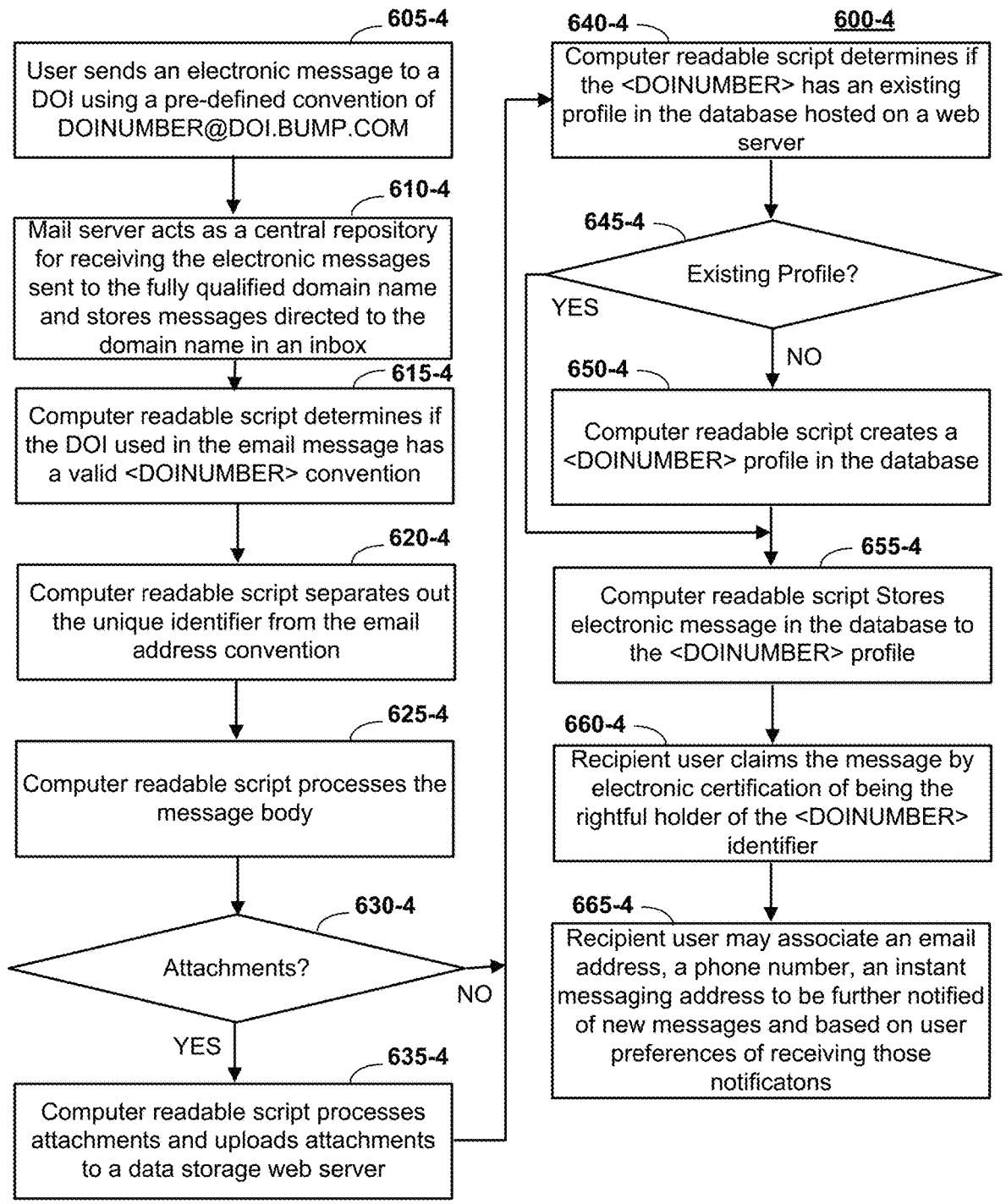
FIG. 9 shows an exemplary process for sending messages to one or more electronic addresses associated with a Digital Object Identifier (DOI)

FIG. 9 shows an exemplary process 600-4 for sending messages to one or more electronic addresses associated with a Digital Object Identifier (DOI).

Figure 10:
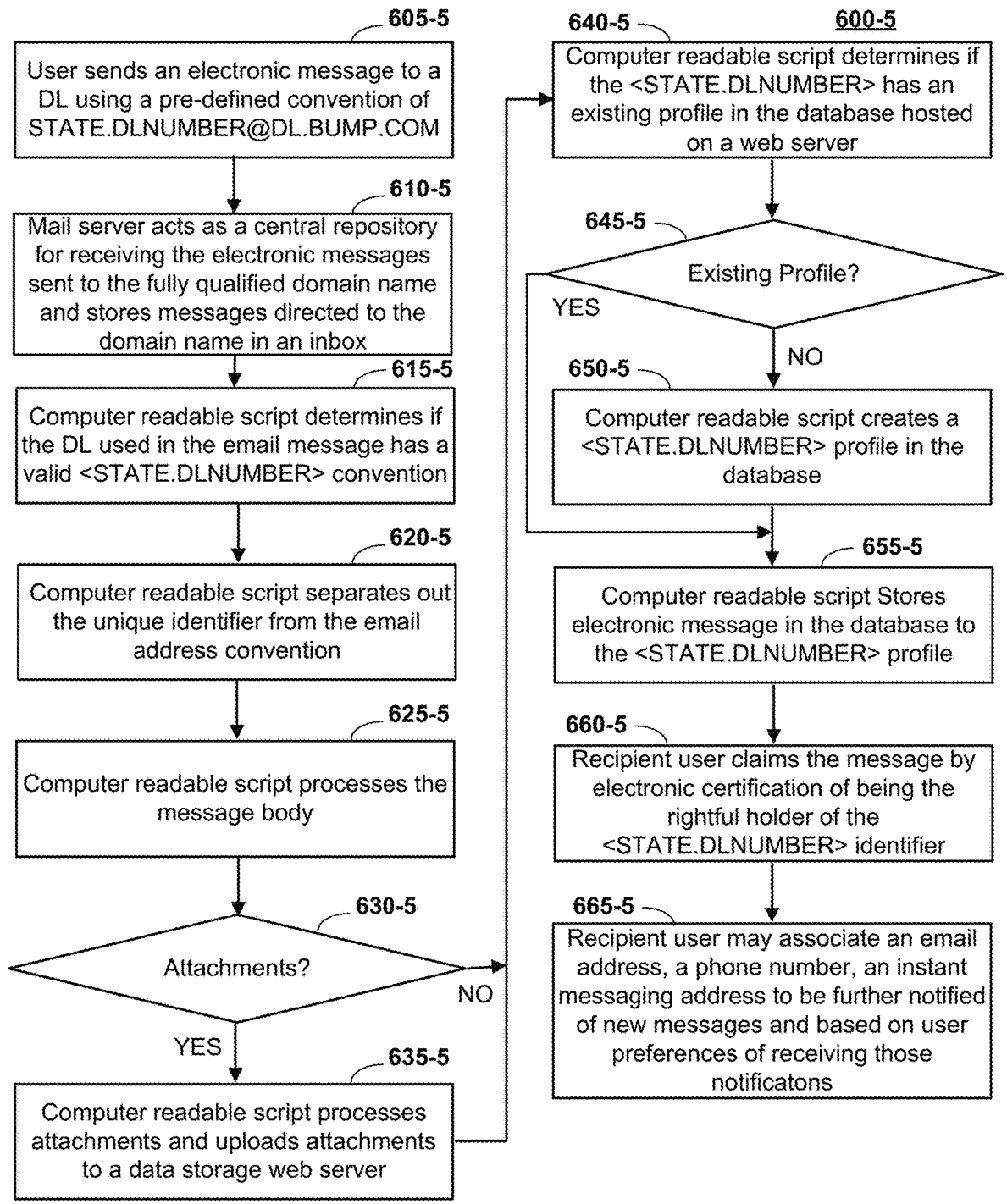
FIG. 10 shows an exemplary process for sending messages to one or more electronic addresses associated with a drivers license (DL)

FIG. 10 shows an exemplary process 600-5 for sending messages to one or more electronic addresses associated with a drivers license (DL).

Figure 11:
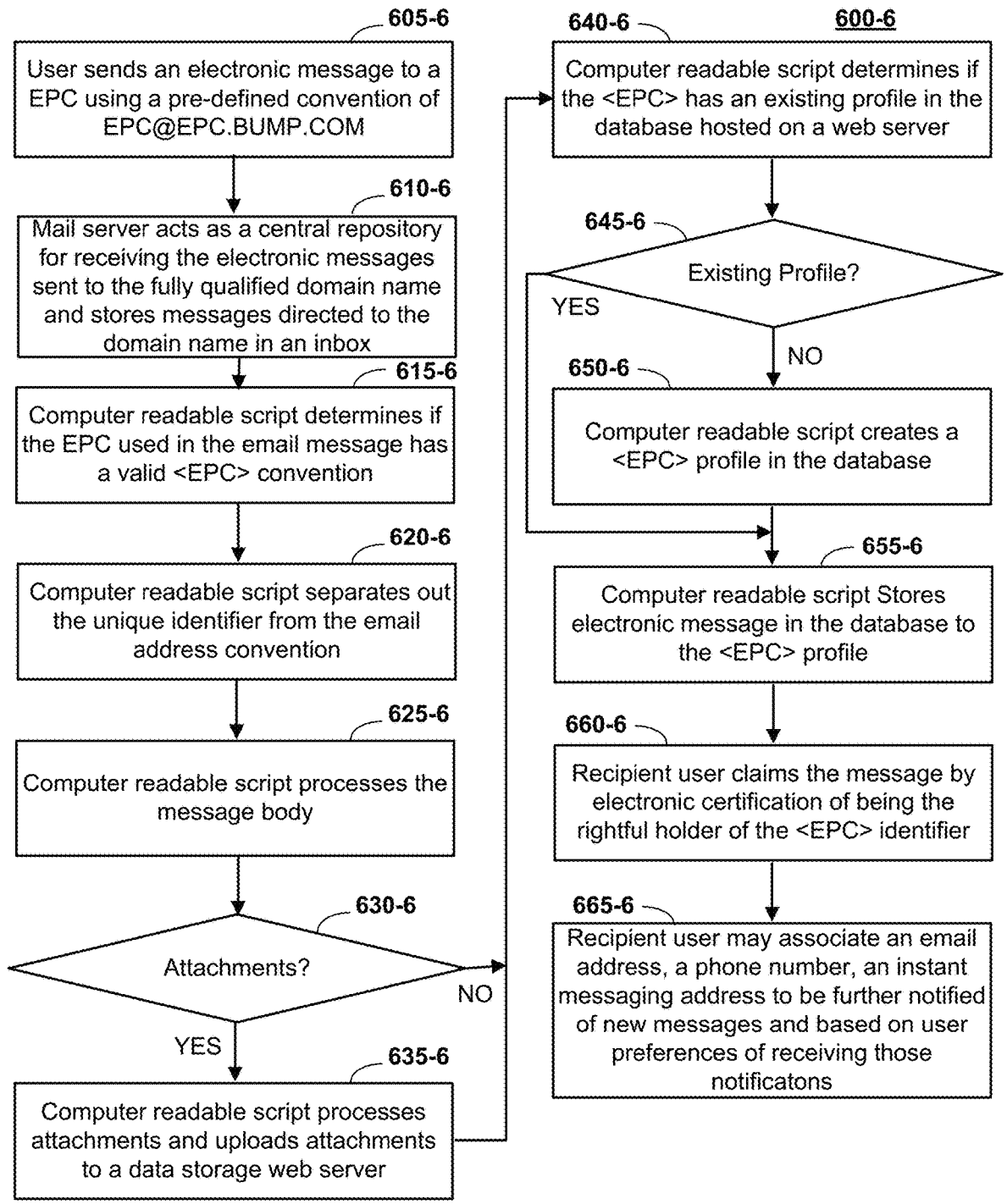
FIG. 11 shows an exemplary process for sending messages to one or more electronic addresses associated with an Electronic Product Code (EPC)

FIG. 11 shows an exemplary process 600-6 for sending messages to one or more electronic addresses associated with an Electronic Product Code (EPC).

Figure 12:
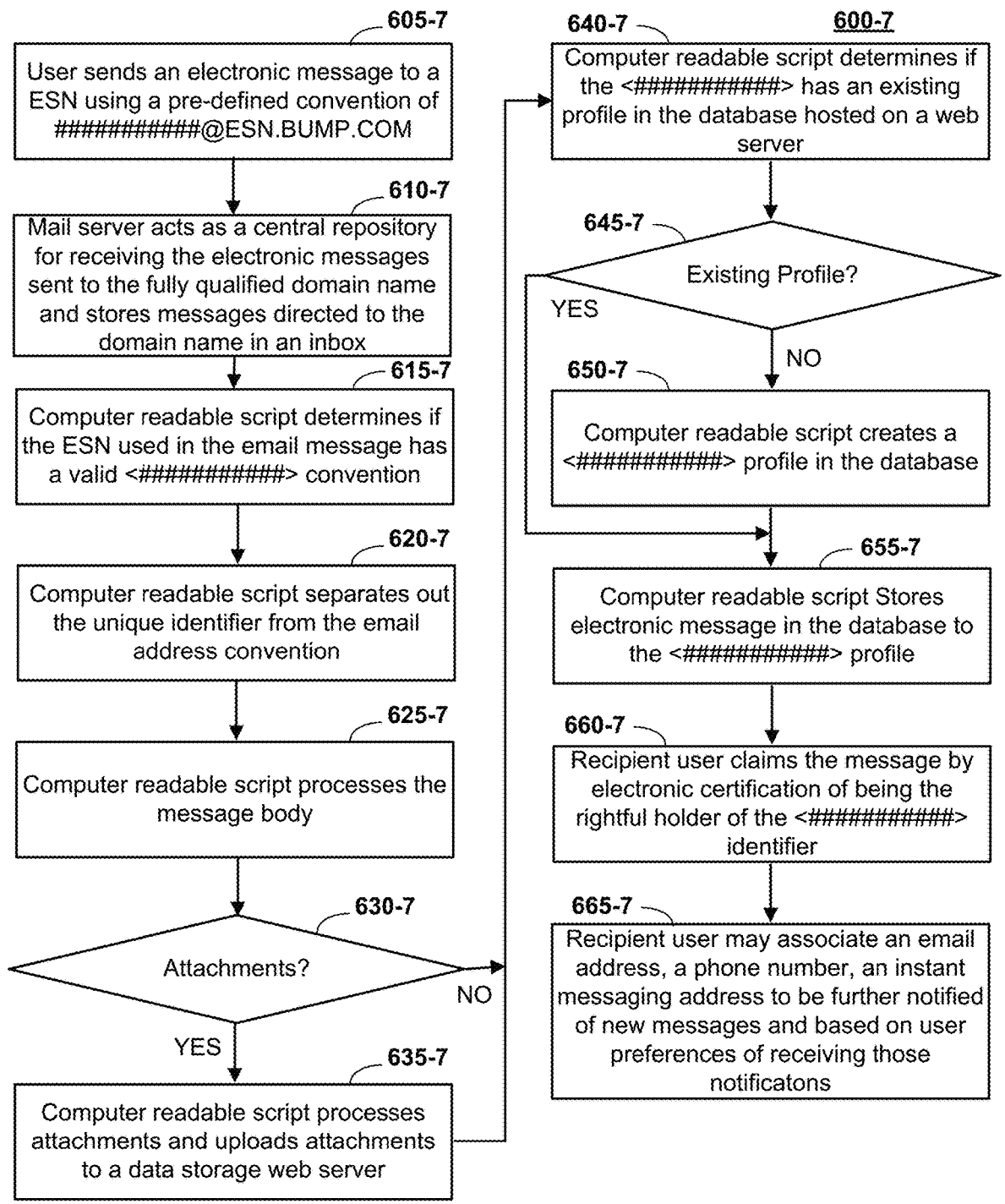
FIG. 12 shows an exemplary process for sending messages to one or more electronic addresses associated with an Electronic Serial Number (ESN)

FIG. 12 shows an exemplary process 600-7 for sending messages to one or more electronic addresses associated with an Electronic Serial Number (ESN).

Figure 13:
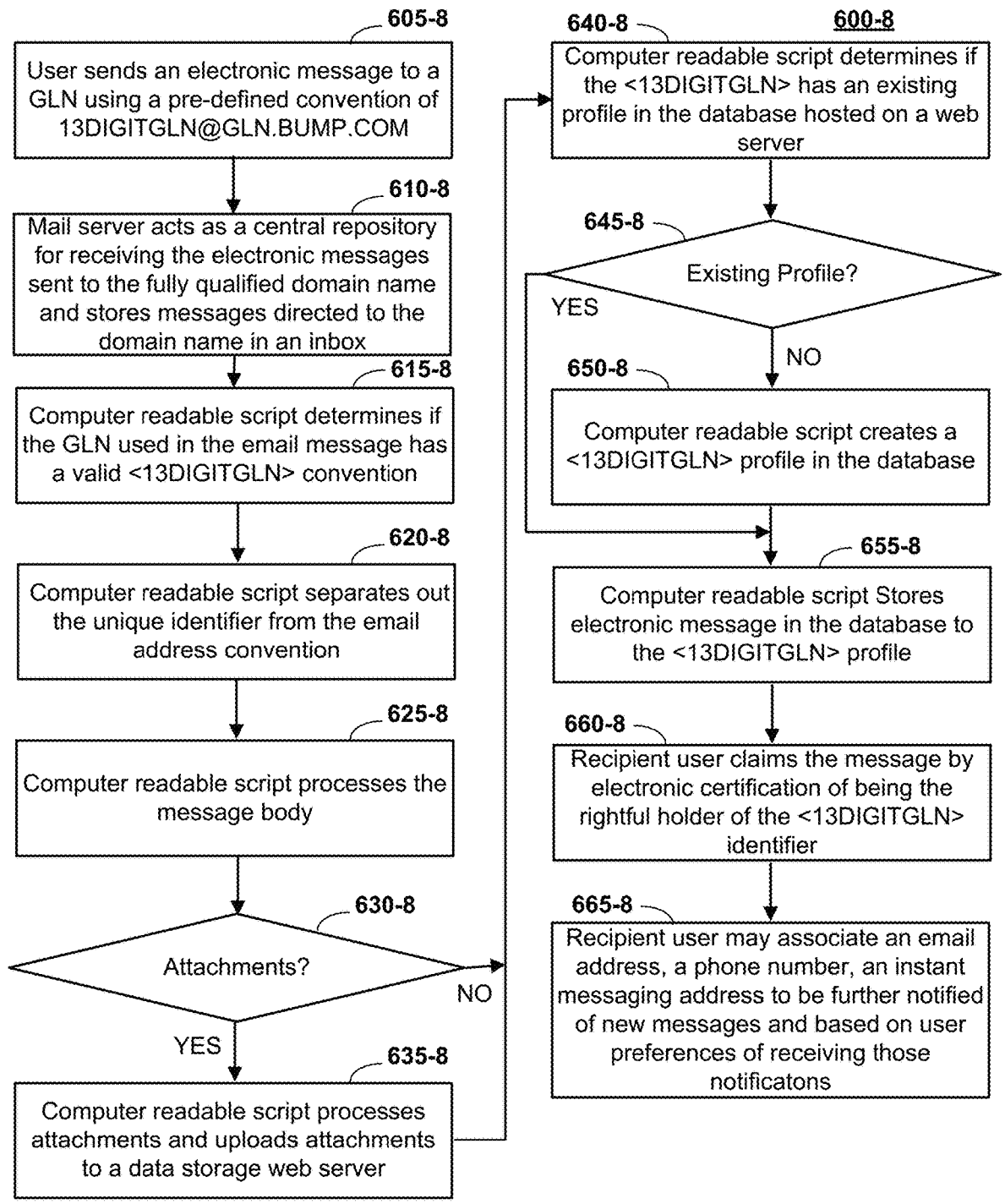
FIG. 13 shows an exemplary process for sending messages to one or more electronic addresses associated with a Global Location Number (GLN)

FIG. 13 shows an exemplary process 600-8 for sending messages to one or more electronic addresses associated with a Global Location Number (GLN).

Figure 14:
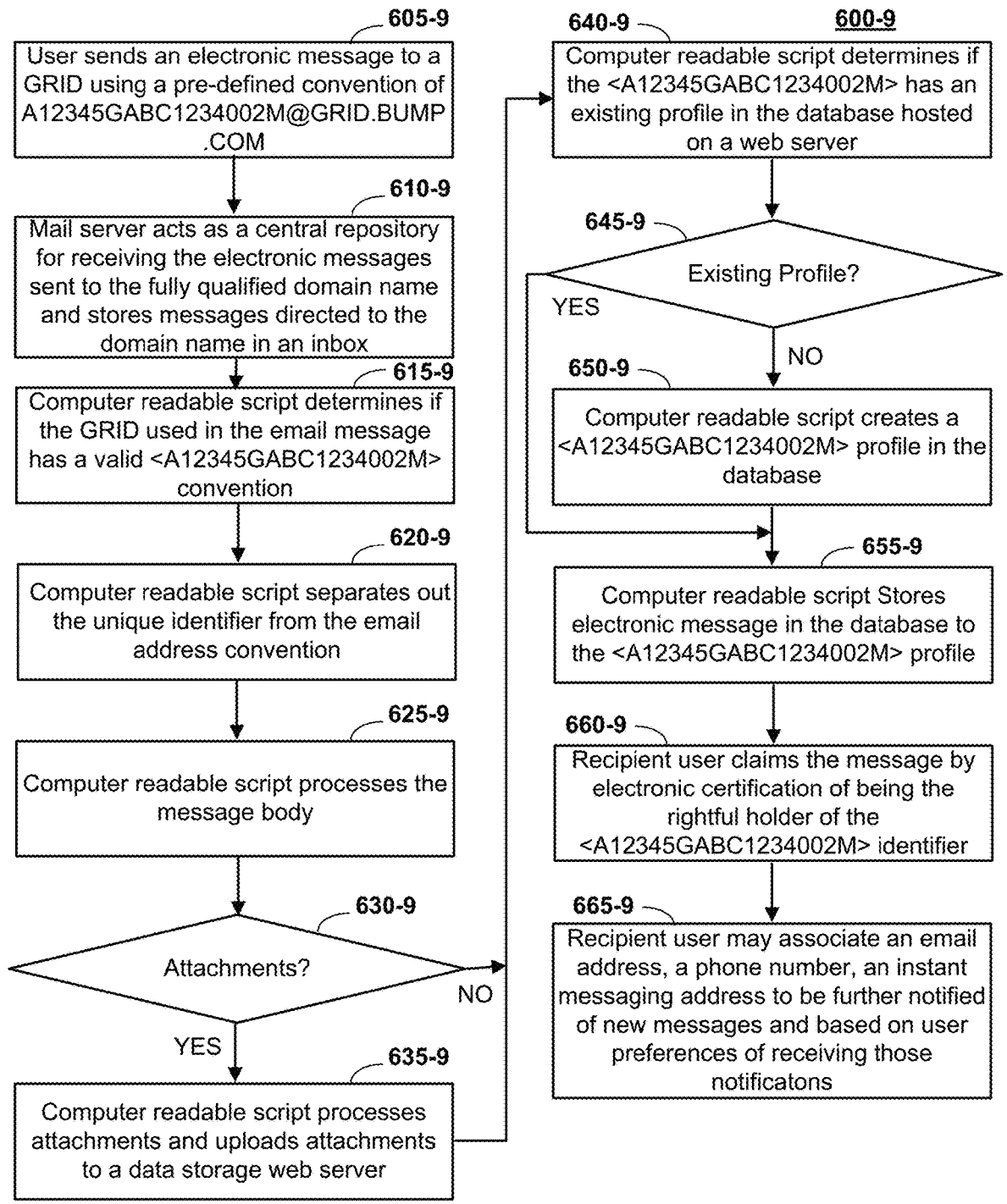
FIG. 14 shows an exemplary process for sending messages to one or more electronic addresses associated with a Global Release Identifier (GRID)

FIG. 14 shows an exemplary process 600-9 for sending messages to one or more electronic addresses associated with a Global Release Identifier (GRID).

Figure 15:
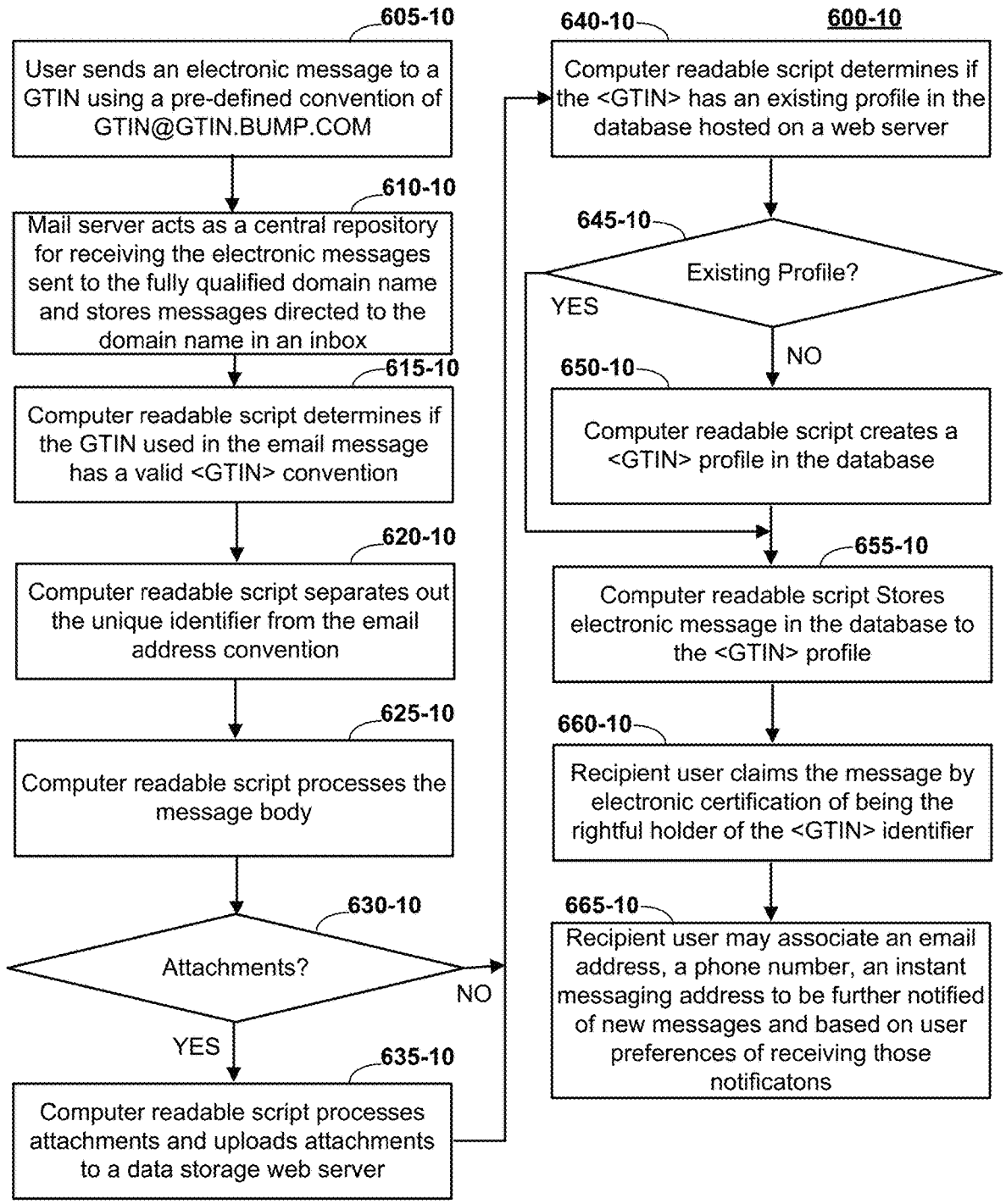
FIG. 15 shows an exemplary process for sending messages to one or more electronic addresses associated with a Global Trade Item Number (GTIN)

FIG. 15 shows an exemplary process 600-10 for sending messages to one or more electronic addresses associated with a Global Trade Item Number (GTIN).

Figure 16:
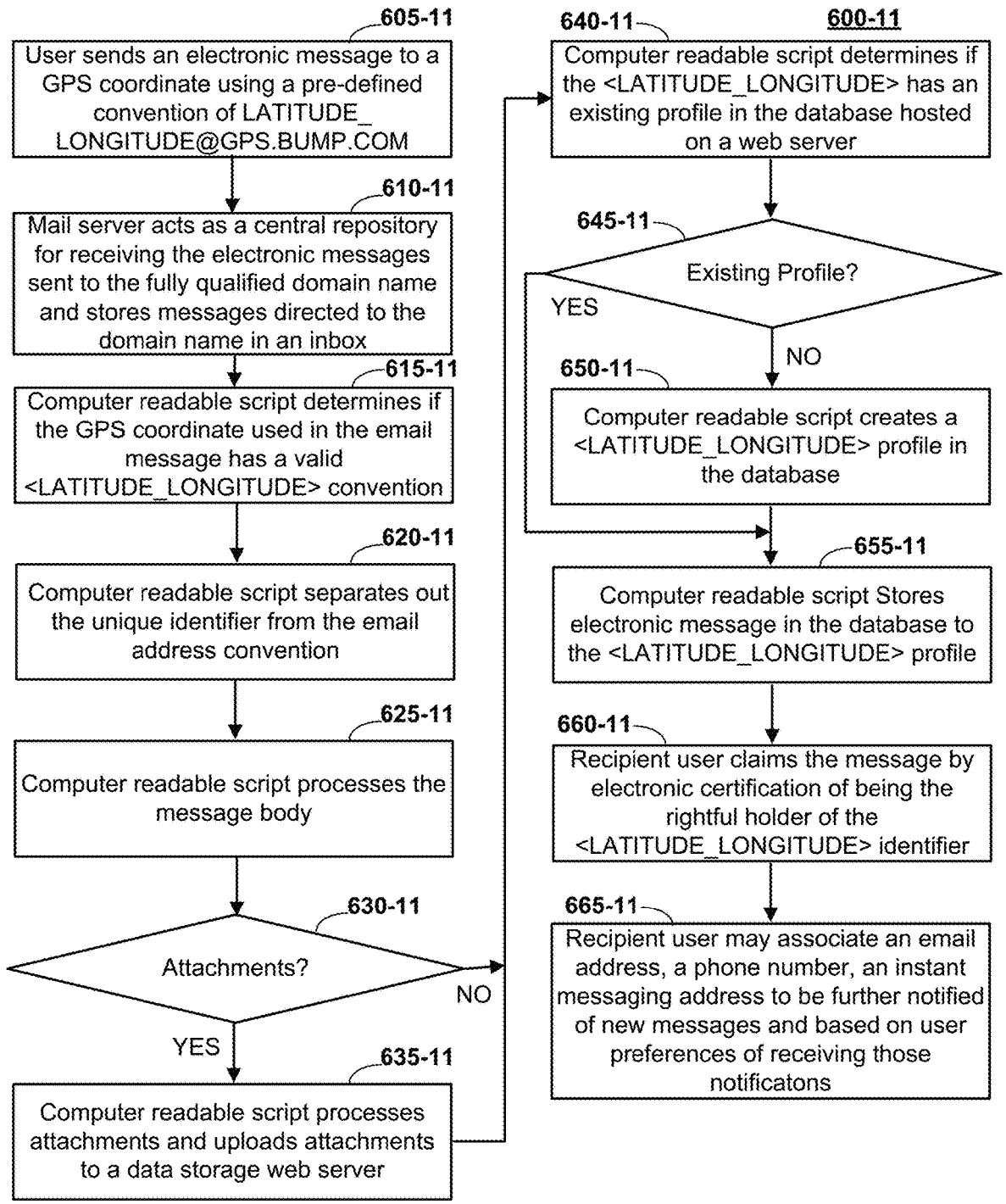
FIG. 16 shows an exemplary process for sending messages to one or more electronic addresses associated with a Global Positioning System (GPS) coordinate.

FIG. 16 shows an exemplary process 600-11 for sending messages to one or more electronic addresses associated with a Global Positioning System (GPS) coordinate. In other embodiments the electronic addresses could be associated with a specified latitude/longitude/elevation and/or a specified latitude/longitude/elevation/time rather than with GPS coordinates.

Figure 17:
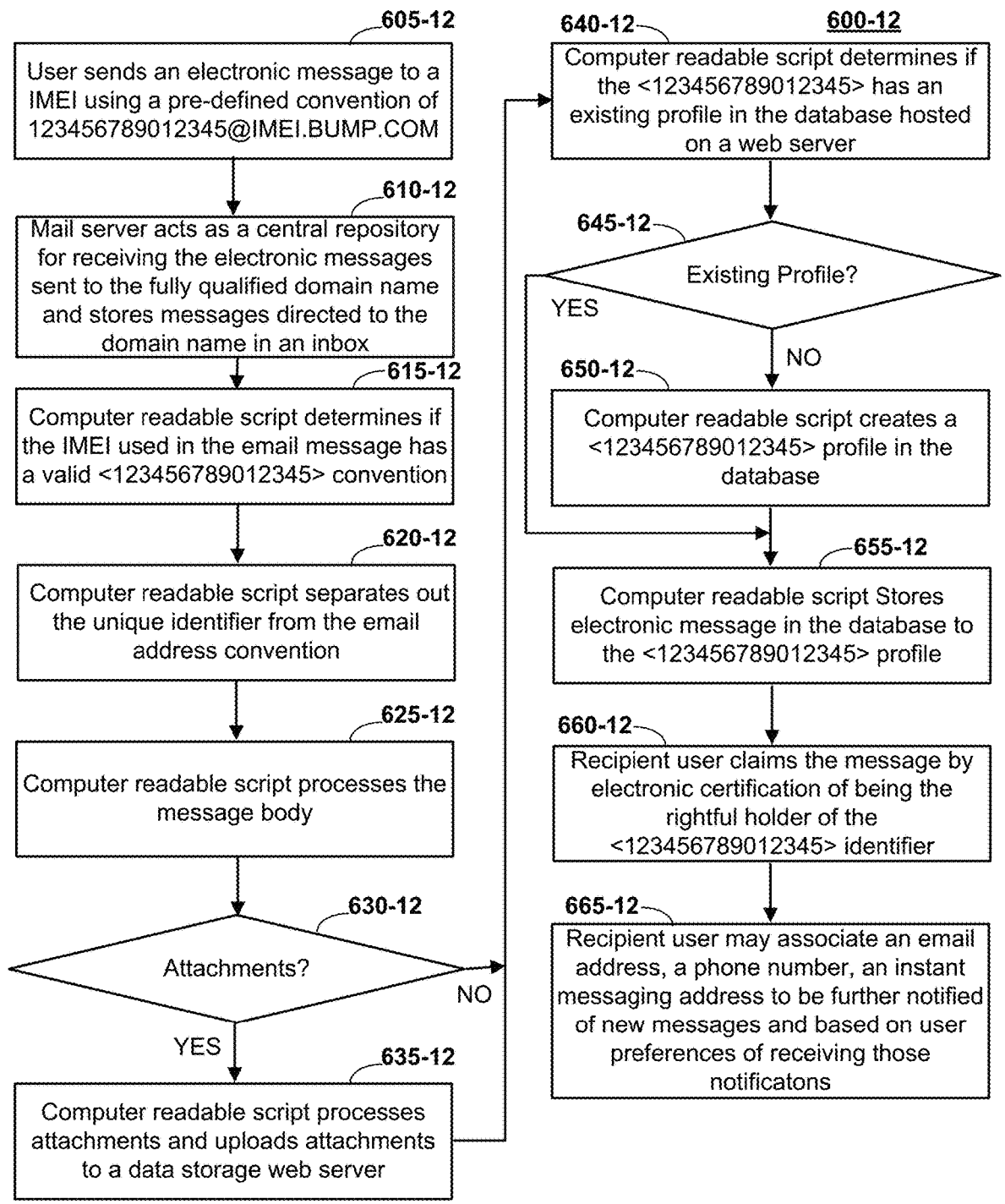
FIG. 17 shows an exemplary process for sending messages to one or more electronic addresses associated with an International Mobile Equipment Identity (IMEI) number.

FIG. 17 shows an exemplary process 600-12 for sending messages to one or more electronic addresses associated with an International Mobile Equipment Identity (IMEI) number.

Figure 18:
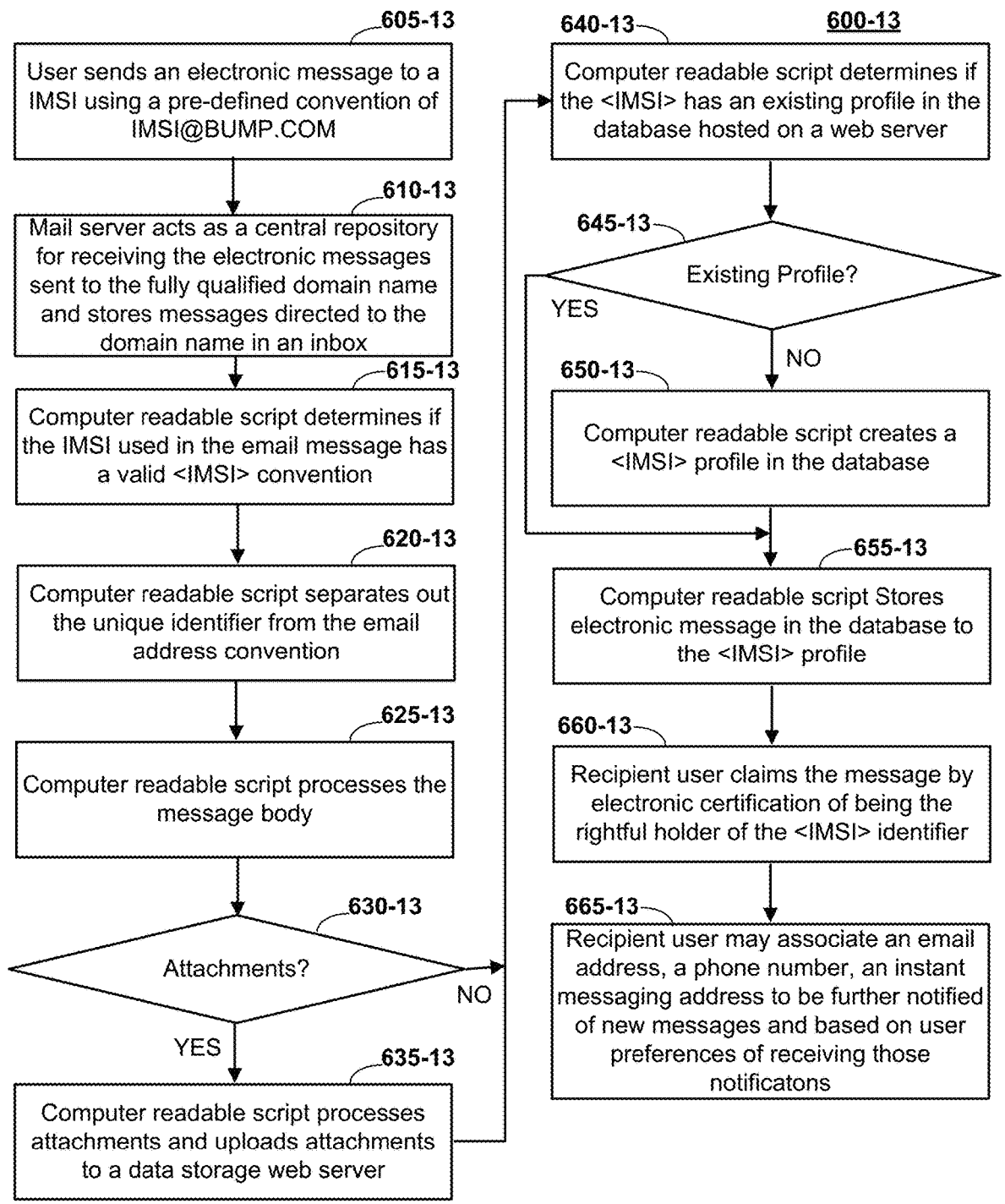
FIG. 18 shows an exemplary process for sending messages to one or more electronic addresses associated with an International Mobile Subscriber Identity (IMSI) number.

FIG. 18 shows an exemplary process 600-13 for sending messages to one or more electronic addresses associated with an International Mobile Subscriber Identity (IMSI) number.

Figure 19:
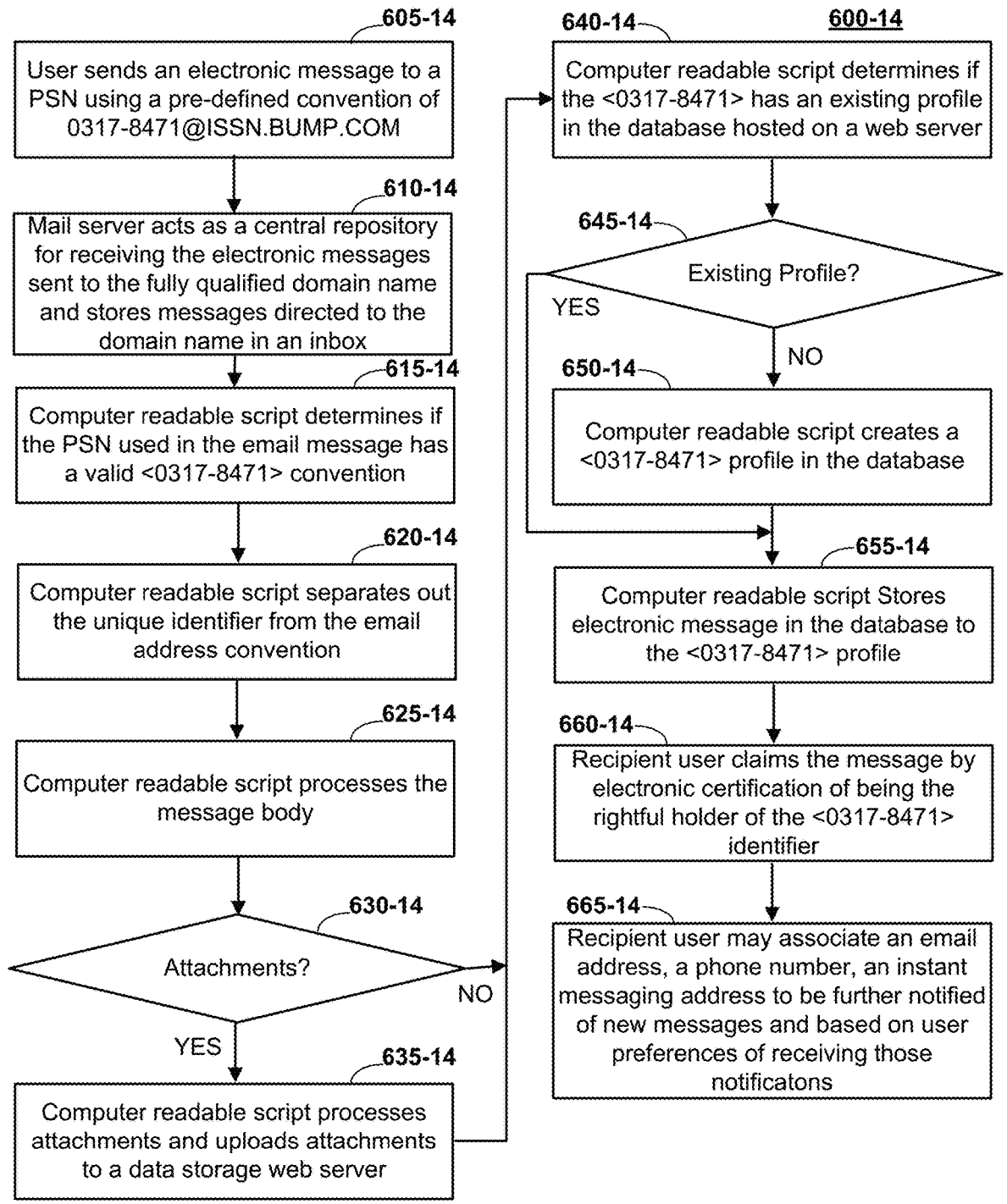
FIG. 19 shows an exemplary process for sending messages to one or more electronic addresses associated with an International Product Serial Number (PSN)

FIG. 19 shows an exemplary process 600-14 for sending messages to one or more electronic addresses associated with an International Product Serial Number (PSN).

Figure 20:
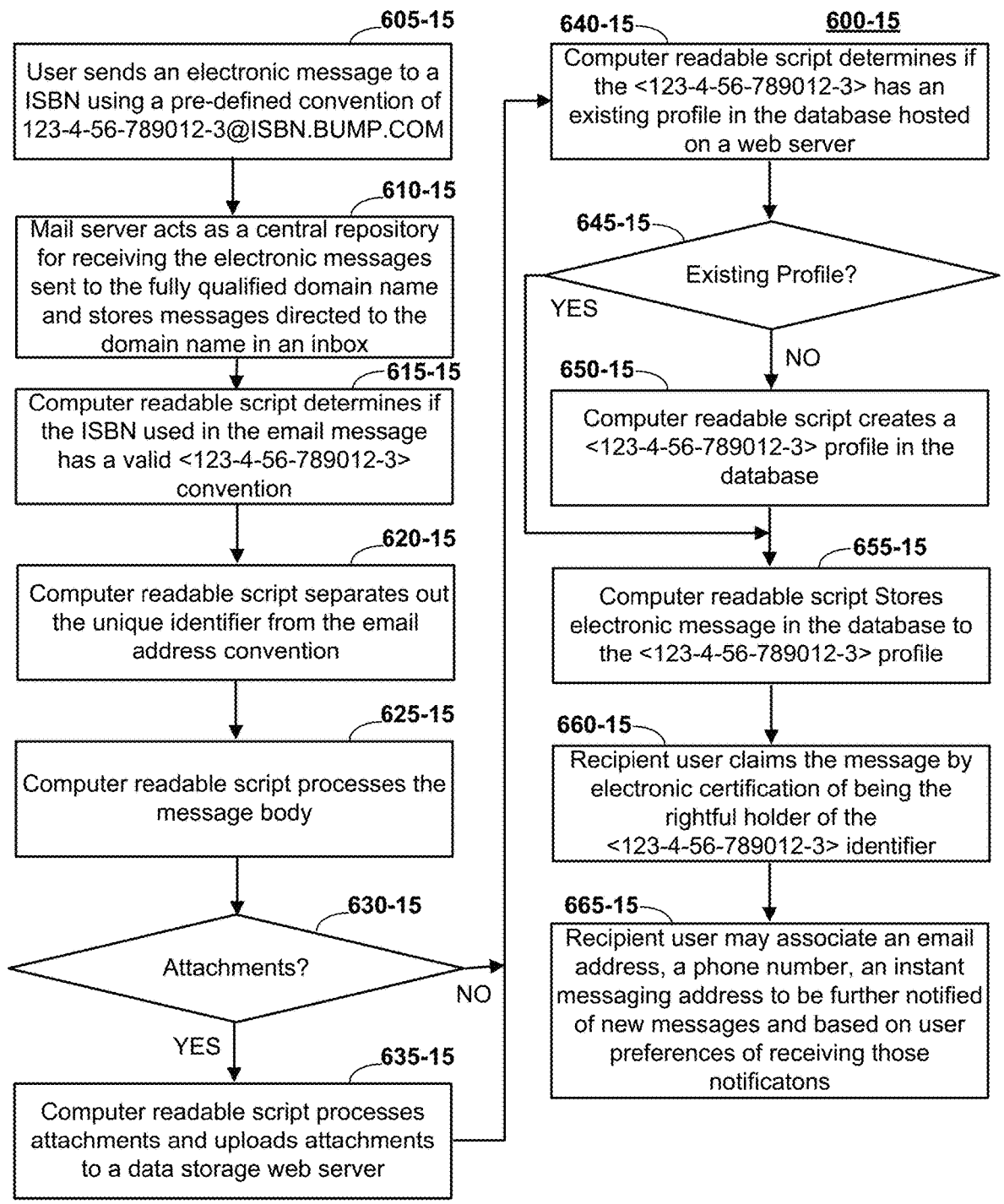
FIG. 20 shows an exemplary process for sending messages to one or more electronic addresses associated with an International Standard Book Number (ISBN)

FIG. 20 shows an exemplary process 600-15 for sending messages to one or more electronic addresses associated with an International Standard Book Number (ISBN).

Figure 21:
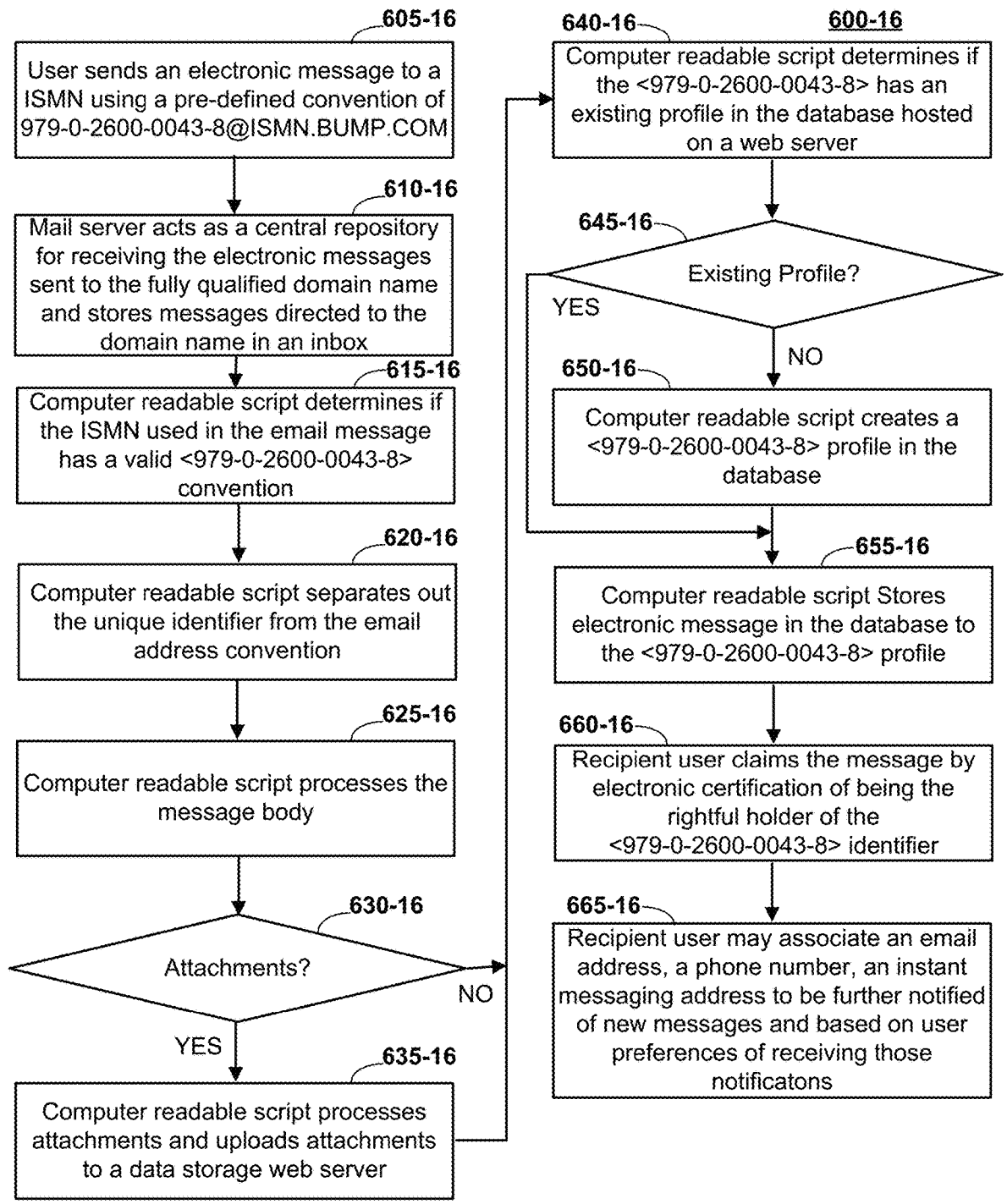
FIG. 21 shows an exemplary process for sending messages to one or more electronic addresses associated with an International Standard Music Number (ISMN)

FIG. 21 shows an exemplary process 600-16 for sending messages to one or more electronic addresses associated with an International Standard Music Number (ISMN).

Figure 22:
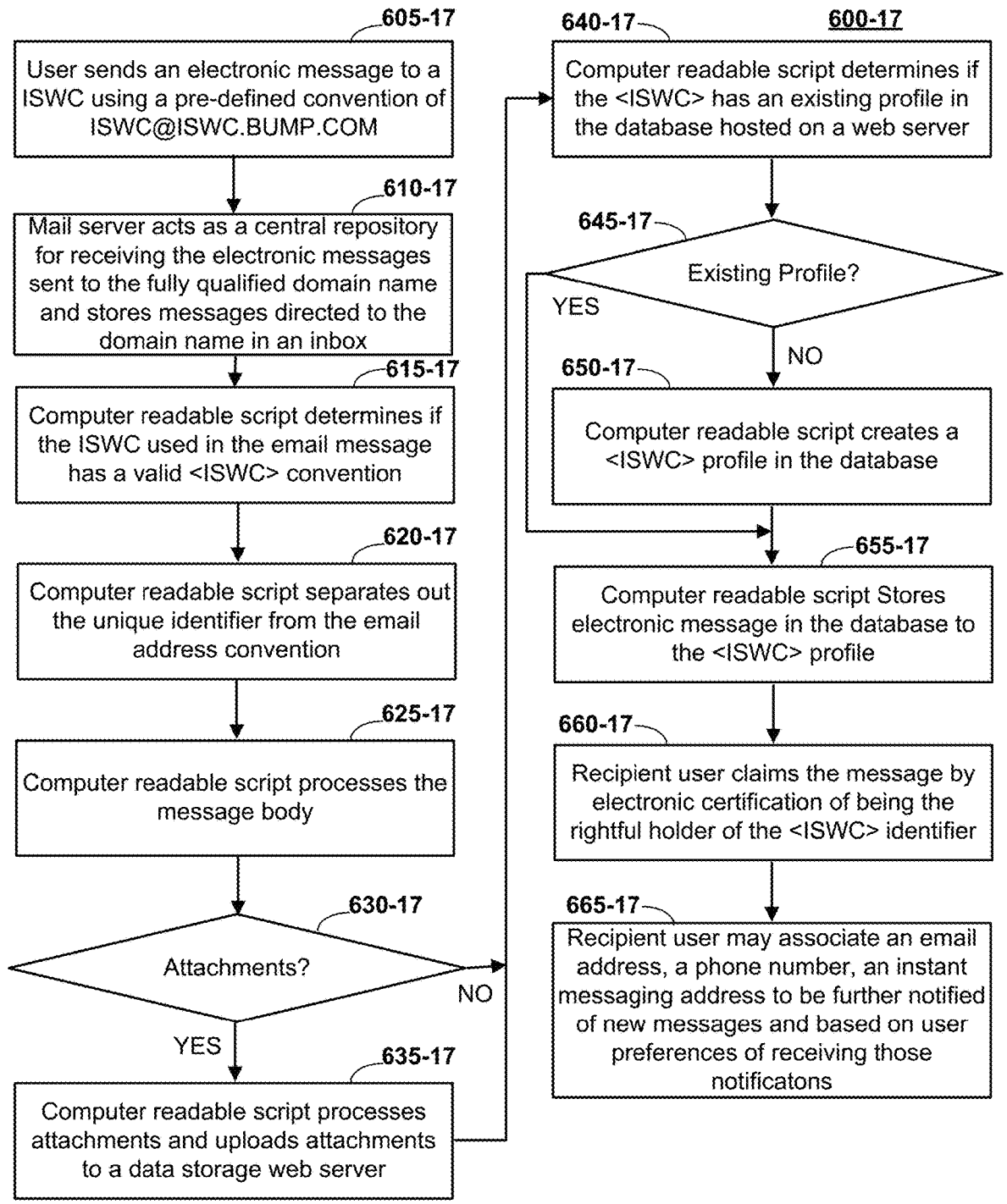
FIG. 22 shows an exemplary process for sending messages to one or more electronic addresses associated with an International Standard Musical Work Code (ISWC)

FIG. 22 shows an exemplary process 600-17 for sending messages to one or more electronic addresses associated with an International Standard Musical Work Code (ISWC).

Figure 23:
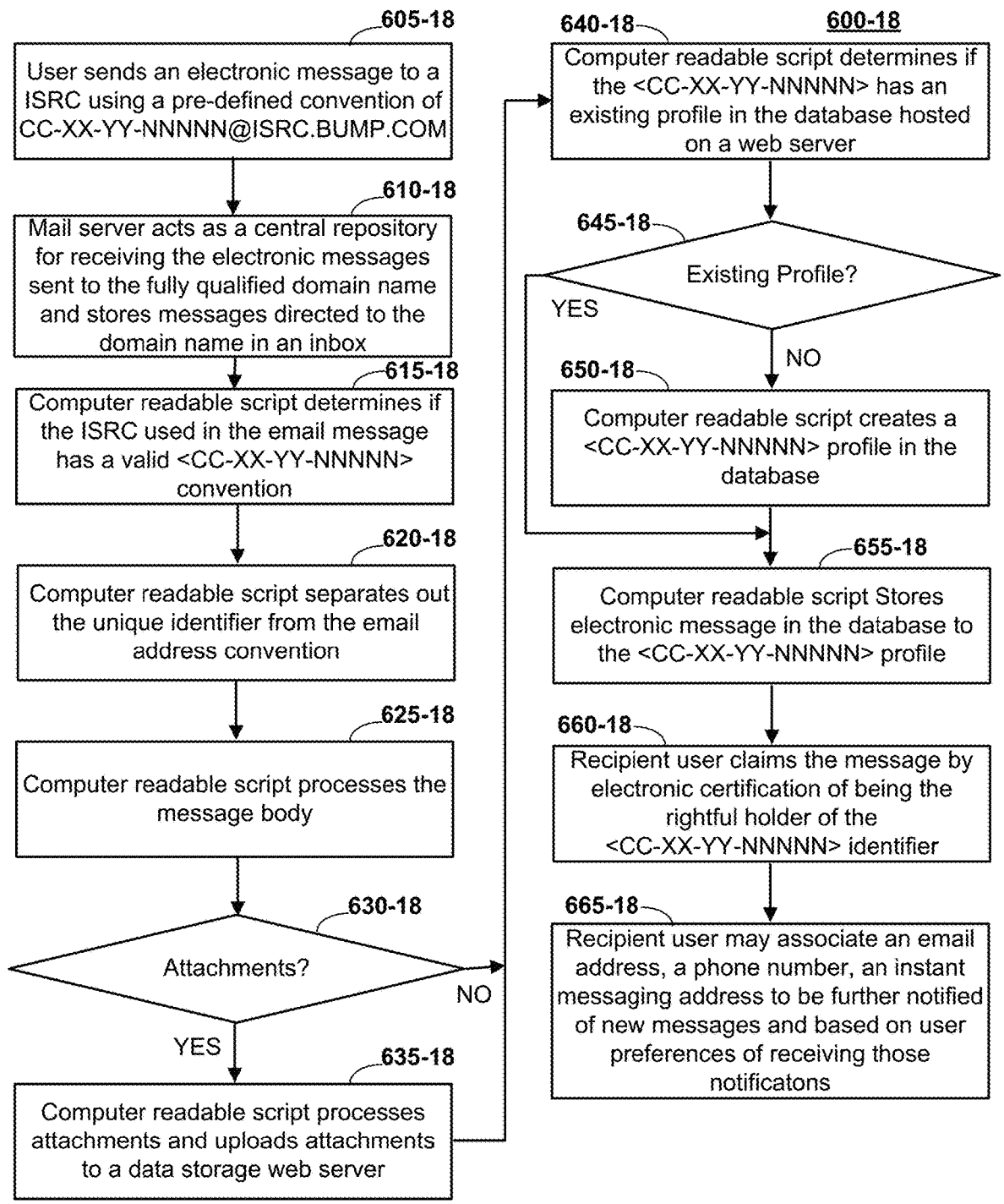
FIG. 23 shows an exemplary process for sending messages to one or more electronic addresses associated with an International Standard Recording Code (ISRC)

FIG. 23 shows an exemplary process 600-18 for sending messages to one or more electronic addresses associated with an International Standard Recoding Code (ISRC).

Figure 24:
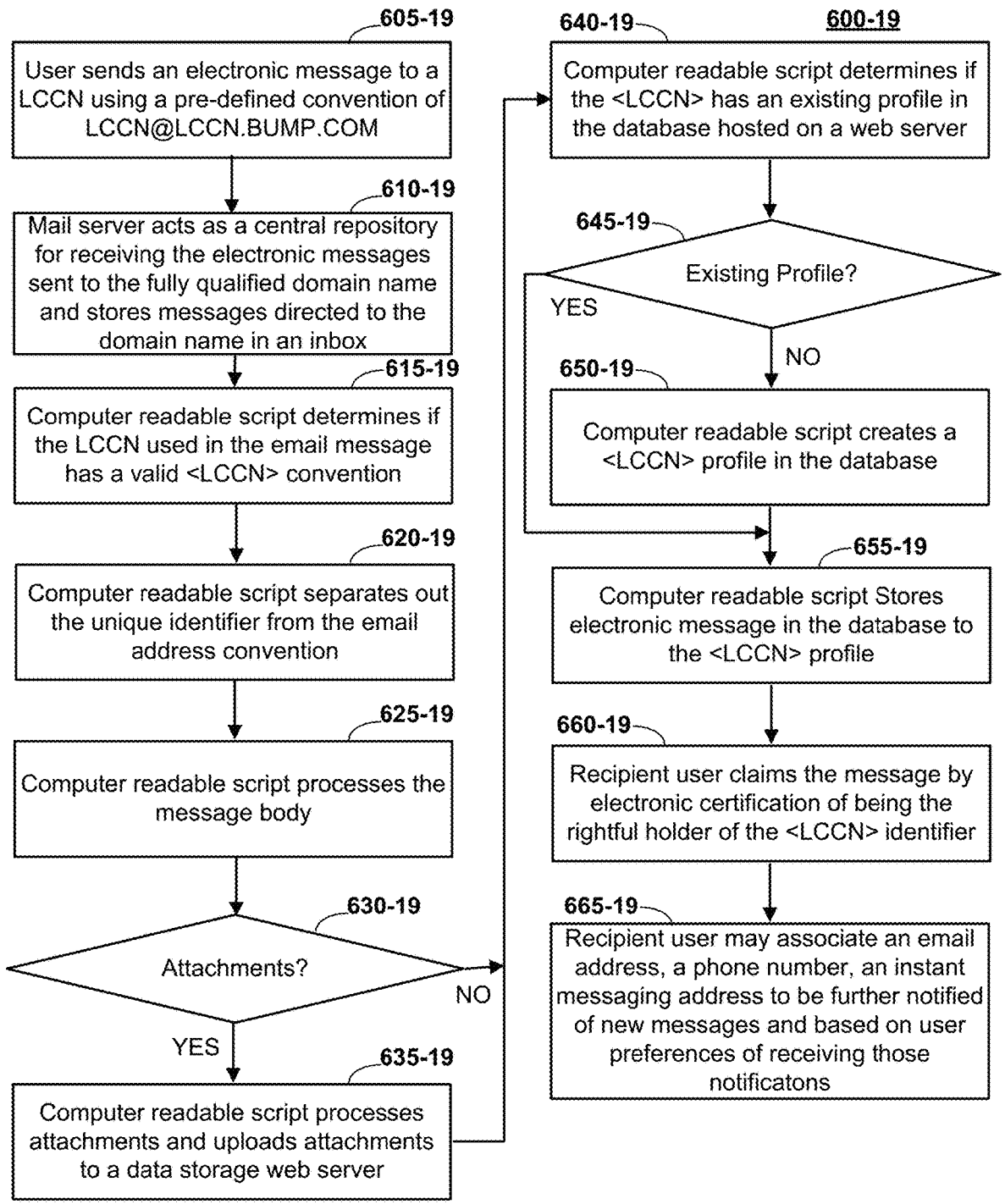
FIG. 24 shows an exemplary process for sending messages to one or more electronic addresses associated with a Library of Congress Control Number (LCCN)

FIG. 24 shows an exemplary process 600-19 for sending messages to one or more electronic addresses associated with a Library of Congress Control Number (LCCN).

Figure 25:
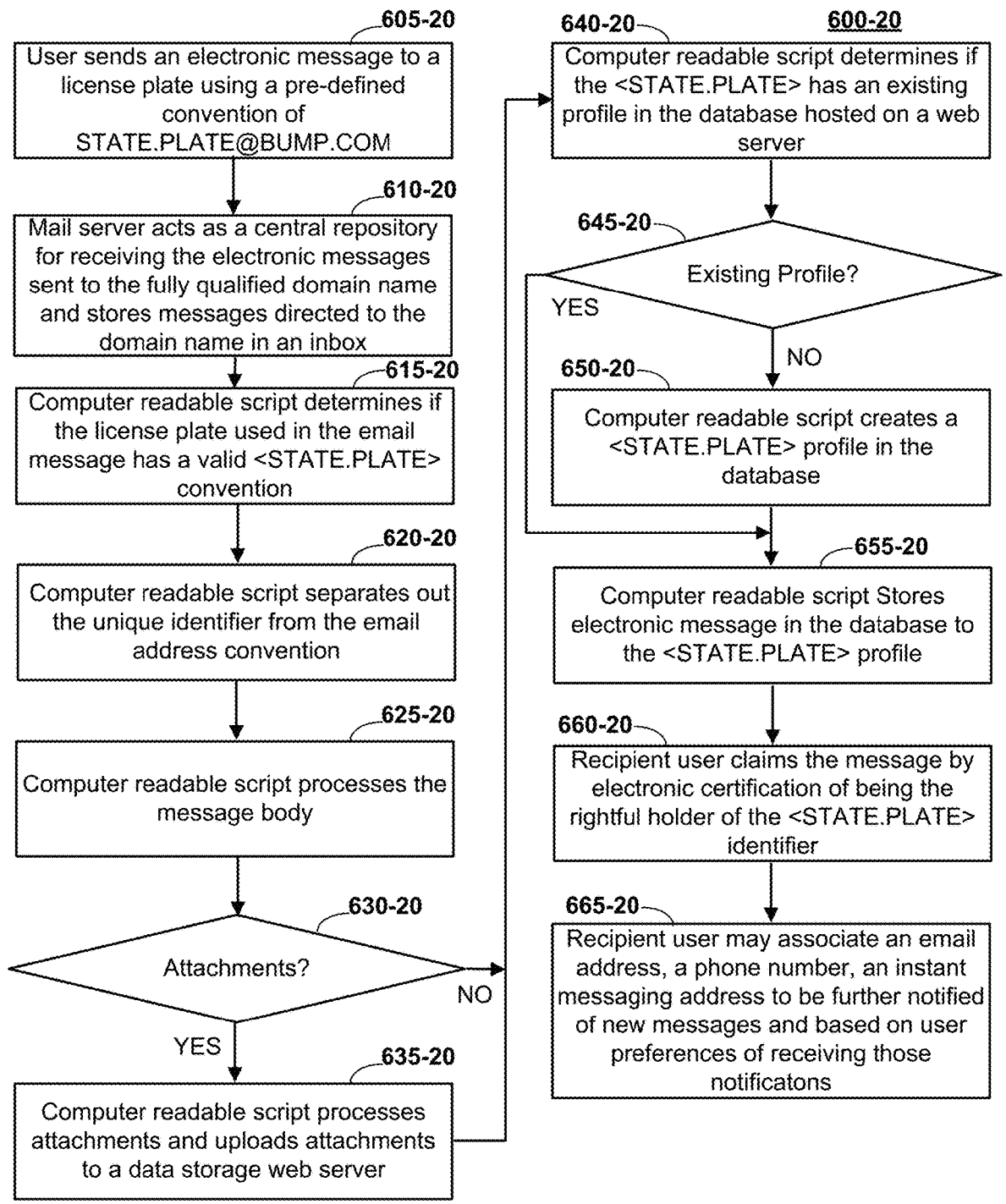
FIG. 25 shows an exemplary process for sending messages to one or more electronic addresses associated with a License Plate.

FIG. 25 shows an exemplary process 600-20 for sending messages to one or more electronic addresses associated with a License Plate.

Figure 26:
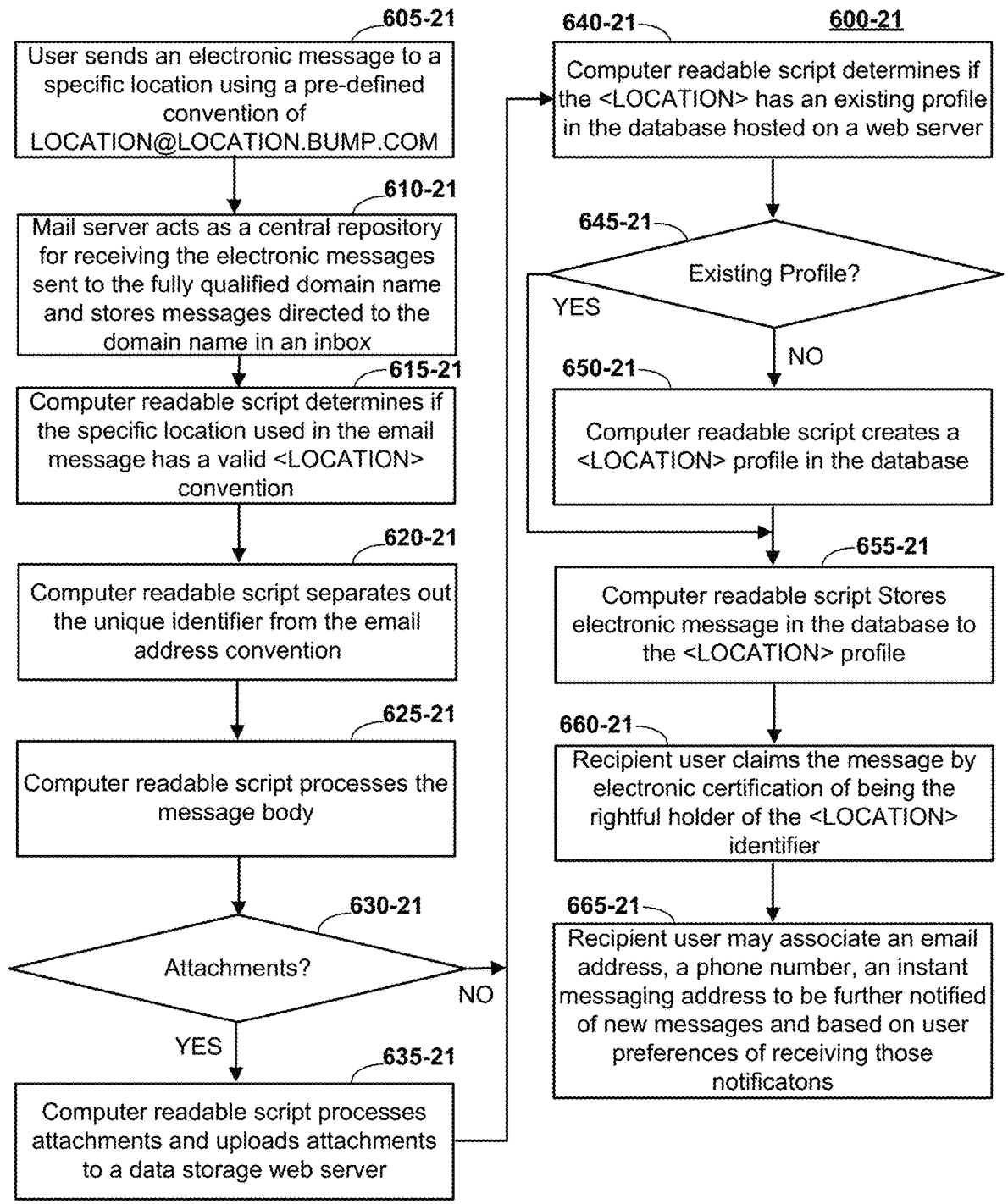
FIG. 26 shows an exemplary process for sending messages to one or more electronic addresses associated with a specific location/establishment.

FIG. 26 shows an exemplary process 600-21 for sending messages to one or more electronic addresses associated with a specific location/establishment.

Figure 27:
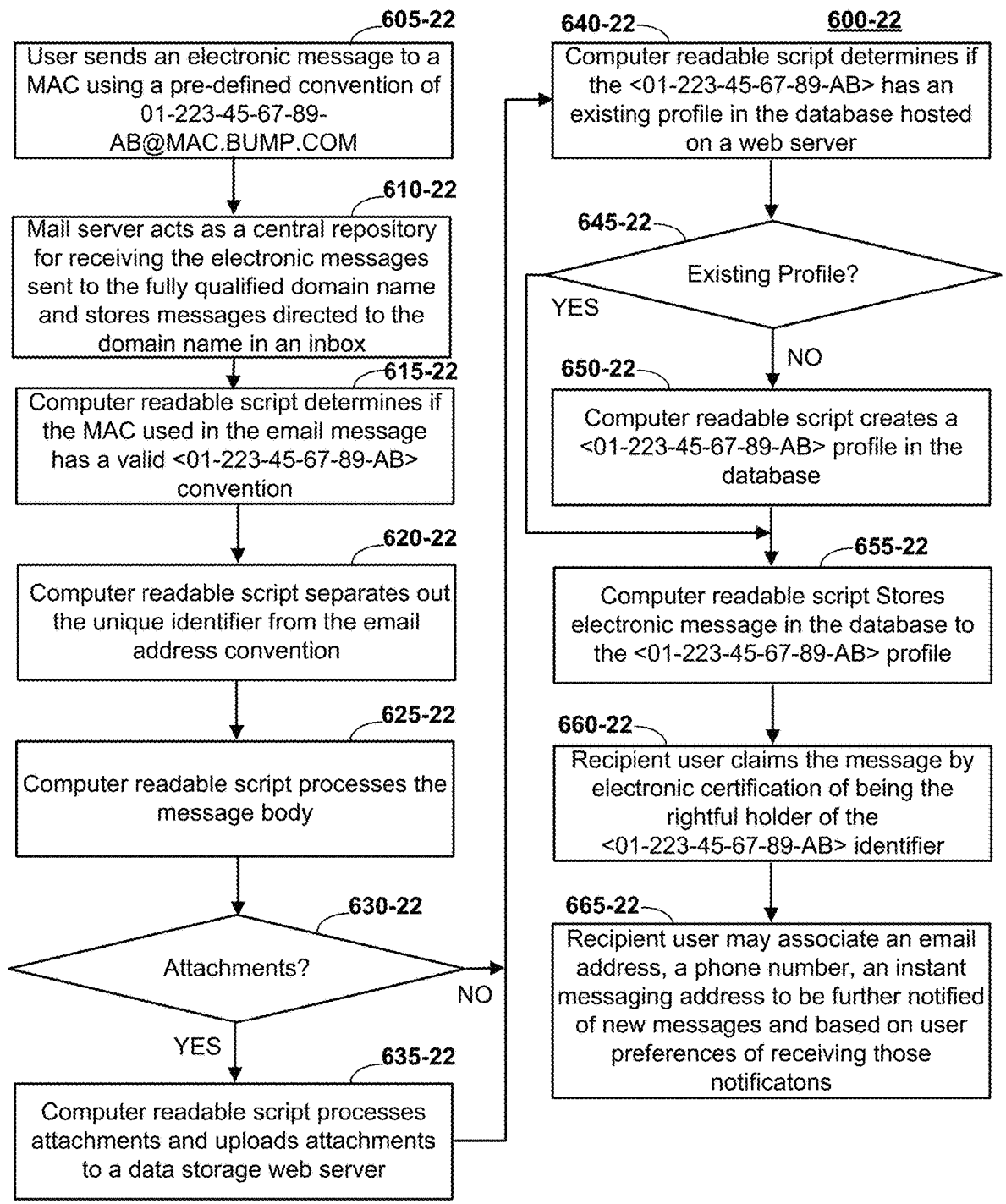
FIG. 27 shows an exemplary process for sending messages to one or more electronic addresses associated with a Media Access Control (MAC) number.

FIG. 27 shows an exemplary process 600-22 for sending messages to one or more electronic addresses associated with a Media Access Control (MAC) number.

Figure 28:
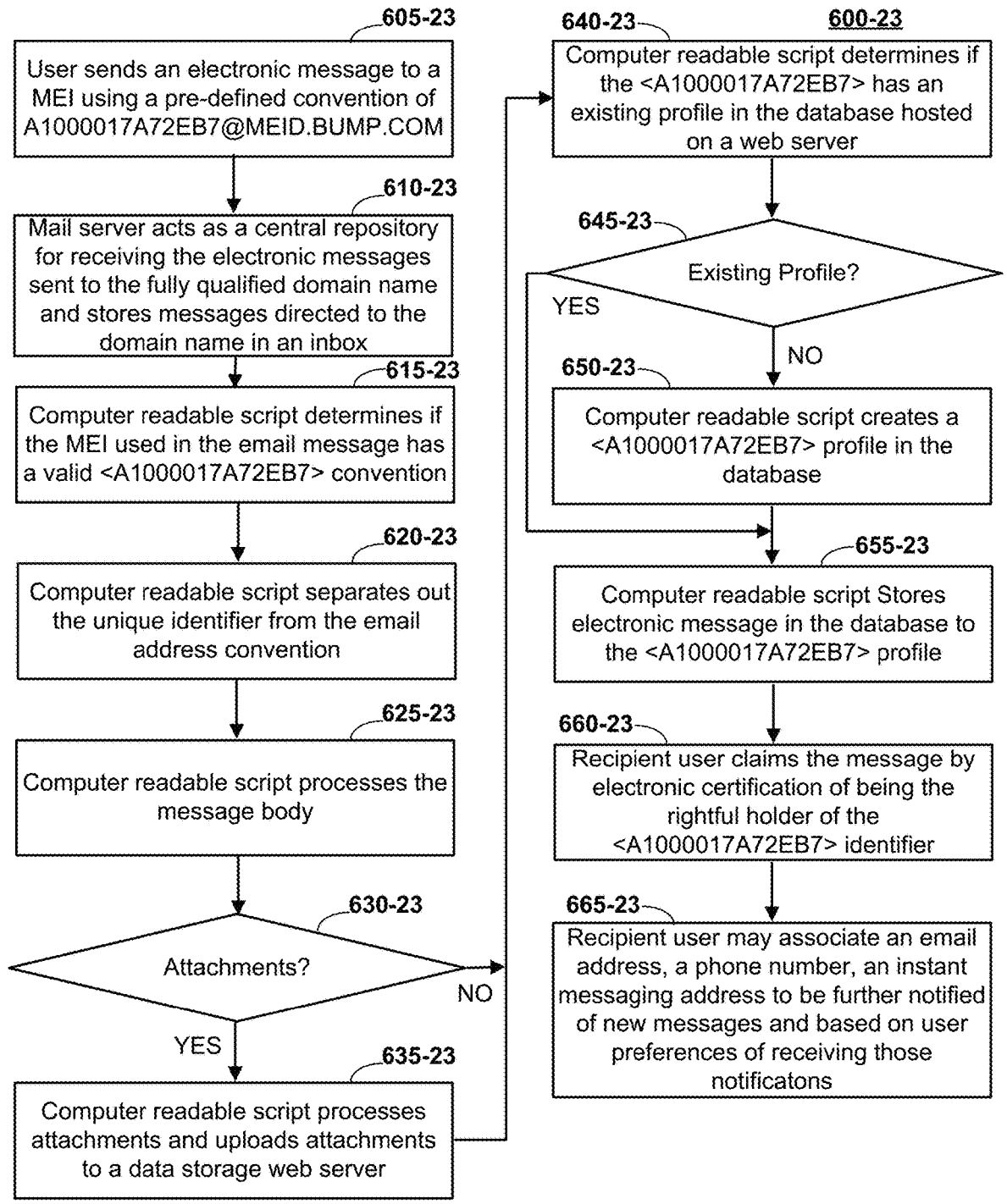
FIG. 28 shows an exemplary process for sending messages to one or more electronic addresses associated with a Mobile Equipment Identifier (MEI)

FIG. 28 shows an exemplary process 600-23 for sending messages to one or more electronic addresses associated with a Mobile Equipment Identifier (MEI).

Figure 29:
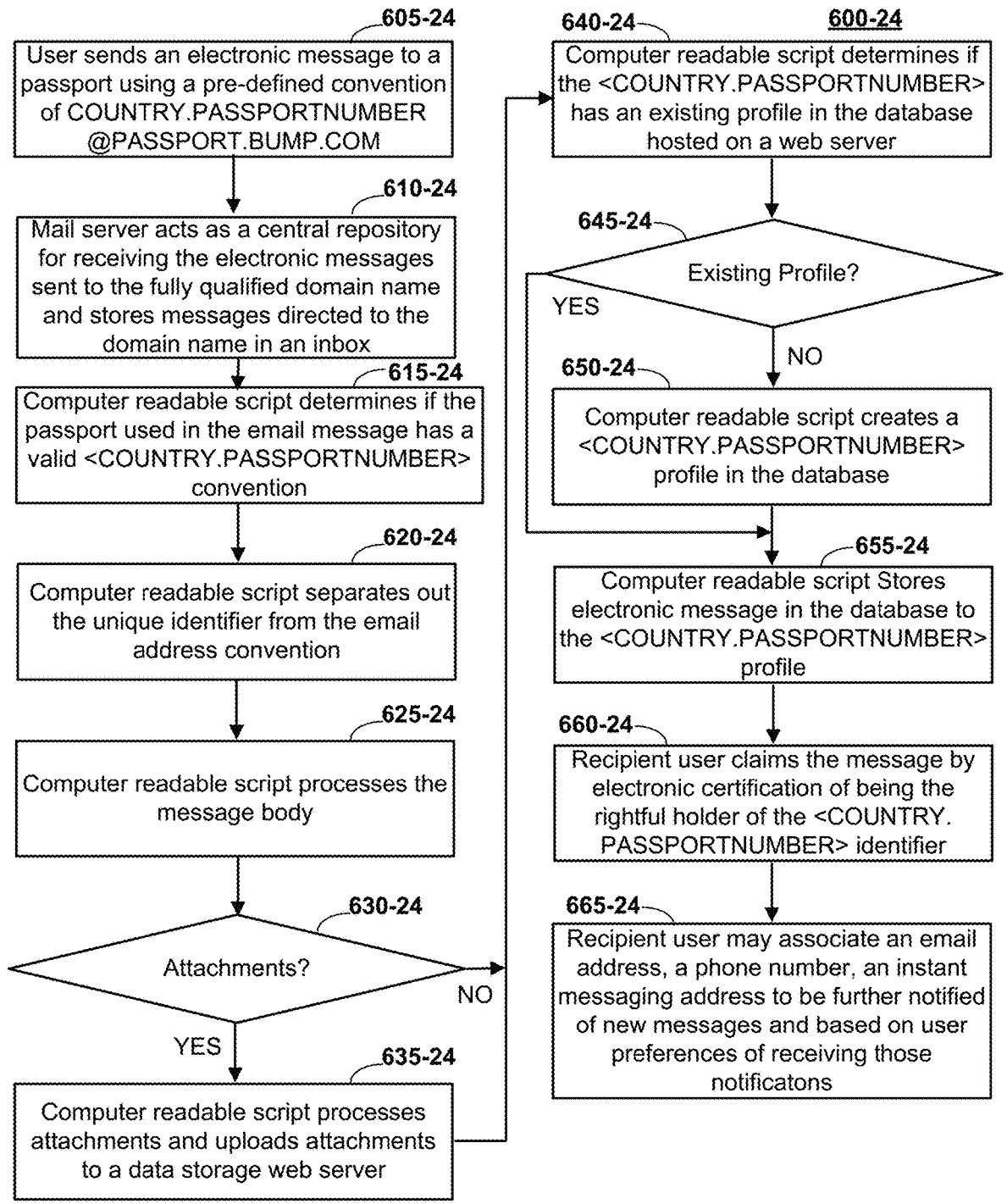
FIG. 29 shows an exemplary process for sending messages to one or more electronic addresses associated with a passport.

FIG. 29 shows an exemplary process 600-24 for sending messages to one or more electronic addresses associated with a passport.

Figure 30:
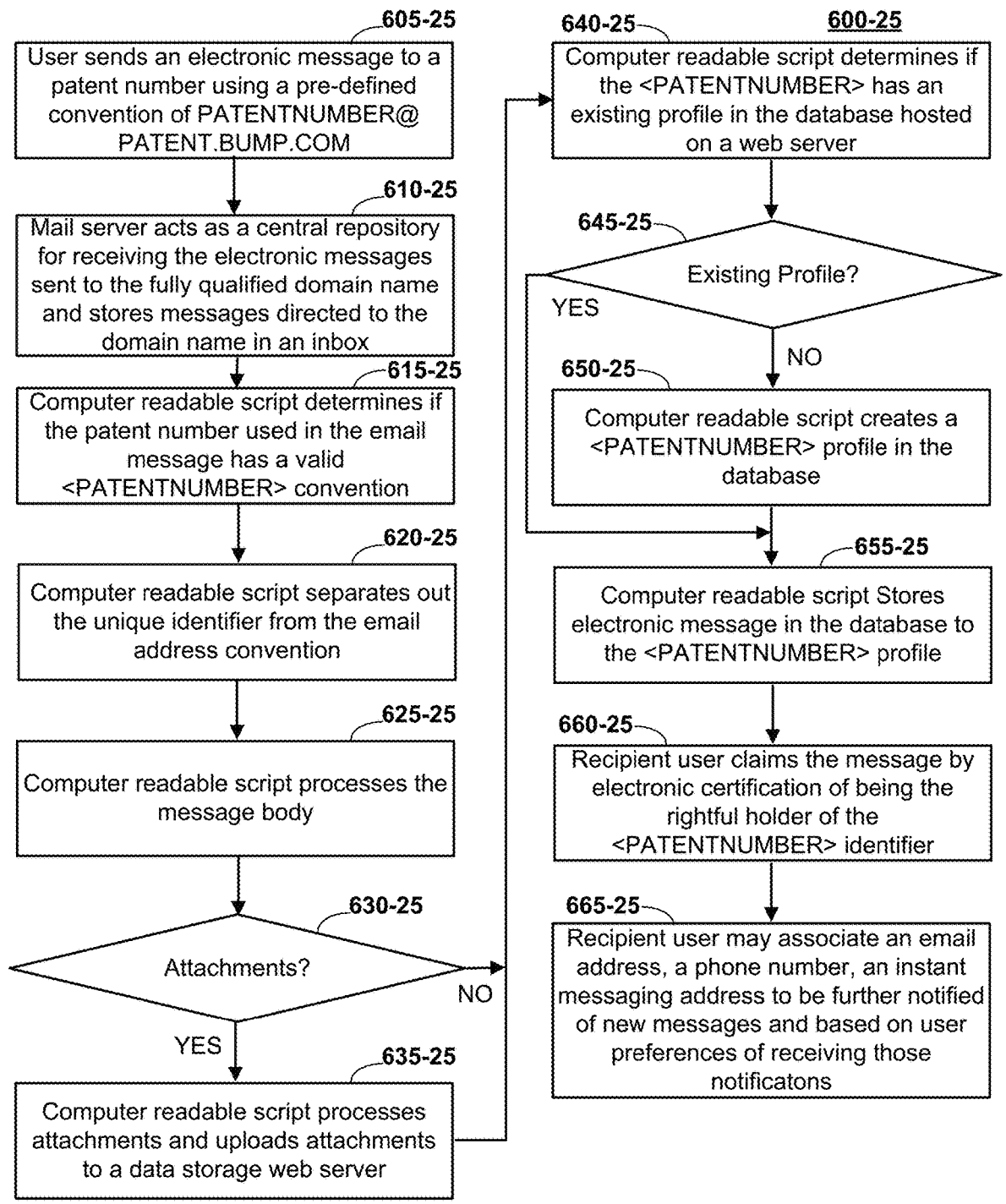
FIG. 30 shows an exemplary process for sending messages to one or more electronic addresses associated with a patent number.

FIG. 30 shows an exemplary process 600-25 for sending messages to one or more electronic addresses associated with a patent number.

Figure 31:
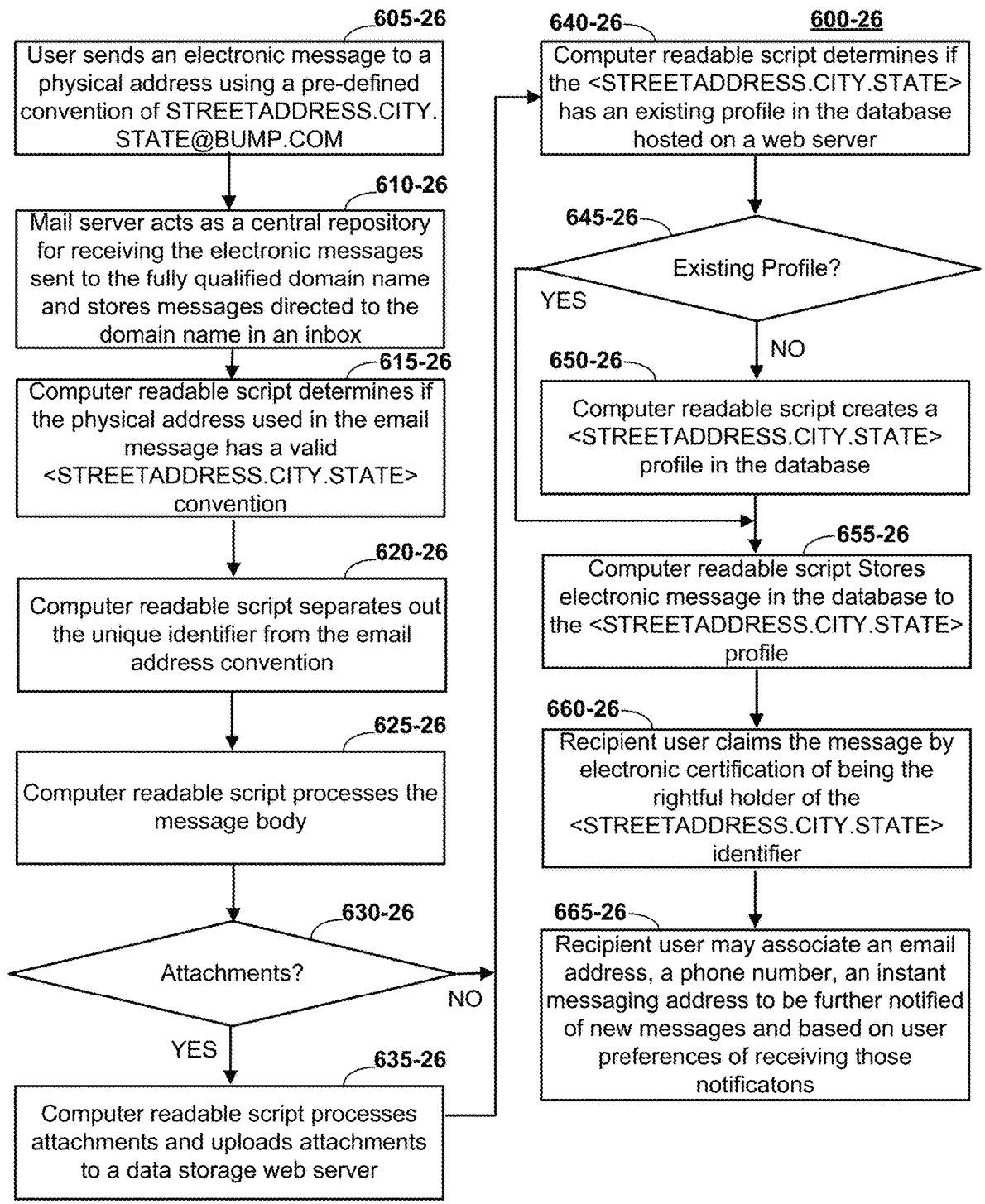
FIG. 31 shows an exemplary process for sending messages to one or more electronic addresses associated with a physical address.

FIG. 31 shows an exemplary process 600-26 for sending messages to one or more electronic addresses associated with a physical address.

Figure 32:
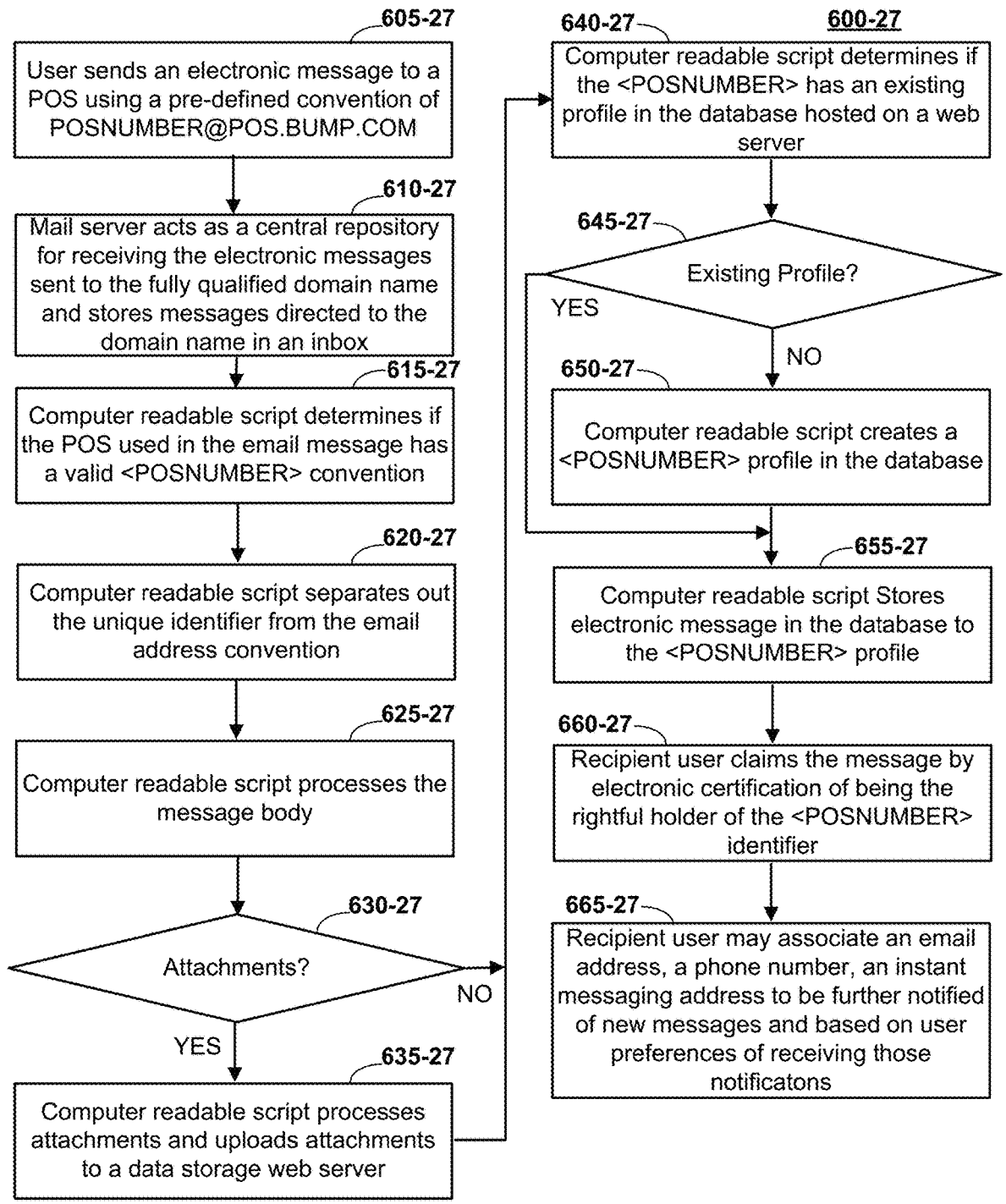
FIG. 32 shows an exemplary process for sending messages to one or more electronic addresses associated with a Point Of Sale/Transaction (POS) identifier.

FIG. 32 shows an exemplary process 600-27 for sending messages to one or more electronic addresses associated with a Point Of Sale/Transaction (POS) identifier.

Figure 33:
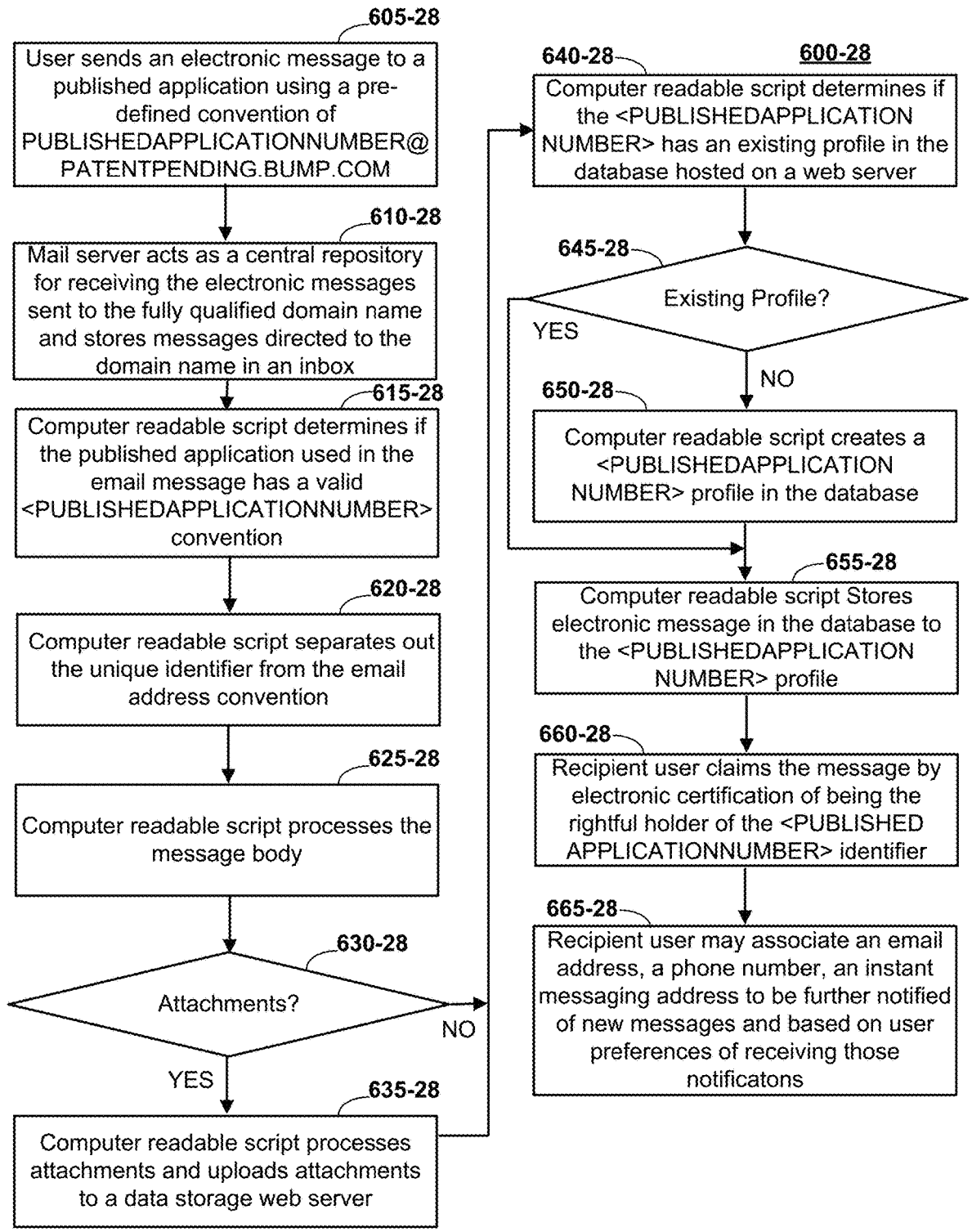
FIG. 33 shows an exemplary process for sending messages to one or more electronic addresses associated with a published patent application.

FIG. 33 shows an exemplary process 600-28 for sending messages to one or more electronic addresses associated with a published patent application.

Figure 34:
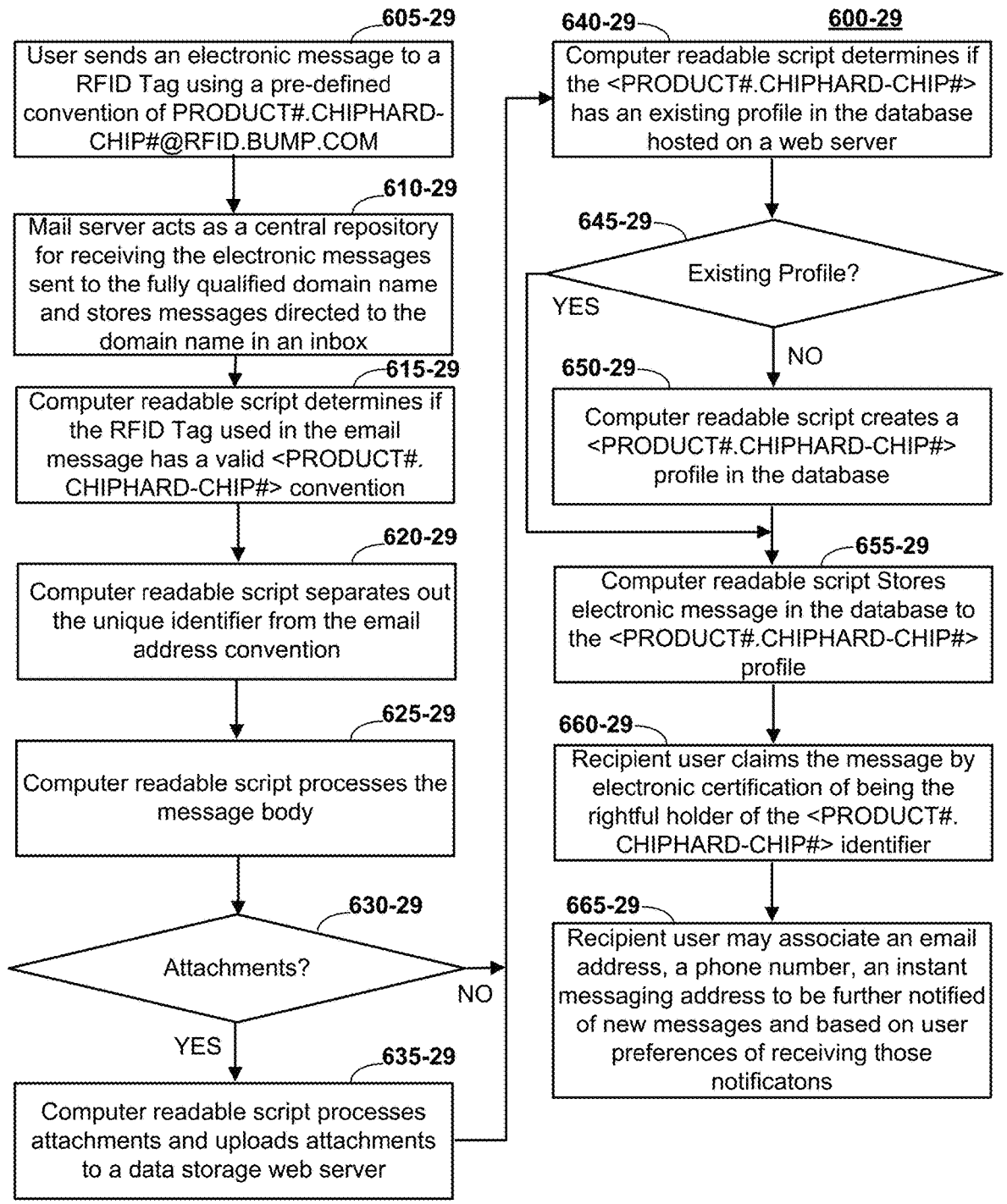
FIG. 34 shows an exemplary process for sending messages to one or more electronic addresses associated with a Radio Frequency Identification (RFID) Tag.

FIG. 34 shows an exemplary process 600-29 for sending messages to one or more electronic addresses associated with a Radio Frequency Identification (RFID) Tag.

Figure 35:
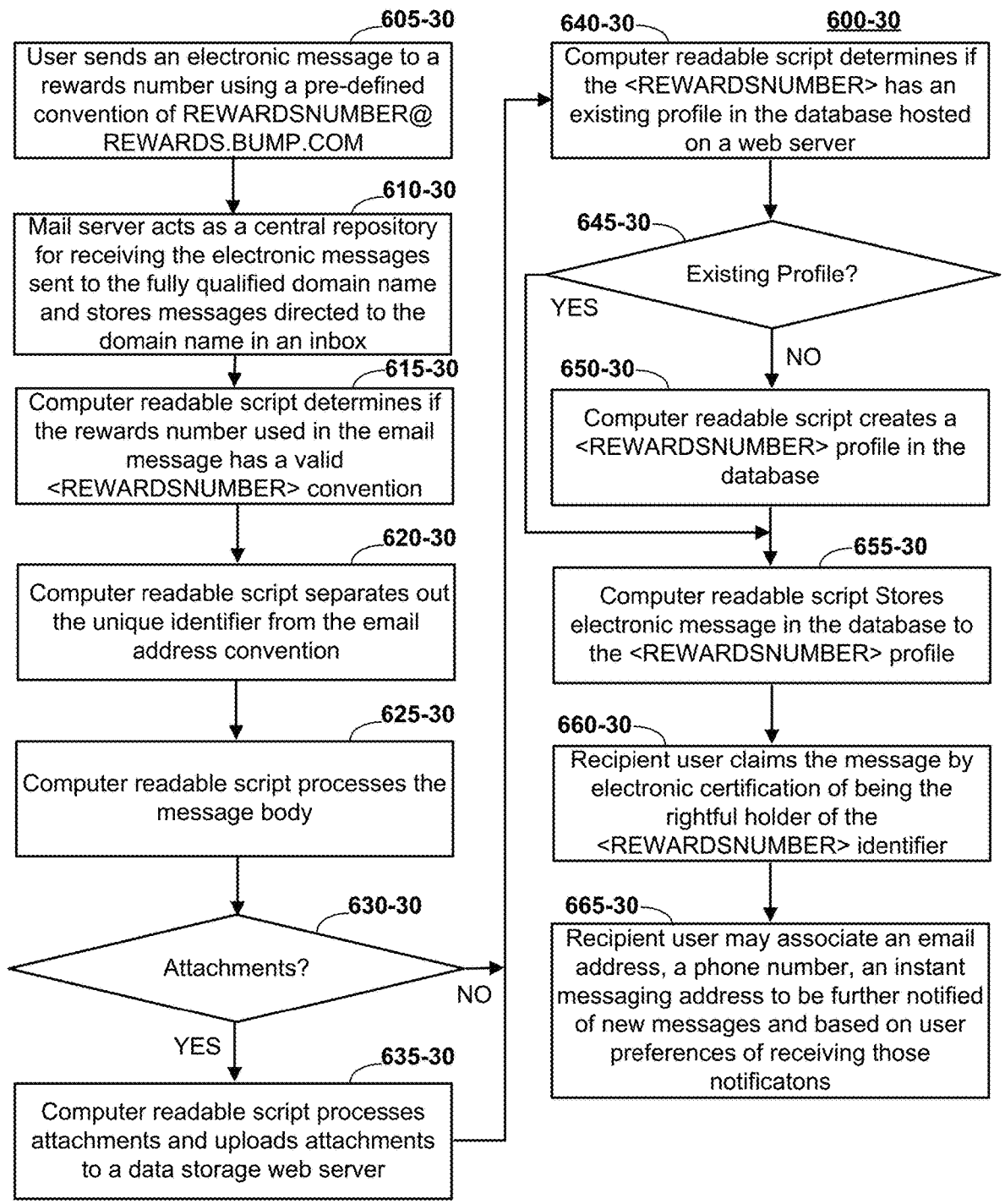
FIG. 35 shows an exemplary process for sending messages to one or more electronic addresses associated with a rewards card.

FIG. 35 shows an exemplary process 600-30 for sending messages to one or more electronic addresses associated with a rewards card.

Figure 36:
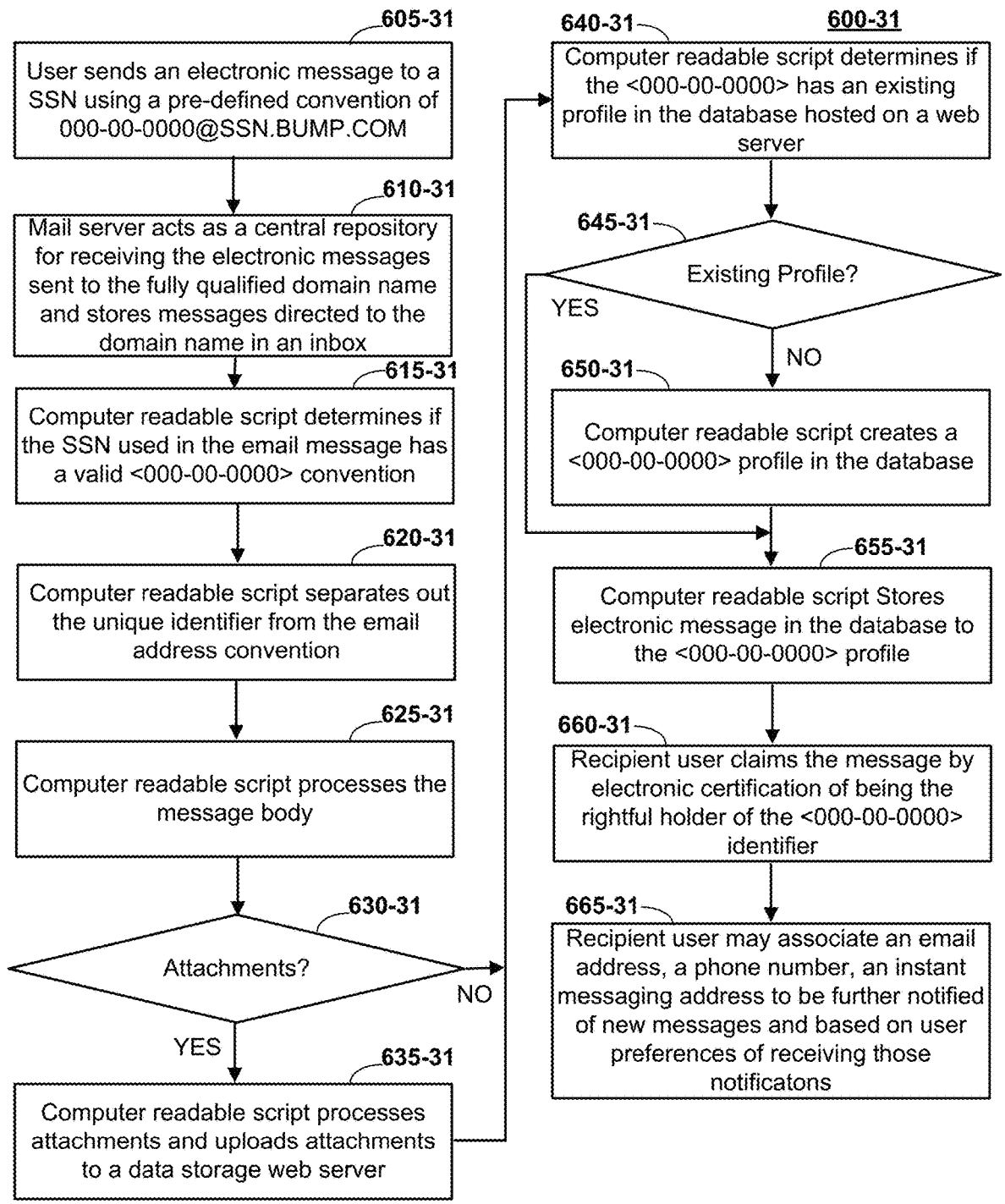
FIG. 36 shows an exemplary process for sending messages to one or more electronic addresses associated with a Social Security Number (SSN)

FIG. 36 shows an exemplary process 600-31 for sending messages to one or more electronic addresses associated with a Social Security Number (SSN).

Figure 37:
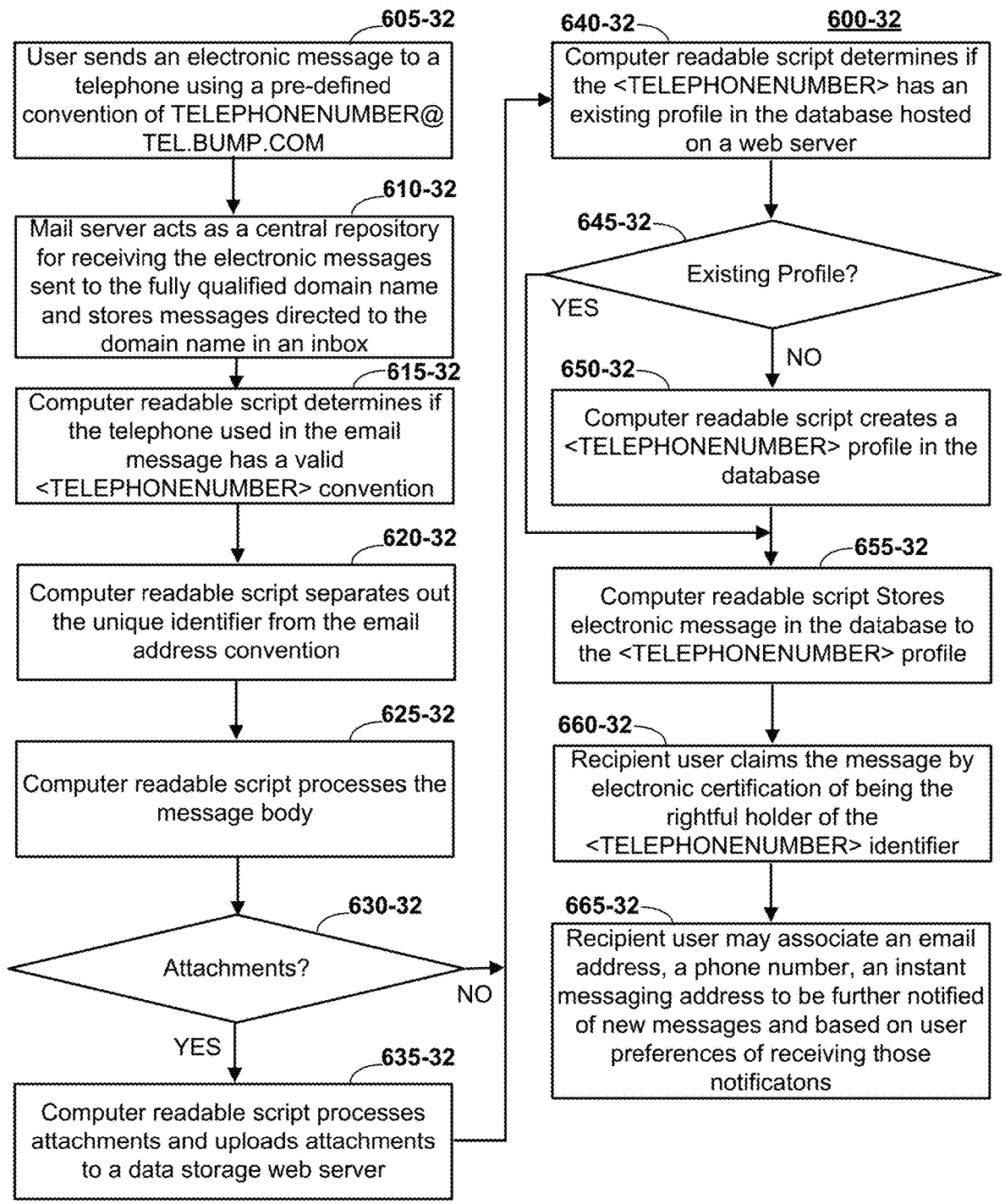
FIG. 37 shows an exemplary process for sending messages to one or more electronic addresses associated with a telephone number.

FIG. 37 shows an exemplary process 600-32 for sending messages to one or more electronic addresses associated with a telephone number.

Figure 38:
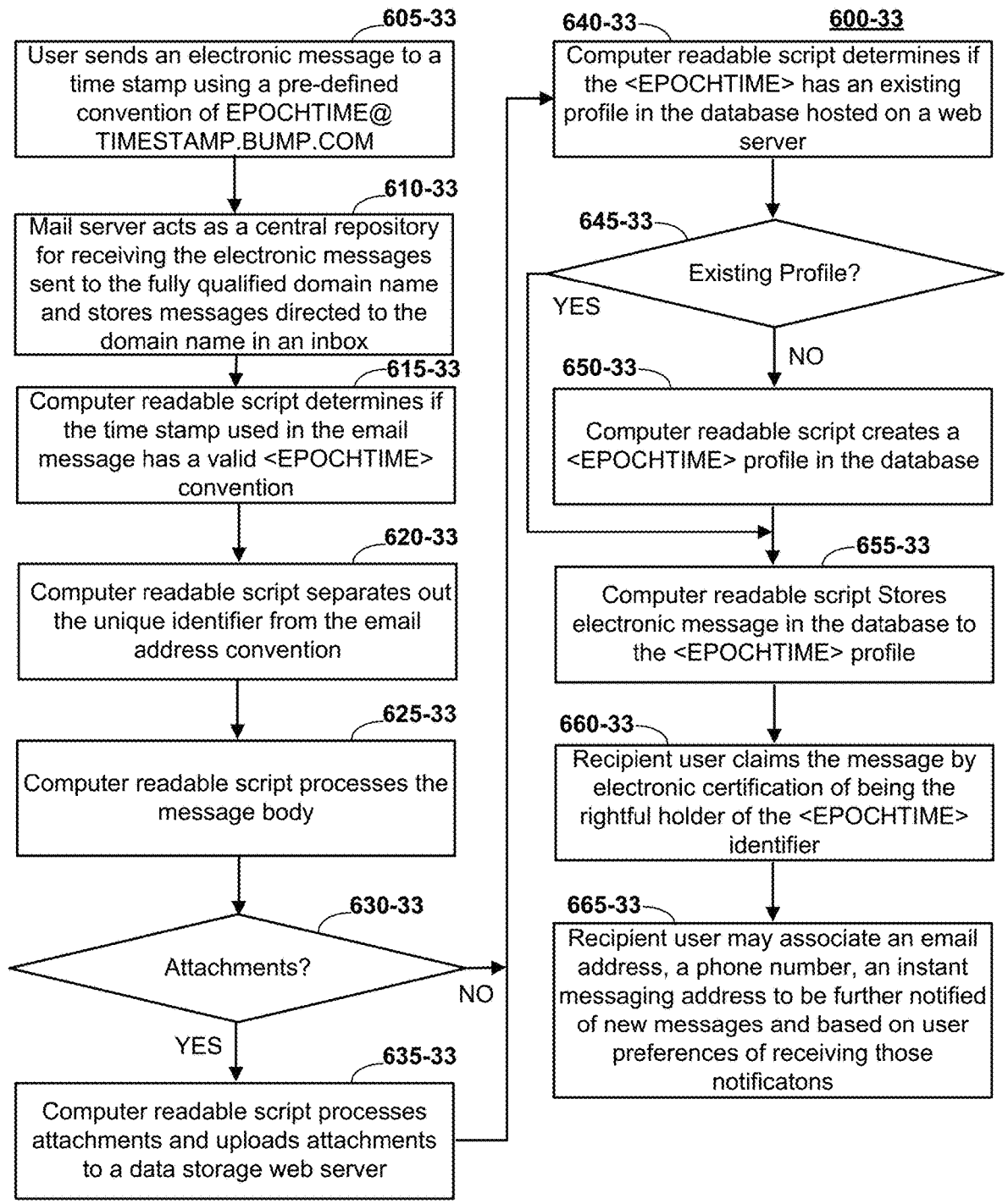
FIG. 38 shows an exemplary process for sending messages to one or more electronic addresses associated with a Time Stamp (TS)

FIG. 38 shows an exemplary process 600-33 for sending messages to one or more electronic addresses associated with a Time Stamp (TS).

Figure 39:
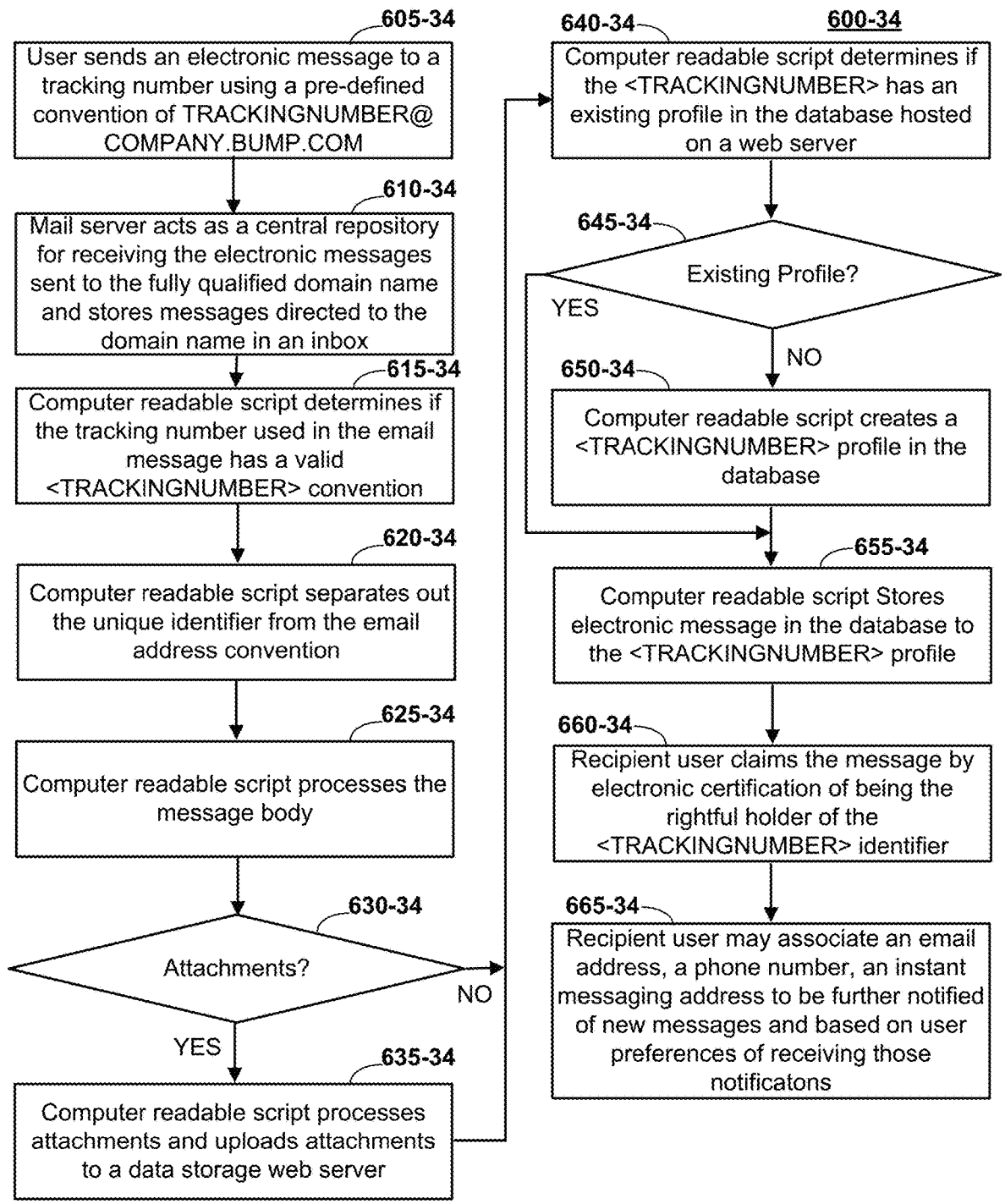
FIG. 39 shows an exemplary process for sending messages to one or more electronic addresses associated with a tracking number.

FIG. 39 shows an exemplary process 600-34 for sending messages to one or more electronic addresses associated with a tracking number.

Figure 40:
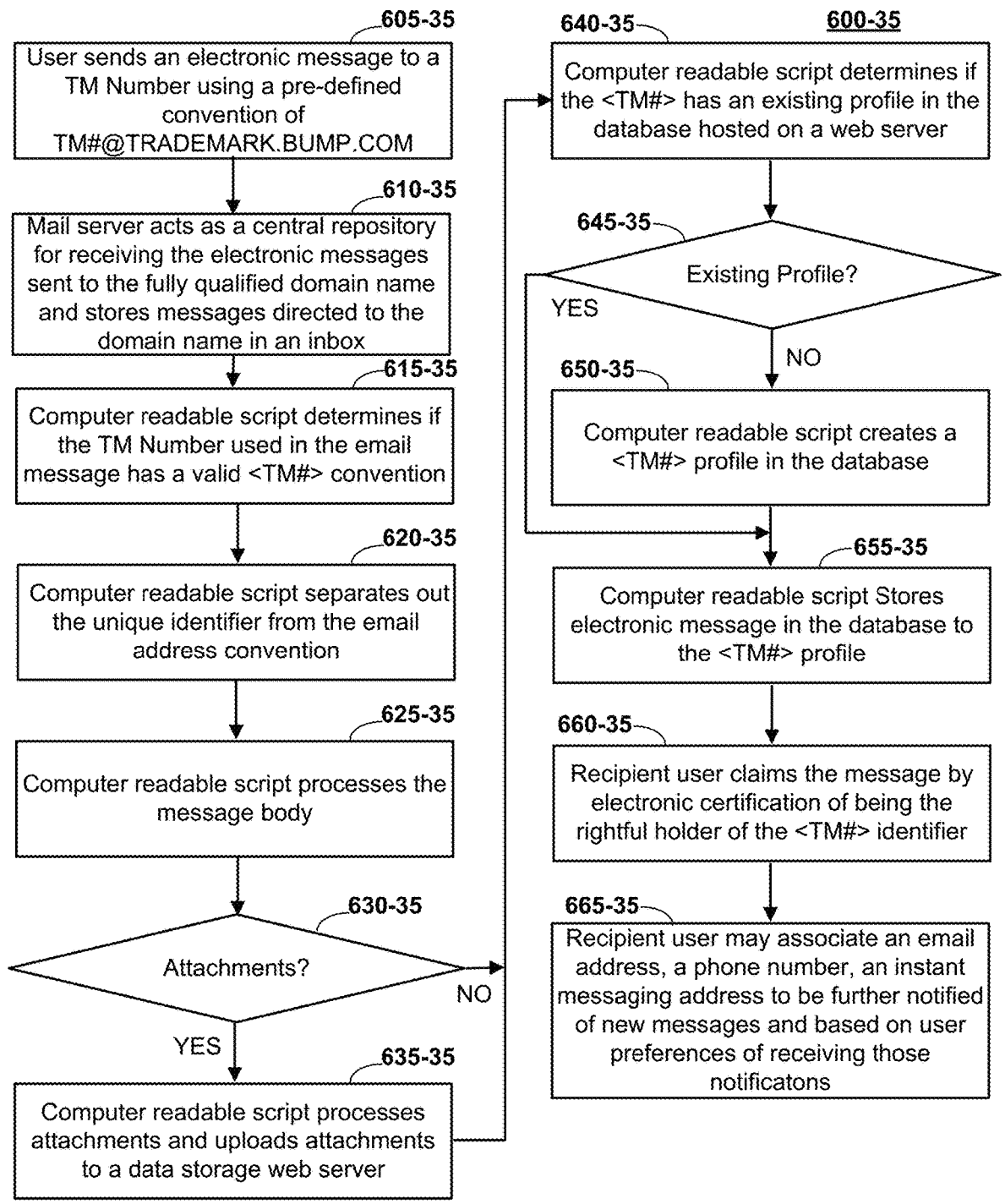
FIG. 40 shows an exemplary process for sending messages to one or more electronic addresses associated with a Trademark Number (TM)

FIG. 40 shows an exemplary process 600-35 for sending messages to one or more electronic addresses associated with a Trademark Number (TM).

Figure 41:
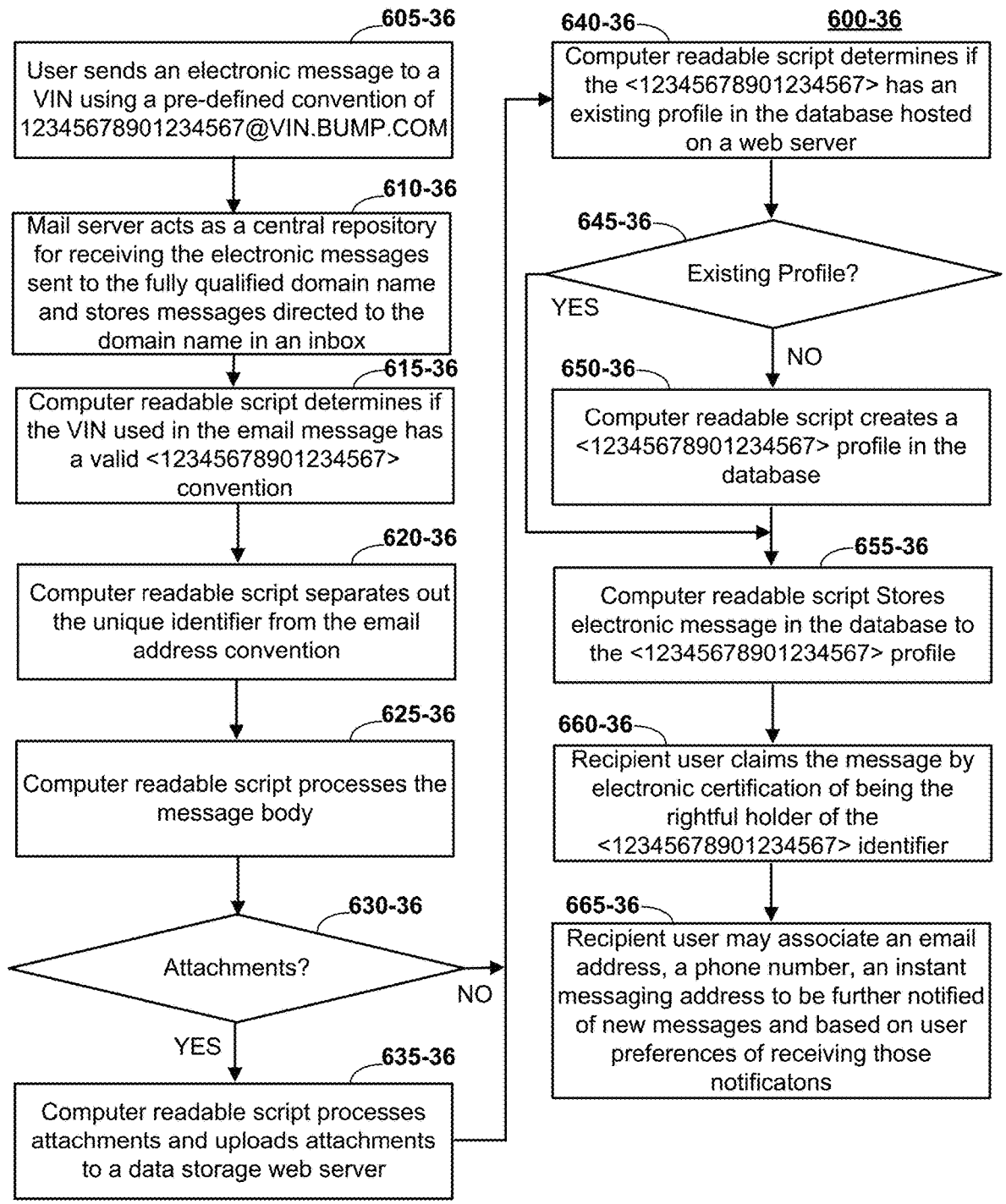
FIG. 41 shows an exemplary process for sending messages to one or more electronic addresses associated with a Vehicle Identification Number (VIN)

FIG. 41 shows an exemplary process 600-36 for sending messages to one or more electronic addresses associated with a Vehicle Identification Number (VIN).

Figure 42:
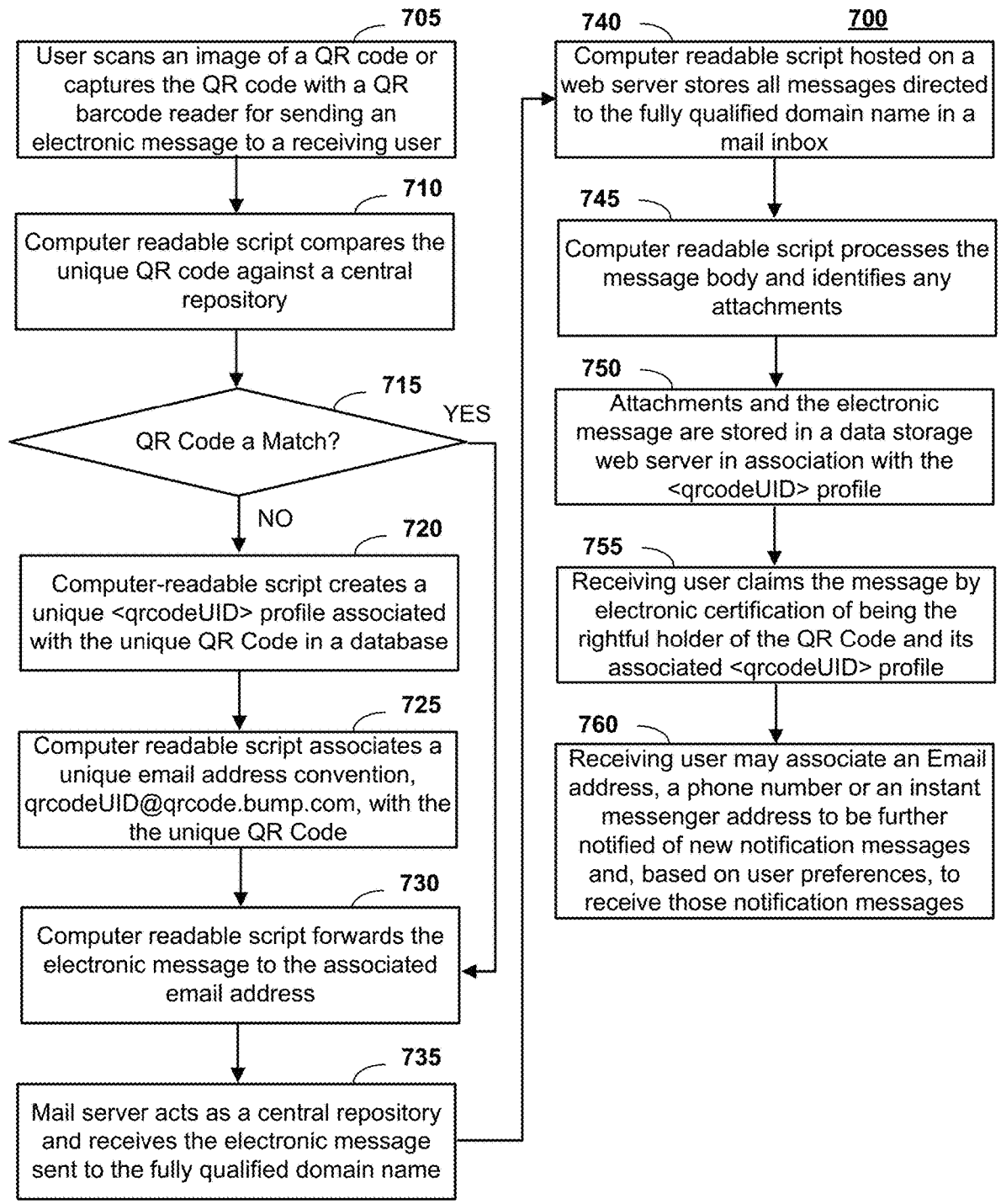
FIG. 42 shows an exemplary process for sending messages to one or more electronic addresses associated with a QR Code.

FIG. 42 shows an exemplary process 700 for sending messages to one or more electronic addresses associated with a QR Code. At a stage 705, a user scans an image of a QR code or captures the QR code with a QR barcode reader on a mobile device for the purpose of sending an electronic message to a receiving user. At stage 710, a computer readable script compares the unique captured QR code against a central repository (e.g., a database hosted on a web server on a communication network. At a decision block 715, if it is determined that the unique QR Code has a match and already has an associated profile, the process continues to stage 730, otherwise the process proceeds to stage 720. At stage 720, a computer-readable script creates a unique identifier profile in a database that is associated to the unique QR Code. At stage 725, a unique email address convention, qrcodeUID@qrcode.bump.com, is given the QR Code unique identifier <qrcodeUID> and is associated to the unique QR Code via a computer readable script.

At stage 730, a computer readable script forwards the electronic message to the associated email address qrcodeUID@qrcode.bump.com. At stage 735, a mail server acts as a central repository and receives the electronic message sent to the fully qualified domain name. At stage 740, a computer readable script hosted on a web server stores all messages directed to the fully qualified domain name in a mail inbox. At stage 745, a computer readable script separates out the unique identifier <qrcodeUID> from the email address convention, and processes the message body in order to determine if the message has any attachments. At stage 750, any identified attachments and the electronic message are stored in a data storage web server in association with the <qrcodeUID> profile. At stage 755, the receiving user claims the message by electronic certification of being the rightful holder of the QR Code and its associated <qrcodeUID>. A computer readable script can, for purposes of verification, match associated data contained in the QR Code to the rightful holder's data. At stage 760, the receiving user may associate an Email address, a phone number or an instant messenger address to be further notified of new notification messages and, based on user preferences, to receive those notification messages.

Figure 43A:
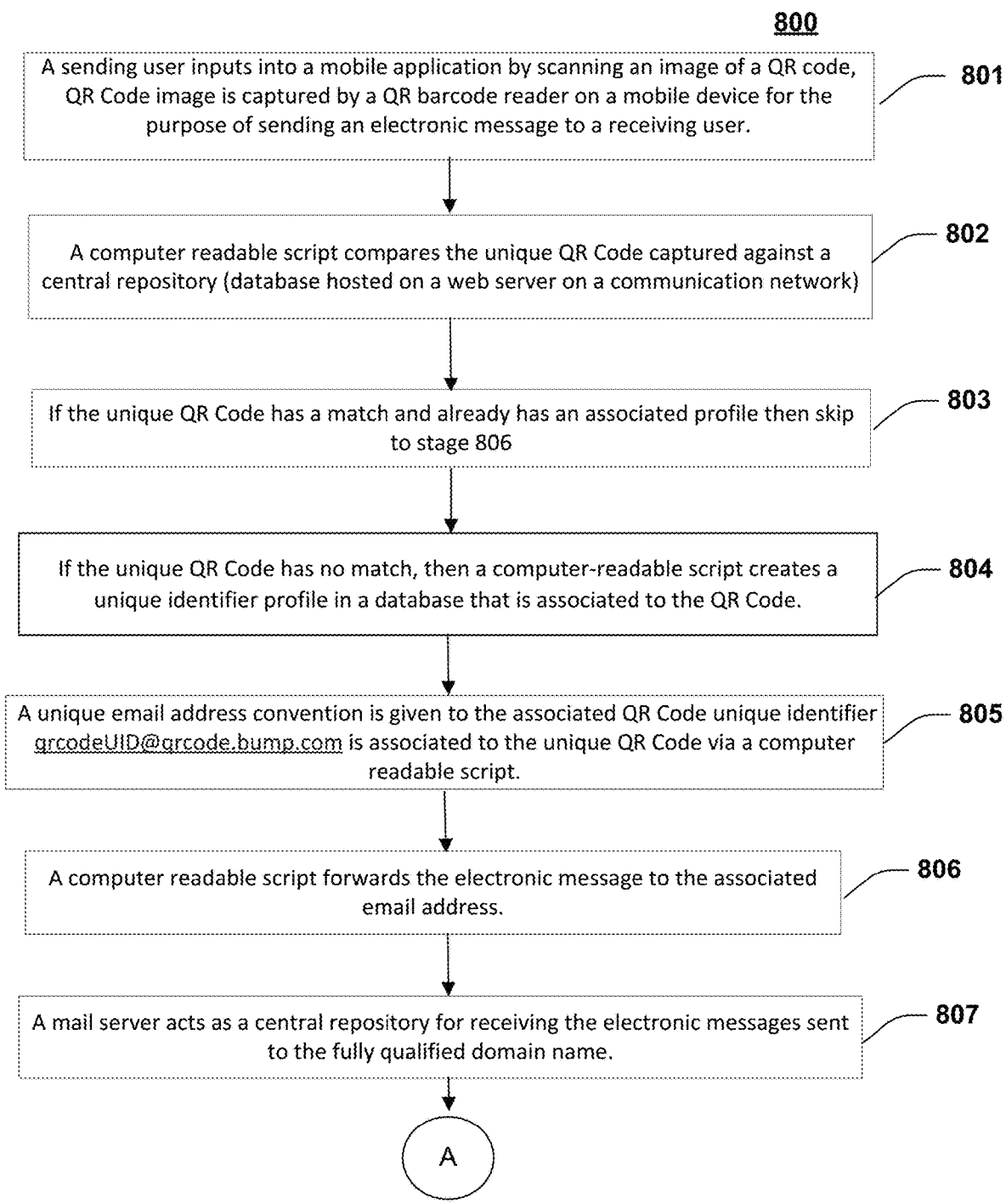
FIGS. 43A and 43B show another exemplary process for sending messages to one or more electronic addresses associated with a QR Code.
Figure 43B:
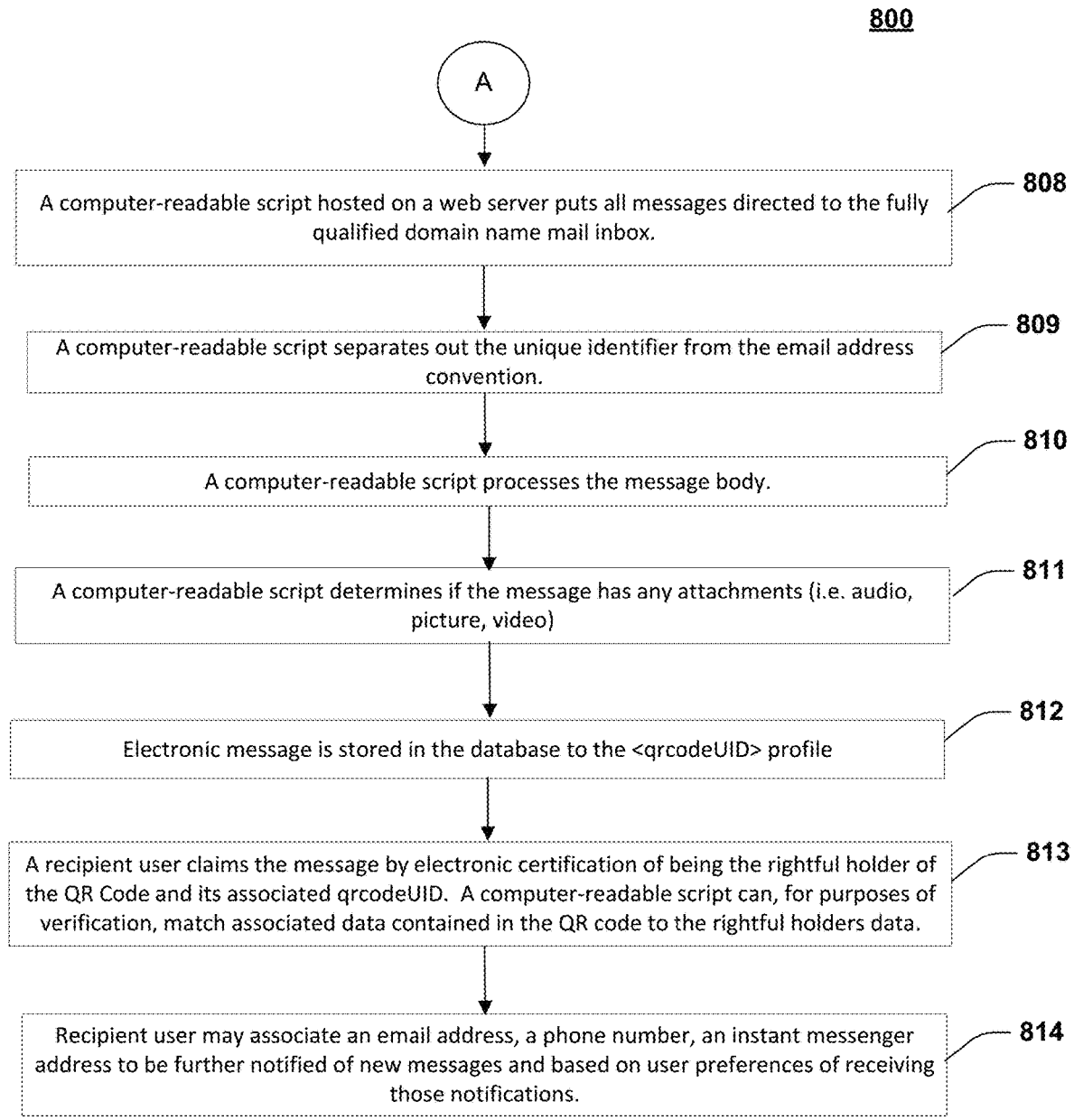

FIGS. 43A-43B comprise a flow chart which illustrate another exemplary process 800 for sending messages to a QR code.

While some specific teaching is included here on methods of both authenticating recipients' identities and validating their legitimate associations with their respective unique identifiers, it is understood that use cases of the present invention may include other authentication and validation techniques known to those skilled in the arts of identity verification, biometrics, information security, and fraud prevention. Moreover, it is understood that such techniques to duly register, authenticate, or validate the identities of correspondents may apply to both recipients and senders.

In certain embodiments it may be effective to use identifiers that do not necessarily uniquely identify a particular item or device (e.g., a model number of a product) but which would none the less be useful in determining message recipients (e.g., identifying a manufacturer of a product when reporting a product defect). Additional purposes may include supply chain management optimization, business intelligence collection, or other economic analysis. Classes of recipients that may be validated for computer products, for example, may include designated manufacturers, distributors, retailers, regulators, support/repair organizations, recyclers, buyers, brokers, sellers, and, of course, owners.

In other embodiments it may be desired to offer different classes of correspondence for different classes of senders. For example, a charity desiring to communicate with a physical street address could use the address schema of charitymail.streetaddress.city.stat@domain and be offered a particular rate in connection with such communication. Similarly, a current vendor could be offered a different rate, a solicitation offered yet another rate, and so on. This approach may also involve authentication of sender identity, enforcement of contract terms and/or the leving of a service fee.

The present disclosure also contemplates automated methods of opting in and out of such linkages (such as upon purchase or disposal of an object) including but not limited to machine to machine communication. Automated discovery and mapping (and removal) of unique identifiers to profile, such as at point of sale or using a smart phone camera or audio application to capture unique identifiers.

In addition, the teachings herein may be combined with all available methods of preventing illegitimate parties from hacking or compromising the integrity and privacy of the communication described herein.

It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

We claim:

1. A computer-implemented method for facilitating electronic communication using unique identifiers, the method comprising:
executing, by a server system, a computer readable script to access electronic messages directed to one or more specific domain names and received at an email server from user devices wherein an electronic message included within the electronic messages has an address based upon a unique identifier;
accessing an electronic repository that stores an association between the unique identifier and a profile that includes contact information for a user associated with the profile and a preference related to the notifying the user; and
facilitating access to the message information in accordance with the profile, including (1) sending an alert to the user via the contact information, based on the preference, the contact information being different from the one or more specific domain names and (2) forwarding, posting or providing, by the server system, the message information to at least one of a platform, messaging system or telephone system different from the server system.

2. The method of claim 1 wherein the facilitating access includes storing the message information in a web-based stored messaging system.

3. The method of claim 1 wherein the facilitating access includes sending the message information in an e-mail message addressed to an e-mail address included within the profile.

4. The method of claim 1 wherein the facilitating access includes forwarding the message information to a messaging platform.

5. The method of claim 1 wherein the facilitating access includes placing a call to a telephone number included within the profile.

6. The method of claim 5 wherein the call includes a notification relating to the existence of the message information.

7. The method of claim 1 wherein the facilitating access includes forwarding the message information to a social networking platform.

8. The method of claim 1 wherein the facilitating access includes posting the message information to a web site.

9. The method of claim 1 wherein the profile is associated with multiple electronic addresses.

10. The method of claim 9 wherein the multiple electronic addresses are respectively associated with multiple physical addresses within an area defined by a select zip code.

11. The method of claim 9 wherein the multiple electronic addresses are respectively associated with multiple phone numbers included in a select area code.

12. The method of claim 1 further including determining that the electronic message includes at least one attachment and storing the at least one attachment separately from the message information.

13. The method of claim 12 further including facilitating access to the at least one attachment.

14. A computer-implemented method for facilitating electronic communication using unique identifiers, the method comprising:
executing, by a server system, a computer readable script to access electronic messages directed to one or more specific domain names and received at an email server from user devices wherein an electronic message included within the electronic messages has an electronic message having an address based upon a unique identifier;
accessing an electronic repository that stores an association between the unique identifier and a profile that includes contact information for a user associated with the profile and a user preference related to the notifying the user; and
forwarding, posting or providing, by the server system, the message information to at least one of a platform, messaging system or telephone system different from the server system;
sending, based on the user preference, a notification relating to the electronic message;
receiving a request to access the message information; and
verifying legitimacy of the request by electronically certifying, based on certification information electronically provided by the user, that the user is a rightful holder of the unique identifier.

15. The method of claim 1 wherein the electronic message is generated by a mobile device based upon barcode information accessible to the mobile device, the barcode information incorporating the unique identifier.

16. The method of claim 1 further including electronically certifying, based on certification information provided to the user and electronically received from the user, that the user is rightfully associated with the unique identifier.

17. The method of claim 1 wherein the unique identifier is from a plurality of unique identifiers, each unique identifier from the plurality of unique identifiers being at least one of an international standard book number (ISBN), an international mobile subscriber identity (IMSI), an international mobile equipment identity (IMEI) or mobile equipment identifier (MEI), a global trade item number (GTIN), an electronic product code (EPC), a biometric identifier, an RFID tag, a patent number, a point of sale or transaction identifier, a passport, a library of congress control number, an international standard musical work code (ISWC), a global location number, a location or GPS coordinates, an international product serial number, a brand name or trademark, an international standard recording code, an electronic serial number, a credit card number, a rewards card, a tracking number, a global release identifier (GRID), a digital object identifier (DOI), a time stamp, a social security number, a driver's license number, an iPhone unique user identifier, or a racing bib number.

18. The method of claim 1 wherein the unique identifier is from a plurality of unique identifiers, each unique identifier from the plurality of unique identifiers being at least one of a vehicle license plate number, a vehicle identification number (VIN), a street address, or a telephone number.

19. The method of claim 1, wherein the unique identifier is associated with a geographical location and includes a latitude, a longitude, and an altitude.

20. The method of claim 1, the unique identifier is associated with a geographical location and includes a latitude, a longitude, an altitude, and a time.

21. The method of claim 14 wherein the verifying legitimacy includes verifying that a receiver of the request is rightfully associated with the at least one unique identifier.

22. The method of claim 14 further including determining the address is of a predefined address format associated with a specific to the plurality of unique identifiers that includes the unique identifier.

* * * * *